(12) United States Patent
Zakoji et al.

(10) Patent No.: US 7,513,625 B2
(45) Date of Patent: Apr. 7, 2009

(54) OPTICAL DEVICE AND PROJECTOR

(75) Inventors: Makoto Zakoji, Shiojiri (JP); Satoshi Kinoshita, Matsumoto (JP); Motoyuki Fujimori, Suwa (JP); Yoshiyuki Yanagisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 470 days.

(21) Appl. No.: 11/344,091

(22) Filed: Feb. 1, 2006

(65) Prior Publication Data

US 2006/0197917 A1    Sep. 7, 2006

(30) Foreign Application Priority Data

Mar. 1, 2005    (JP)    ............................. 2005-055627

(51) Int. Cl.
G03B 21/18    (2006.01)
G03B 21/26    (2006.01)
G03B 21/16    (2006.01)
G03B 21/14    (2006.01)
G03B 21/22    (2006.01)

(52) U.S. Cl. ............................. 353/54; 353/20; 353/61; 353/119

(58) Field of Classification Search .................. 353/31, 353/52, 54, 60, 61, 119, 121, 122, 20; 62/259.2; 349/161, 9, 181; 359/820
See application file for complete search history.

(56) References Cited

U.S. PATENT DOCUMENTS

| 5,170,195 | A  | * | 12/1992 | Akiyama et al. ............... 353/54 |
| 6,991,335 | B2 |   | 1/2006  | Kondo et al. |
| 7,130,136 | B2 | * | 10/2006 | Fujimori et al. ............. 359/820 |
| 7,226,171 | B2 | * | 6/2007  | Fujimori et al. ............... 353/52 |
| 7,384,152 | B2 | * | 6/2008  | Takeuchi ...................... 353/54 |
| 2002/0163625 | A1 | * | 11/2002 | Tabuchi et al. ................ 353/31 |
| 2005/0168703 | A1 | * | 8/2005  | Fujimori et al. ............... 353/52 |

FOREIGN PATENT DOCUMENTS

| JP | A-60-294     | 1/1985 |
| JP | A 1-159684   | 6/1989 |
| JP | A 2002-156195 | 5/2002 |
| JP | A-2004-117580 | 4/2004 |
| JP | A-2004-126255 | 4/2004 |
| JP | A-2005-10630  | 1/2005 |

* cited by examiner

Primary Examiner—Melissa J Koval
(74) Attorney, Agent, or Firm—Oliff & Berridge, PLC

(57) ABSTRACT

A projector including: a light source device; an optical device including, an optical modulator that modulates a luminous flux from a light source in response to image information, an optical modulator holding frame that holds the periphery of the optical modulator, and an optical modulator cooling duct that is disposed, along the periphery of the optical modulator, within the optical modulator holding frame, and that allows a cooling fluid to flow therethrough; and
a projection optical device that magnifies and projects an optical image formed by the optical device.

12 Claims, 31 Drawing Sheets

F I G. 17A
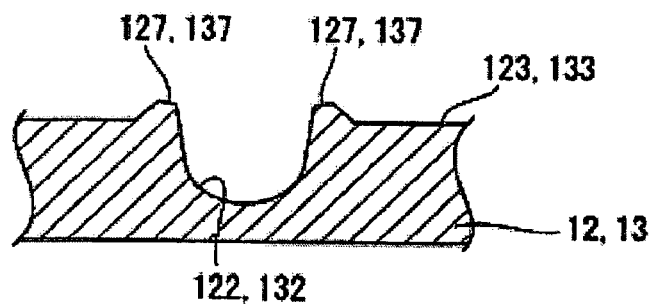
F I G. 17B
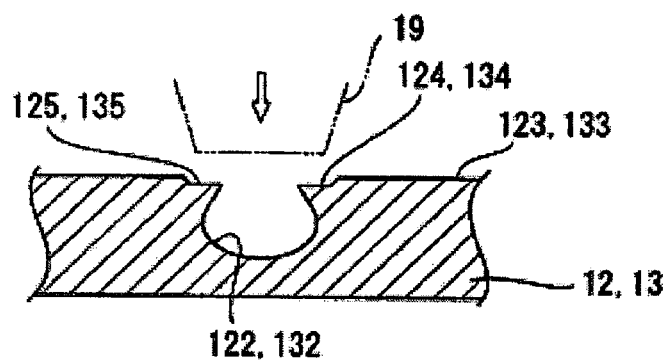
F I G. 18A
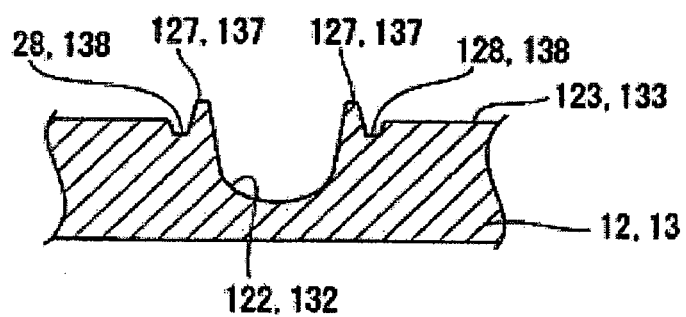
F I G. 18B
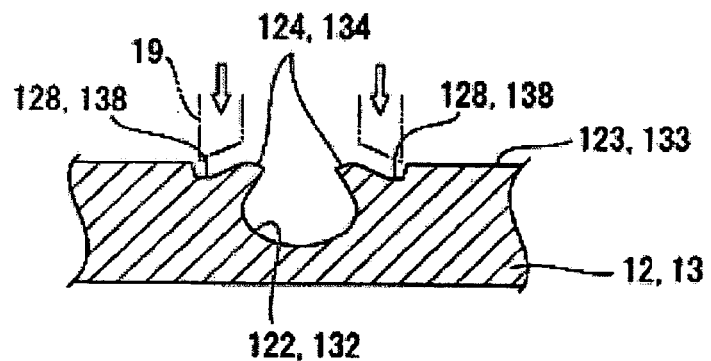

F I G. 19A
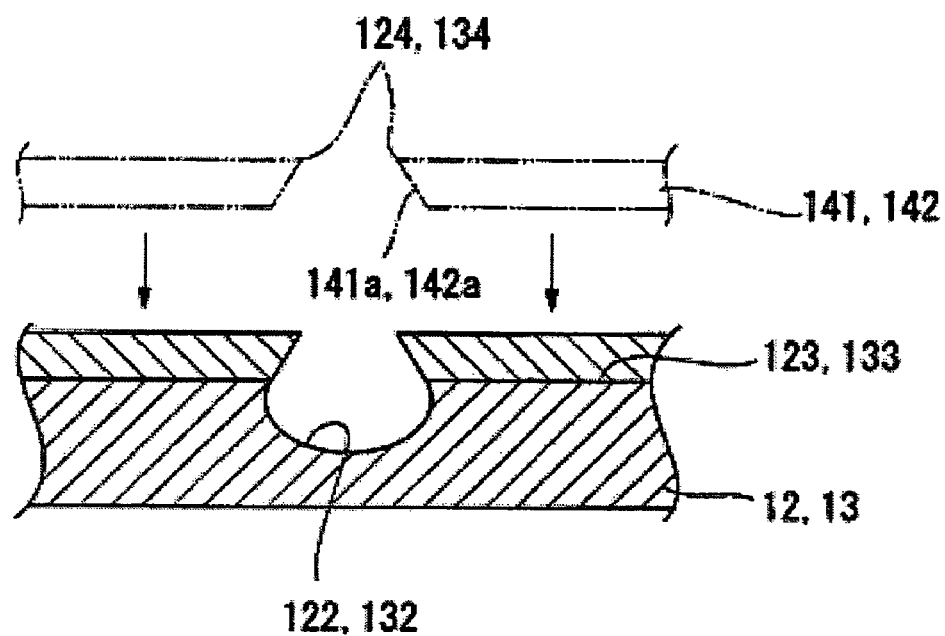
F I G. 19B
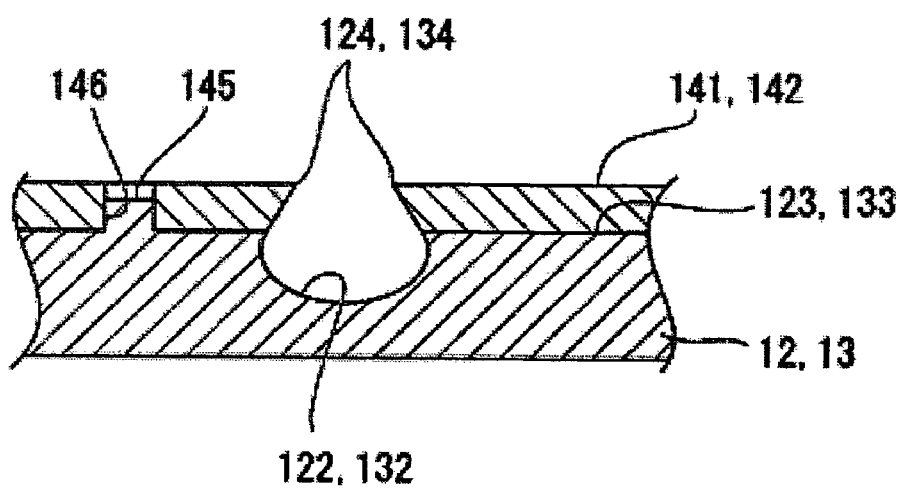

FIG. 22
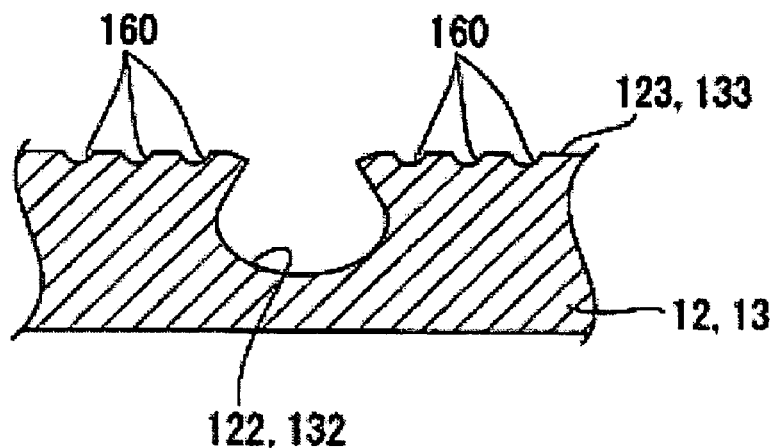
FIG. 23
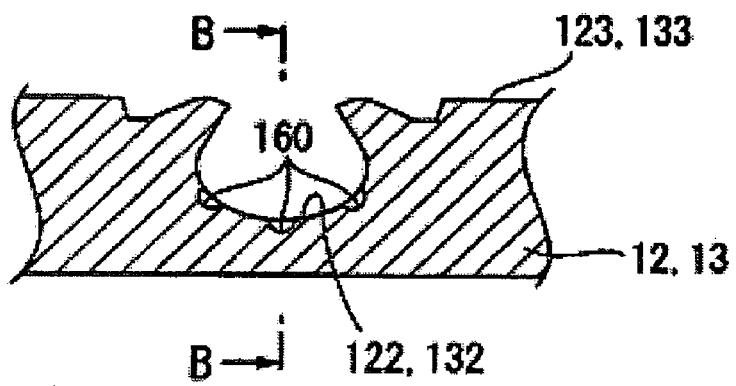
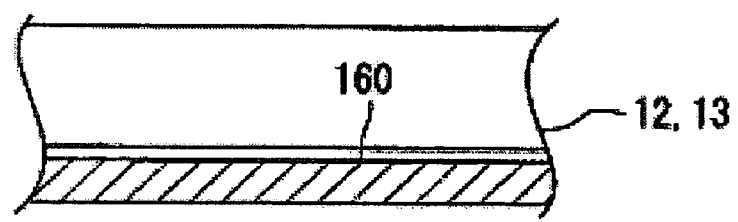
B-B

FIG. 24
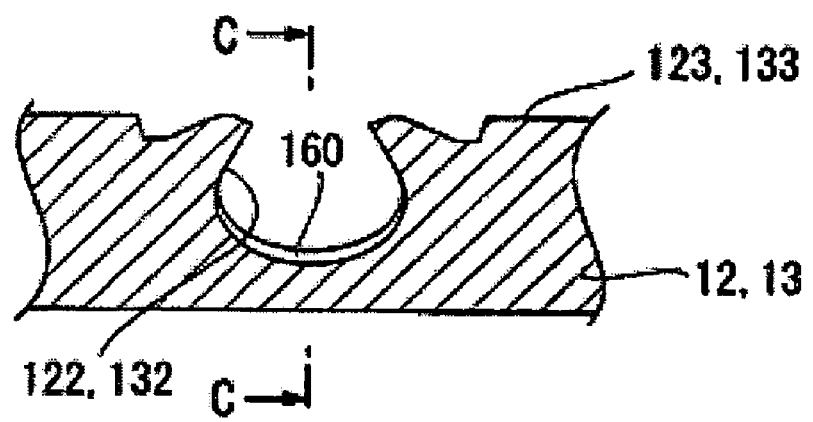
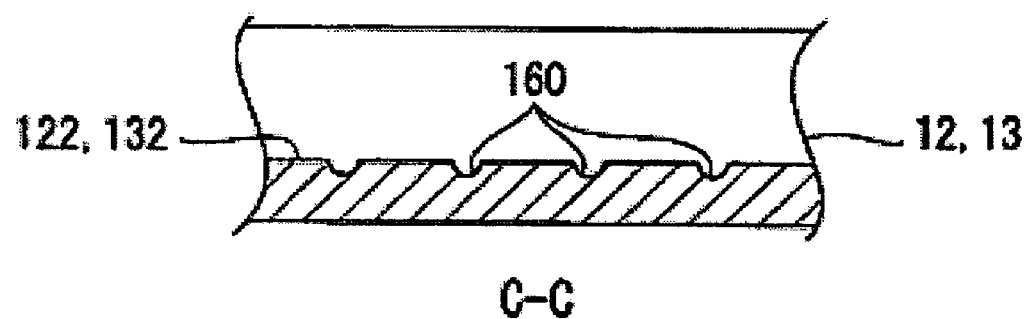
C-C

D-D

F I G. 26A
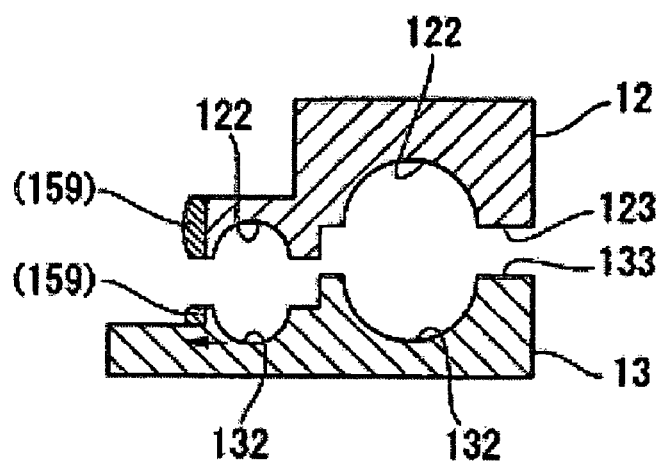
F I G. 26B
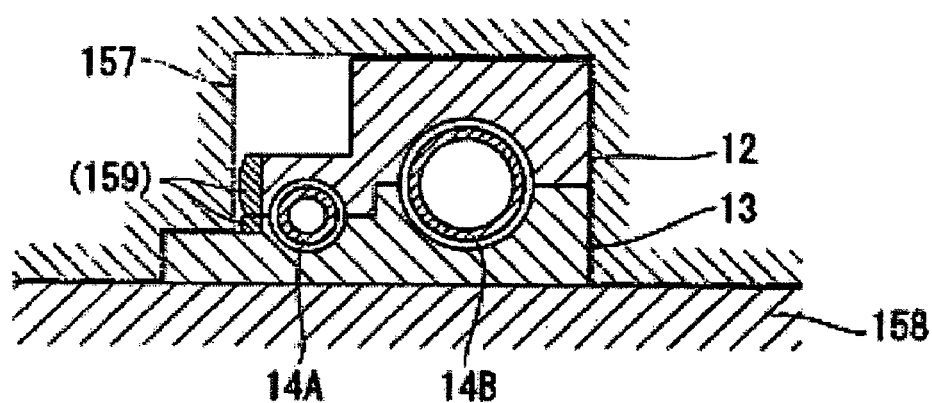
F I G. 26C
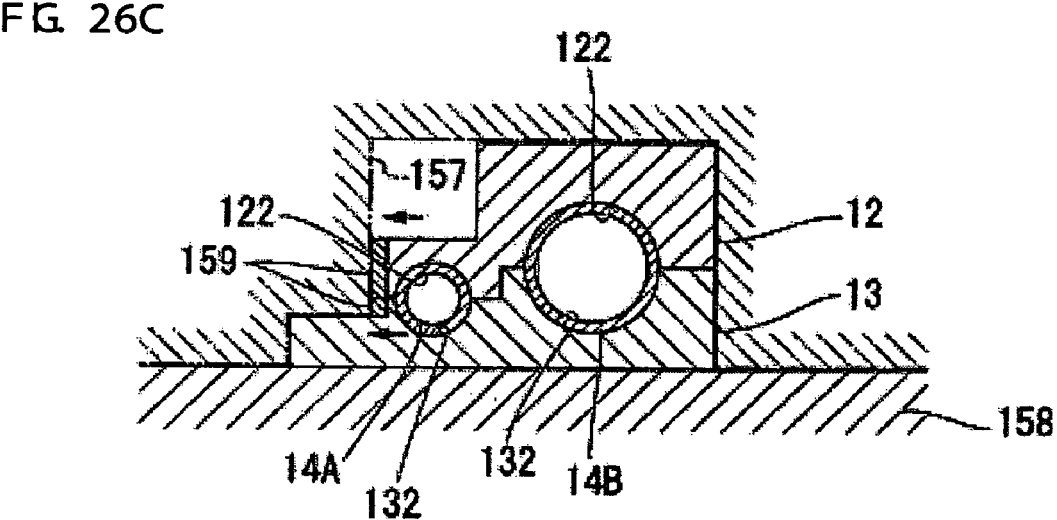

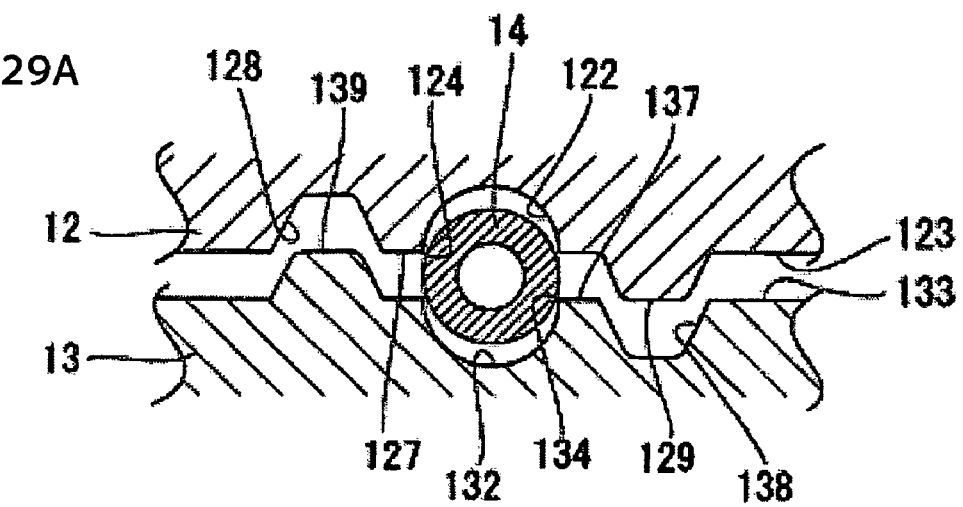
F.I.G. 29A
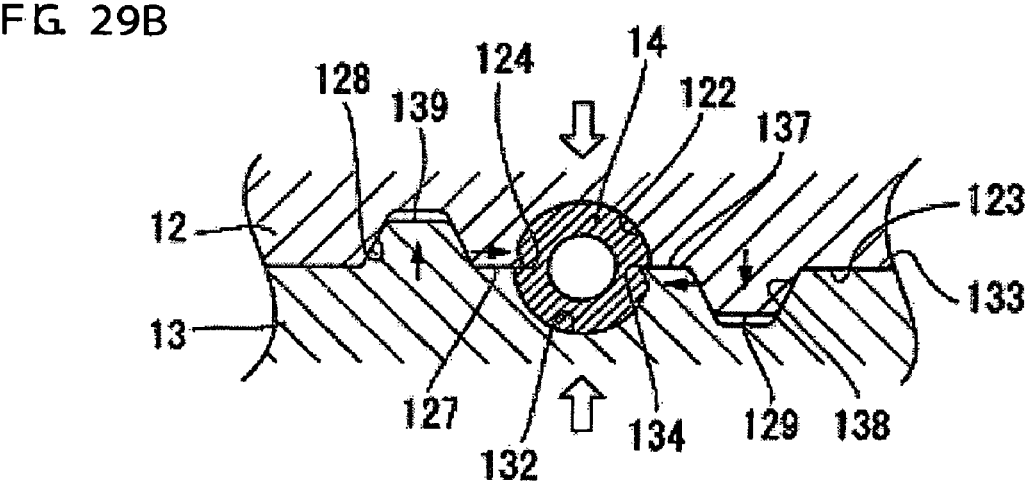
F.I.G. 29B

OPTICAL DEVICE AND PROJECTOR

BACKGROUND

1. Technical Field

The present invention relates to an optical device and a projector.

2. Related Art

There is known a projector including an optical modulator that modulates a luminous flux from a light source in response to image information and a projection optical device that magnifies and projects the luminous flux modulated by the optical modulator.

The optical modulator adopts, for example, an active matrix drive type liquid crystal panel having a liquid crystal hermetically sealed between a pair of substrates. Generally, an incidence side polarizing plate and emergence side polarizing plate which transmit a luminous flux having a predetermined optical axis are disposed on the luminous flux incidence side and luminous flux emergence side of the liquid crystal panel, respectively.

In the projector including the aforesaid liquid crystal panel, when a luminous flux is emitted from the light source, the liquid crystal panel is liable to a rise in temperature, and heat tends to occur even in the polarizing plates, because of light absorption by a liquid crystal layer, a black matrix, various interconnections, and the like.

There is the technique in which a transmissive cooling chamber serving as a liquid refrigerant layer is disposed between the liquid crystal panel and each of the polarizing plates, and in which a rise in temperature of the optical modulator and polarizing plate is suppressed by allowing a cooling fluid to flow through the cooling chamber (e.g., see JP-A-1-159684).

In the technique of allowing the cooling fluid between the liquid crystal panel and each of the polarizing plates, an image forming luminous flux passes through the cooling fluid. Therefore, the images of air bubbles, dust particles, or the like in the cooling fluid are included in an optical image formed on the liquid crystal panel, or the optical image fluctuates with a temperature distribution in the cooling fluid, which is likely to cause a deterioration in image quality. Besides, for example, when the cooling fluid is deteriorated, the transmittivity of the luminous flux is lowered to, as a result, reduce the illuminance and color reproducibility of the optical image on the liquid crystal panel.

SUMMARY

An advantage of some aspects of the invention is to provide an optical device and projector capable of effectively suppressing a rise in temperature of an optical modulator by using a cooling fluid.

An optical device of an aspect of the invention is an optical device including an optical modulator that modulates a luminous flux from a light source in response to image information. The optical device comprises: an optical modulator holding frame that holds the periphery of the optical modulator; and an optical modulator cooling duct that is disposed, along the periphery of the optical modulator, within the optical modulator holding frame, and that allows a cooling fluid to flow therethrough.

In this optical device, the cooling duct is disposed within the optical modulator holding frame, so that the heat of the optical modulator is appropriately removed by the cooling fluid flowing through the cooling duct. That is, the optical modulator and the cooling duct are thermally connected together via the optical modulator holding frame. Heat is thereby exchanged between the optical modulator and the cooling duct. The heat of the optical modulator is thus transferred to the cooling fluid in the cooling duct via the holding frame. And, the heat of the optical modulator transfers to the cooling fluid, thereby cooling the optical modulator.

The cooling duct is disposed along the periphery of the optical modulator, thus preventing an image forming luminous flux from passing through the cooling fluid. This avoids the problem in which the images of air bubbles, dust particles, or the like in the cooling fluid are included in an optical image formed by the optical modulator, or in which the optical image fluctuates with a cooling fluid temperature distribution.

Furthermore, in this optical device, the cooling fluid path in the element periphery is formed by the duct (cooling duct), so that the number of junctions for path formation can be made comparatively small. Consequently, the degree of risk of fluid leakage is low, and a uniform and smooth flow path is formed in a flow direction, so that ducting resistance is low.

Therefore, according to this optical device, it is possible to effectively suppressing a rise in temperature of the optical modulator while preventing the occurrence of problems caused by using the cooling fluid.

Additionally, in such a configuration that the cooling duct is disposed within the optical modulator holding frame, the holding frame serves as both the holding and cooling sections for the optical modulator. Therefore, such a configuration facilitates a reduction in size and thus is preferably applicable to a small size optical element.

The aforesaid optical device can be configured such that the position at which the optical modulator cooling duct is disposed in the direction of thickness of the optical modulator is determined based on at least one of the heat generation characteristic and shape of the optical modulator.

For example, preferably, the configuration is such that the optical modulator is of transmission type, and such that the optical modulator cooling duct is disposed against the incidence surface side of the optical modulator.

According to this configuration, the cooling duct is disposed against the incidence surface side of the optical modulator having a large amount of heat absorption, so that the heat of the optical modulator is effectively removed.

Besides, for example, the configuration is such that the optical modulator is of transmission type, and such that the optical modulator cooling duct is disposed against either the incidence surface or emergence surface of the optical modulator, whichever has a smaller area. The disposition of the components is thereby made more efficient, which is advantageous to reduce the size of the device.

Furthermore, the optical modulator cooling duct is at least substantially entirely circumferentially disposed along the periphery of the optical modulator. Heat transfer area is thereby increased, thus making it possible to effectively cool the optical modulator.

Still furthermore, the optical modulator cooling duct is disposed in multiple folds in the direction of thickness of the optical modulator. Heat transfer area is thereby increased to improve cooling performance.

Still furthermore, for example, the optical modulator cooling duct can be configured to have a curved or angled cross-section shape.

Still furthermore, in the aforesaid optical device, the optical modulator holding frame has a configuration such that a pair of frame-like members are disposed opposite each other with the optical modulator cooling duct sandwiched therebetween. And, the optical device is configured such that a groove that houses the optical modulator cooling duct is formed in at least one of opposite surfaces of the pair of frame-like members. The cooling duct can thereby be comparatively easily disposed within the optical modulator holding frame.

The aforesaid optical device can be configured to further comprise: a polarizing plate; a polarizing plate holding frame; and a polarizing plate cooling duct. The polarizing plate is disposed on at least one of the incidence surface side and emergence surface side of the optical modulator. The polarizing plate holding frame holds the periphery of the polarizing plate. And, the polarizing plate cooling duct is disposed, along the periphery of the polarizing plate, within the polarizing plate holding frame, and allows the cooling fluid to flow therethrough.

According to this configuration, in addition to the optical modulator, the polarizing plate on the incidence surface side or emergence surface side is cooled by the cooling fluid.

Similar to the optical modulator cooling duct, the polarizing plate cooling duct is disposed along the periphery of the optical modulator, thus preventing an image forming luminous flux from passing through the cooling fluid. This avoids the problem in which the images of air bubbles, dust particles, or the like in the cooling fluid are included in an optical image formed by the optical modulator, or in which the optical image fluctuates with a cooling fluid temperature distribution.

In this case, the configuration is such that the optical modulator cooling duct and polarizing plate cooling duct are disposed in parallel on a path through which the cooling fluid flows. Therefore, flow path resistance due to a pressure loss on these paths is low, thus effectively cooling each element.

Besides, the configuration is such that the optical modulator cooling duct and polarizing plate cooling duct are disposed in series on the path through which the cooling fluid flows. Ducting space is thereby reduced.

In this case, preferably, the order of disposition of the optical modulator cooling duct and polarizing plate cooling duct is determined based on the heating value of each of the optical modulator and polarizing plate.

For example, there can be provided the following configuration. That is, the polarizing plate includes an incidence surface side polarizing plate and an emergence surface side polarizing plate. The polarizing plate cooling duct includes an incidence surface side polarizing plate cooling duct and an emergence surface side polarizing plate cooling duct. And, the emergence surface side polarizing plate cooling duct, optical modulator cooling duct, and incidence surface side polarizing plate cooling duct are disposed in series, in the order named from upstream to downstream.

Otherwise, there can be provided the following configuration. That is, the polarizing plate includes an incidence surface side polarizing plate and an emergence surface side polarizing plate. The polarizing plate cooling duct includes an incidence surface side polarizing plate cooling duct and an emergence surface side polarizing plate cooling duct. And, the optical modulator cooling duct and incidence surface side polarizing plate cooling duct are disposed in series, in the order named from upstream to downstream, and the emergence surface side polarizing plate cooling duct is disposed parallel thereto.

Besides, the aforesaid optical device is configured to further comprise a diverging tank for branching the cooling fluid path.

This makes it possible to divergingly supply a plurality of paths with the cooling fluids having substantially the same temperature.

In this case, there can be provided the following configuration. That is, the optical modulator cooling duct includes three optical modulator cooling ducts which correspond to three colors of red, green, and blue. And, the diverging tank divides the cooling fluid path into at least three branches in response to the three optical modulator cooling ducts.

A projector of an aspect of the invention comprises: a light source device; the aforesaid optical device; and a projection optical device that magnifies and projects an optical image formed by the aforesaid optical device.

According to this projector, a rise in temperature of the optical modulator is effectively suppressed, thus improving image quality.

BRIEF DESCRIPTION OF THE DRAWINGS

The invention will be described with reference to the accompanying drawings, wherein like numbers reference like elements.

FIGS. 17A and 17B are illustrations showing a modified example of the manufacturing method of FIGS. 16A to 16D.

FIGS. 18A and 18B are illustrations showing a modified example of the manufacturing method of FIGS. 16A to 16D.

FIGS. 19A and 19B are illustrations showing a modified example of the manufacturing method of FIGS. 16A to 16D.

FIG. 22 shows an example in which auxiliary grooves are formed in frame-like members.

FIGS. 23A and 23B show an example in which auxiliary grooves are formed in frame-like members.

FIG. 24 shows an example in which auxiliary grooves are formed in frame-like members.

FIGS. 25A and 25B show a modified example of the element holding frame, wherein FIG. 25A is a schematic plan view and FIG. 25B is a section view taken along line D-D shown in FIG. 25A.

FIGS. 26A to 26C are illustrations showing the condition of setting the shape of positioning portions.

FIGS. 29A and 29B are illustrations showing a second example of the element holding frame manufacturing method.

FIGS. 34A to 34C show a modified example of the liquid crystal panel holding frame or liquid crystal panel cooling duct of FIGS. 9A and 9B, wherein FIG. 34A is an assembly front view of the liquid crystal panel holding frame, FIG. 34B a section view taken along line A-A shown in FIG. 34A, and FIG. 34C a perspective view of the liquid crystal panel cooling duct.

FIGS. 35A and 35B show another modified example of the liquid crystal panel holding frame or liquid crystal panel cooling duct of FIGS. 9A and 9B, wherein FIG. 35A is an assembly front view of the liquid crystal panel holding frame, and FIG. 35B is a section view taken along line A-A shown in FIG. 35A.

DESCRIPTION OF EXEMPLARY EMBODIMENTS

Figure 1:
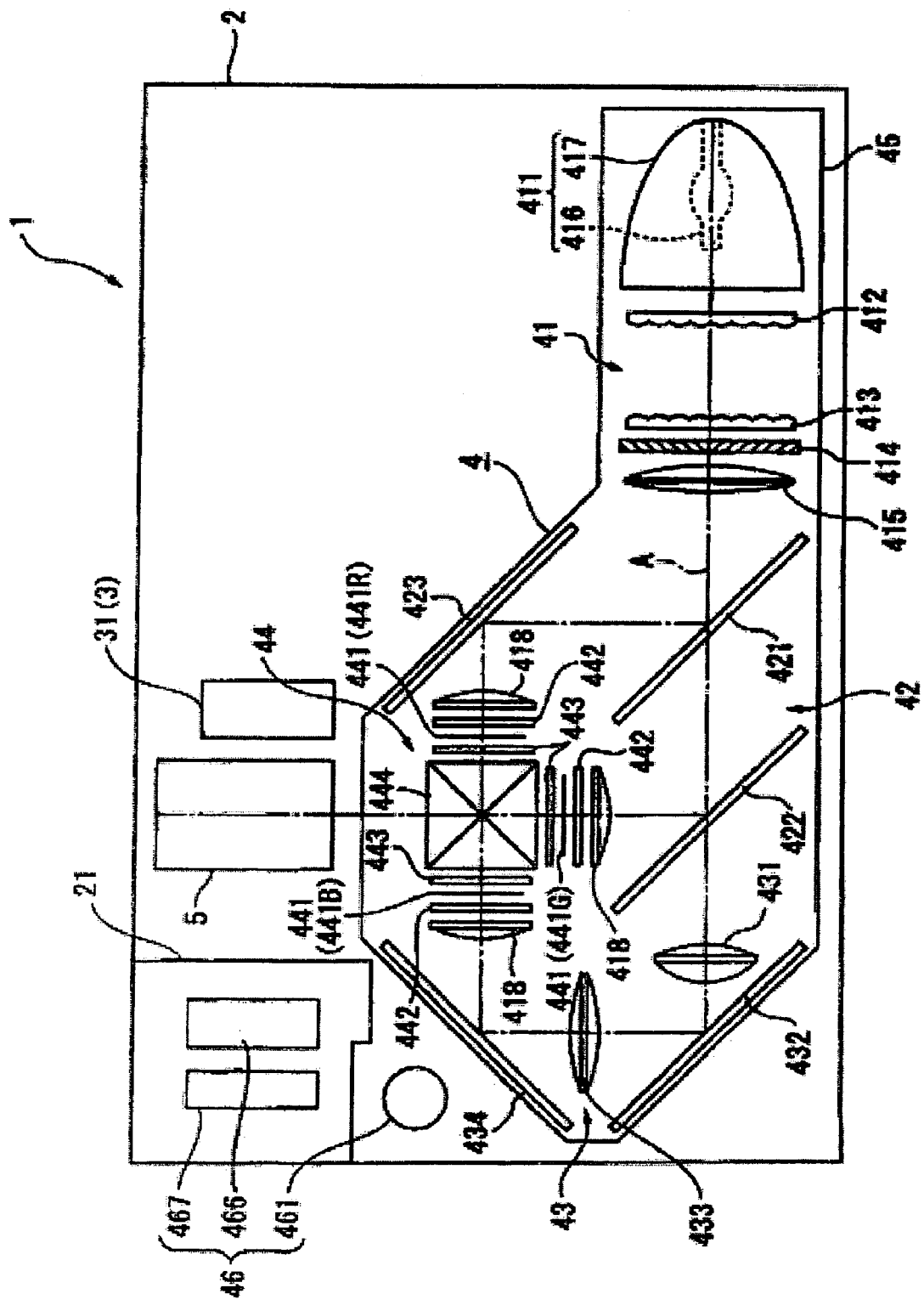
FIG. 1 is a diagram schematically showing an outlined configuration of a projector.

An embodiment of the invention will hereinafter be described with reference to the drawings. Additionally, in the drawings, the scale of components is made different from the actual one as needed in order to make the components such a size as to be recognizable in the drawings.

Configuration of Projector

FIG. 1 is a diagram schematically showing an outlined configuration of a projector 1.

The projector 1 modulates a luminous flux emitted from a light source in response to image information to form an optical image, and magnifies and projects the formed optical image onto a screen. This projector 1 includes an exterior casing 2, an air cooling device 3, an optical unit 4, and a projection lens 5 serving as the projection optical device.

Additionally, in FIG. 1, although not shown, in the exterior casing 2, a power supply block, a lamp drive circuit, and the like are disposed in a space other than that occupied by the air cooling device 3, optical unit 4, and projection lens 5.

The exterior casing 2, made of synthetic resin or the like, is formed into an overall substantially rectangular parallelepiped shape having housed and disposed therewithin the air cooling device 3, optical unit 4, and projection lens 5. Although not shown, this exterior casing 2 is made up of an upper casing and a lower casing. The upper casing includes the top surface, front surface, back surface, and side surfaces of the projector 1. The lower casing includes the bottom surface, front surface, side surfaces, and back surface of the projector 1. The upper and lower casings are fixed to each other by a screw or the like.

Additionally, the exterior casing 2 is not limited to being made of synthetic resin or the like, but may be formed of other material, for example, metal.

Besides, although not shown, this exterior casing 2 is formed with an inlet for introducing air from outside to inside of the projector 1 (e.g., an inlet 22 shown in FIG. 2) and an outlet for discharging the air heated within the projector 1.

Furthermore, as shown in FIG. 1, this exterior casing 2 is formed with a partition wall 21 that, positioned to a side of the projection lens 5 and in a corner portion of the exterior casing 2, partitions a to-be-described radiator 466, axial fan 467, and the like of the optical unit 4 from the other members.

The air cooling device 3 feeds cooling air into a cooling flow path formed within the projector 1 and cools heat generated in the projector 1. The air cooling device 3, positioned to a side of the projection lens 5, has a sirocco fan 31, a not-shown cooling fan, and the like. The sirocco fan 31 introduces cooling air from outside to inside of the projector 1 through the not-shown inlet formed on the exterior casing 2. The cooling fan cools the not-shown power supply block, lamp drive circuit, and the like.

The optical unit 4 is a unit that optically processes the luminous flux emitted from the light source to form an optical image (color image) in response to the image information. As shown in FIG. 1, the overall shape of this optical unit 4 has a substantially L shape in plan view which extends generally along the back surface of the exterior casing 2 and extends along the side surface of the exterior casing 2. Additionally, the detailed configuration of this optical unit 4 will be described later.

The projection lens 5 is configured as a combination lens having a plurality of lenses combined with each other. And, this projection lens 5 magnifies and projects the optical image (color image) formed by the optical unit 4 onto the not-shown screen.

Detailed Configuration of Optical Unit

As shown in FIG. 1, the optical unit 4 includes an integrator illumination optical system 41, a color separation optical system 42, a relay optical system 43, an optical device 44, an optical component housing 45, and a liquid cooling unit 46.

The integrator illumination optical system 41 is an optical system that substantially uniformly illuminates an image forming region of a to-be-described liquid crystal panel configuring the optical device 44. As shown in FIG. 1, this integrator illumination optical system 41 includes a light source unit 411, a first lens array 412, a second lens array 413, a polarization converter 414, and a superimposed lens 415.

The light source unit 411 includes a light source lamp 416 that emits a radial beam and a reflector 417 that reflects the radiant light emitted from this light source lamp 416. The light source lamp 416 heavily uses a halogen lamp, a metal halide lamp, or a high pressure mercury-vapor lamp. Besides, the reflector 417 adopts a paraboloidal mirror in FIG. 1, but is not limited thereto. The reflector 417 may be made up of an ellipsoidal mirror and configured to adopt on the luminous flux emergence side thereof a collimating concave lens that collimates a luminous flux reflected off the ellipsoidal mirror into collimated light.

The first lens array 412 has a configuration such that small lenses having a substantially rectangular contour as seen in an optical axis direction are arrayed in matrix fashion. The small lenses divide the luminous flux emitted from the light source unit 411 into a plurality of partial luminous fluxes.

The second lens array 413, having substantially the same configuration as the first lens array 412, has a configuration such that small lenses are arrayed in matrix fashion. This second lens array 413 has the function of focusing images of the small lenses of the first lens array 412 onto the to-be-described liquid crystal panel of the optical device 44, together with the superimposed lens 415.

The polarization converter 414, disposed between the second lens array 413 and the superimposed lens 415, converts light from the second lens array 413 into polarized light of substantially one kind.

Specifically, the partial luminous fluxes converted into the polarized light of substantially one kind by the polarization converter 414 are finally generally superimposed one over another, by the superimposed lens 415, onto the to-be-described liquid crystal panel of the optical device 44. A projector using a type of liquid crystal panel that modulates polarized light can use only polarized light of one kind and therefore cannot use substantially half the light from the light source unit 411 that emits randomly polarized light. For this reason, the polarization converter 414 is used to thereby convert emergent light from the light source unit 411 into polarized light of substantially one kind, thus increasing light use efficiency in the optical device 44.

As shown in FIG. 1, the color separation optical system 42 includes two dichroic mirrors 421, 422 and a reflecting mirror 423. And, the color separation optical system 42 has the function of causing the dichroic mirrors 421, 422 to separate the plurality of partial luminous fluxes emitted from the integrator illumination optical system 41 into three color lights of red (R), green (G), and blue (B).

As shown in FIG. 1, the relay optical system 43 includes an incidence side lens 431, a relay lens 433, and reflecting mirrors 432, 434. And, the relay optical system 43 has the function of leading the blue light separated by the color separation optical system 42 to a to-be-described blue light liquid crystal panel of the optical device 44.

On this occasion, the dichroic mirror 421 of the color separation optical system 42 reflects a red light component of the luminous fluxes emitted from the integrator illumination optical system 41, and transmits green and blue light components thereof. The red light reflected off the dichroic mirror 421 is reflected off the reflecting mirror 423, passes through a field lens 418, and then reaches a to-be-described red light liquid crystal panel of the optical device 44. This field lens 418 converts the partial luminous fluxes emitted from the second lens array 413 into luminous fluxes parallel to their center axis (principal ray). The same applies to the other field lenses 418 disposed on the light incidence sides of the green and blue light liquid crystal panels.

Out of the green and blue lights transmitted through the dichroic mirror 421, the green light is reflected off the dichroic mirror 422, passes through the field lens 418, and then reaches the to-be-described green light liquid crystal panel of the optical device 44. On the other hand, the blue light is transmitted through the dichroic mirror 422, passes through the relay optical system 43 and further through the field lens 418, and then reaches the to-be-described blue light liquid crystal panel of the optical device 44. Additionally, the reason for using the relay optical system 43 for the blue light is to prevent a reduction in light use efficiency due to light divergence or the like since the blue light has a longer optical path length than the other color lights. That is, such a configuration is provided since the partial color light incident on the incidence side lens 431 has a longer optical path length, but a configuration such as to lengthen the optical path length of the red light can also be considered.

As shown in FIG. 1, the optical device 44 integrally includes three liquid crystal panels 441, three incidence side polarizing plates 442, three emergence side polarizing plates 443, and a cross dichroic prism 444. The three liquid crystal panels 441 (the red light liquid crystal panel is indicated by 441R, the green light liquid crystal panel by 441G, and the blue light liquid crystal panel by 441B) serve as the optical modulators. The three incidence and emergence side polarizing plates 442, 443, serving as optical converters, are disposed on the luminous flux incidence and emergence sides of these liquid crystal panels 441, respectively. And, the cross dichroic prism 444 serves as a color composition optical device.

Although not specifically shown, the liquid crystal panels 441 each have a configuration such that a crystal, which is an electrooptic material, is hermetically sealed between a pair of transparent glass substrates. In each of the liquid crystal panels 441, the orientation of the aforesaid crystal is controlled in response to a drive signal outputted from a not-shown controller, thus modulating the polarization direction of polarized luminous fluxes emitted from the incidence side polarizing plate 442.

Each color light having its polarization direction oriented in substantially one direction by the polarization converter 414 is made incident on the incidence side polarizing plate 442. And, out of the incident luminous fluxes, the incidence side polarizing plate 442 transmits only polarized light having substantially the same direction as the polarization axis of the luminous fluxes oriented in substantially one polarization direction by the polarization converter 414, and absorbs the other luminous fluxes (light absorption type).

Although not specifically shown, this incidence side polarizing plate 442 has a configuration such that a polarizing film is attached on a translucent substrate of sapphire glass, crystal, or the like. The polarizing film of light absorption type is formed, for example, by uniaxially drawing a film including an iodine molecule or a dye molecule, and has the advantage that the extinction ratio is comparatively high and the incidence angle dependence is comparatively low.

The emergence side polarizing plate 443 has substantially the same configuration as the incidence side polarizing plate 442. And, out of luminous fluxes emitted from the liquid crystal panel 441, the emergence side polarizing plate 443 transmits only a luminous flux having a polarization axis perpendicular to the transmission axis of the luminous flux in the incidence side polarizing plate 442, and absorbs the other luminous fluxes (light absorption type).

The cross dichroic prism 444 is an optical element that forms a color image by combining optical images modulated for each color light emitted from the emergence side polarizing plates 443. This cross dichroic prism 444 is formed in a substantially square shape in plan view which is obtained by attaching four right angle prisms together, and two dielectric multilayer films are formed on interfaces obtained by attaching the right angle prisms together. These dielectric multilayer films reflect the color lights that are emitted from the liquid crystal panels 441R, 441B and pass through the emergence side polarizing plates 443, and transmit the color light that is emitted from the liquid crystal panel 441G and passes through the emergence side polarizing plate 443. The color lights modulated by the respective liquid crystal panels 441R, 441G, and 441B are thus combined to form the color image.

The optical component housing 45 is made up of a metal member for example, within which a predetermined illumination optical axis A is set and the aforesaid optical components 41 to 44 are housed and disposed at predetermined positions relative to the illumination optical axis A. Additionally, the optical component housing 45 is not limited to the metal member, but may be made of other material and is particularly preferably made of a thermally conductive material.

The liquid cooling unit 46 circulates a cooling fluid to mainly cool the optical device 44. The liquid cooling unit 46 includes a main tank 461 that temporarily accumulates the cooling fluid, a radiator 466 serving as a heat radiator for radiating heat from the cooling fluid, an axial fan 467 that blows the cooling fluid against this radiator 466. In addition thereto, the liquid cooling unit 46 includes a fluid pump, an element cooling duct, a diverging tank, a converging tank, ducts, and the like which will be described later.

Figure 2:
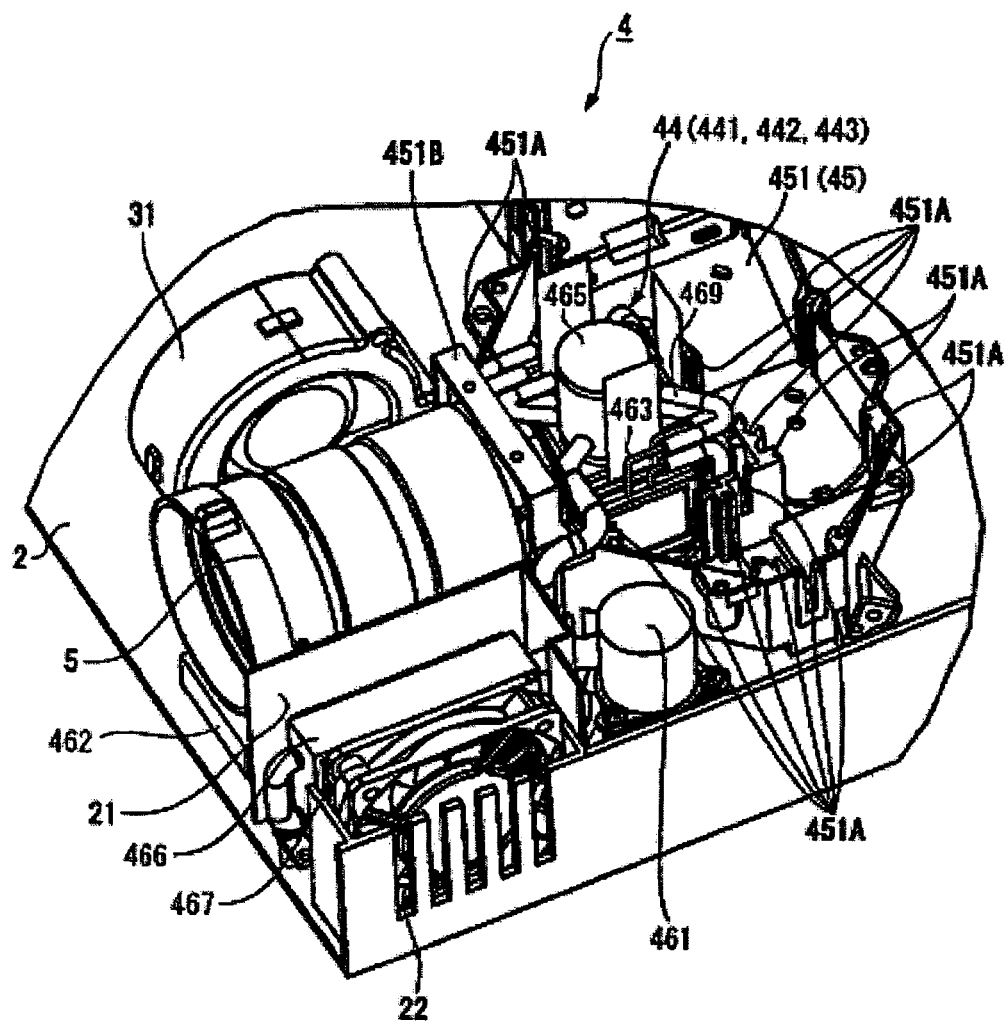
FIG. 2 is a perspective view of an inside portion of the projector as seen from the upper side thereof.
Figure 3:
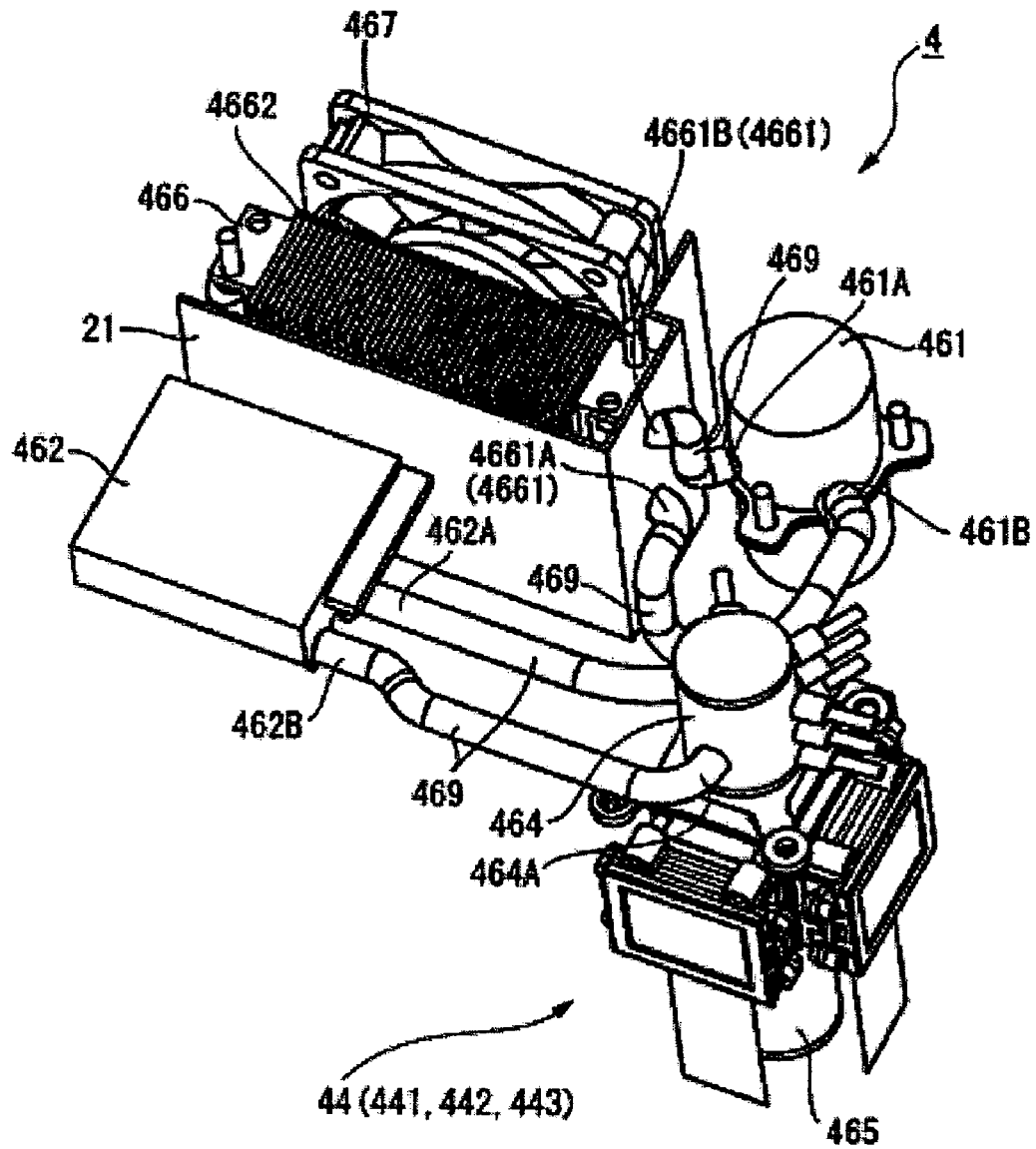
FIG. 3 is a perspective view mainly of an optical device and a liquid cooling unit in the projector, viewed from below.

Here, FIG. 2 is a perspective view of an inside portion of the projector 1 as seen from the upper side thereof, and FIG. 3 is a perspective view mainly of the optical device 44 and the liquid cooling unit 46 in the projector 1, viewed from below.

Additionally, for ease of description, FIG. 2 shows only the optical device 44 out of the optical components in the optical component housing 45, and the other optical components 41 to 43 are omitted from the figure. Besides, for ease of description, FIGS. 2 and 3 show the liquid cooling unit 46 with part of its members omitted therefrom.

As shown in FIG. 2, the optical component housing 45 includes a component housing member 451 and a not-shown lid-like member that closes the opening portion of the component housing member 451.

Out of these members, the component housing member 451 configures the bottom surface, front surface, and side surfaces of the optical component housing 45.

In this component housing member 451, as shown in FIG. 2, grooves 451A into which to slidingly fit the aforesaid optical components 41 to 44 from above are formed on the inner sides of the side surfaces.

Besides, as shown in FIG. 2, a projection lens installation portion 451B for installing the projection lens 5 in position relative to the optical unit 4 is formed in a side surface front portion. This projection lens installation portion 451B, formed in a substantially rectangular shape in plan view, has a not-shown circular hole formed in a substantially central portion in plan view so as to correspond to the emergence position of a luminous flux from the optical device 44. The color image formed on the optical unit 4 is thus magnified and projected by the projection lens 5 through the aforesaid hole.

Liquid Cooling Unit

The liquid cooling unit 46 will hereinafter be described in detail.

In FIGS. 2 and 3, the liquid cooling unit 46 includes the main tank 461, fluid pump 462 (FIG. 3), element cooling duct 463, diverging tank 464 (FIG. 3), converging tank 465, radiator 466, axial fan 467, ducts 469, and the like.

The main tank 461, having an overall substantially cylindrical shape as shown in FIGS. 2 and 3, is made up of two container-like members made of metal such as aluminum. The opening portions of the two container-like members are connected to each other, thereby temporarily storing the cooling fluid within the main tank 461. These container-like members are connected together, for example, by seal welding or by interposing therebetween an elastic member such as rubber.

As shown in FIG. 3, a cooling fluid inflow portion 461A and a cooling fluid outflow portion 461B are formed in the periphery of this main tank 461.

These inflow and outflow portions 461A, 461B, made up of tubular members, are disposed so as to project inwardly and outwardly of the main tank 461. And, one end of one of the ducts 469 is connected to one outwardly projecting end of the inflow portion 461A, and the cooling fluid from the outside flows into the inside of the main tank 461 via the one duct 469. Besides, one end of another duct 469 is connected even to one outwardly projecting end of the outflow portion 461B, and the cooling fluid within the main tank 461 is flows to the outside via the another duct 469.

Besides, in the main tank 461, the inflow and outflow portions 461A, 461B are in a positional relationship such that their central axes are substantially perpendicular to each other. The cooling fluid flowing into the inside of the main tank 461 via the inflow portion 461A is thereby prevented from immediately flowing to the outside via the outflow portion 461B. The quality and temperature of the cooling fluid are thus uniformized by mixing action within the main tank 461. And, the cooling fluid flowing out from the main tank 461 are fed to the fluid pump 462 via the ducts 469.

As shown in FIG. 3, the fluid pump 462 sucks into its inside the cooling fluid from the main tank 461 and forcibly discharges the cooling fluid outwardly toward the diverging tank 464. That is, the outflow portion 461B of the main tank 461 and an inflow portion 462A of the fluid pump 462 are connected together via the duct 469, and an outflow portion 462B of the fluid pump 462 and an inflow portion 464A of the diverging tank 464 are connected together via another duct 469.

Specifically, the fluid pump 462 has a configuration, for example, such that an impeller is disposed in a substantially rectangular parallelepiped hollow member made of metal such as aluminum. The impeller is rotated under control of the not-shown controller, whereby the cooling fluid stored in the main tank 461 is forcibly sucked into the fluid pump 462 and the cooling fluid sucked in is forcibly discharged to the outside via the duct 469. Such a configuration allows the impeller to be reduced in thickness dimension in the direction of the rotation axis thereof, thus improving compactification and space-saving. In this embodiment, the fluid pump 462 is disposed below the projection lens 5 as shown in FIGS. 2 and 3.

The element cooling ducts 463 are disposed adjacent the respective elements: the liquid crystal panels 441, incidence side polarizing plates 442, and emergence side polarizing plates 443 of the optical device 44. And, heat is exchanged between the cooling fluid flowing within the element cooling ducts 463 and the respective elements 441, 442, 443.

Figure 4:
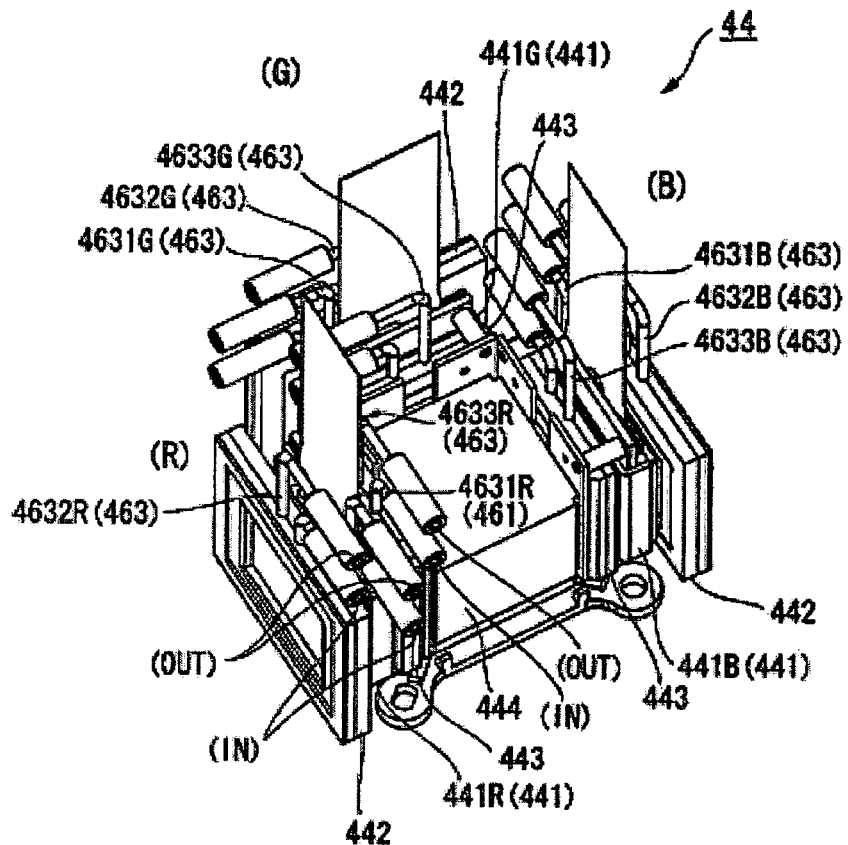
FIG. 4 is a perspective view showing an overall configuration of the optical device.

Here, FIG. 4 is a perspective view showing an overall configuration of the optical device 44.

In FIG. 4, as aforesaid, the optical device 44 integrally includes the three liquid crystal panels 441 (red light liquid crystal panel 441R, green light liquid crystal panel 441G, and blue light liquid crystal panel 441B), the polarizing plates (incidence side polarizing plates 442 or emergence side polarizing plates 443) disposed on the incidence or emergence side of the liquid crystal panels 441, and the cross dichroic prism 444.

In each of red (R), green (G), and blue (B) colors, the emergence side polarizing plate 443, liquid crystal panel 441, and incidence side polarizing plate 442 are disposed stacked, in the order named, on the cross dichroic prism 444.

And, the element cooling ducts 463 are individually disposed one with respect to each of the liquid panel 441, incidence side polarizing plate 442, and emergence side polarizing plate 443.

Specifically, the element cooling ducts 463 include, for the red color, a liquid crystal panel cooling duct 4631R disposed on the periphery of the liquid crystal panel 441R, an incidence side polarizing plate cooling duct 4632R disposed on the periphery of the incidence side polarizing plate 442, and an emergence side polarizing plate cooling duct 4633R disposed on the periphery of the emergence side polarizing plate 443. The cooling fluids flow from inflow portions (INs) of the element cooling ducts 4631R, 4632R, 4633R into the insides thereof, flow along the peripheries of the elements 441R, 442, 443, and flow to the outside from outflow portions (OUTs) of the aforesaid ducts, respectively.

Similarly, the element cooling ducts 463 include, for the green color, a liquid crystal panel cooling duct 4631G disposed on the periphery of the liquid crystal panel 441G, an incidence side polarizing plate cooling duct 4632G disposed on the periphery of the incidence side polarizing plate 442, and an emergence side polarizing plate cooling duct 4633G disposed on the periphery of the emergence side polarizing plate 443. Besides, the element cooling ducts 463 include, for the blue color, a liquid crystal panel cooling duct 4631B disposed on the periphery of the liquid crystal panel 441B, an incidence side polarizing plate cooling duct 4632B disposed on the periphery of the incidence side polarizing plate 442, and an emergence side polarizing plate cooling duct 4633B disposed on the periphery of the emergence side polarizing plate 443.

In this embodiment, the peripheries of the elements: the liquid crystal panel 441, incidence side polarizing plate 442, and emergence side polarizing plate 443 are held on a holding frame, within which the element cooling ducts 463 are substantially entirely circumferentially disposed along the peripheries of the elements, respectively. And, the inflow portions (Ins) and outflow portions (OUTs) of the element cooling ducts 463 are disposed on a common edge side of the elements 441, 442, 443.

Additionally, the detailed configurations of the aforesaid element holding frame and element cooling duct 463 will be described later.

Referring back to FIGS. 2 and 3, as shown in FIG. 3, the diverging tank 464 diverges the cooling fluid fed from the fluid pump 462, toward the individual element cooling ducts 463.

Besides, as shown in FIG. 2, the converging tank 465 converges and temporarily stores the cooling fluids fed from the individual element cooling ducts 463.

In this embodiment, the diverging tank 464 is disposed on one of the planes of the cross dichroic prism 444 of the optical device 44, and the converging tank 465 is disposed on a plane of the cross dichroic prism 444 opposite the aforesaid one plane. The positions at which the diverging tank 464 and converging tank 465 are disposed are not limited thereto, but may be other positions.

Figure 5:
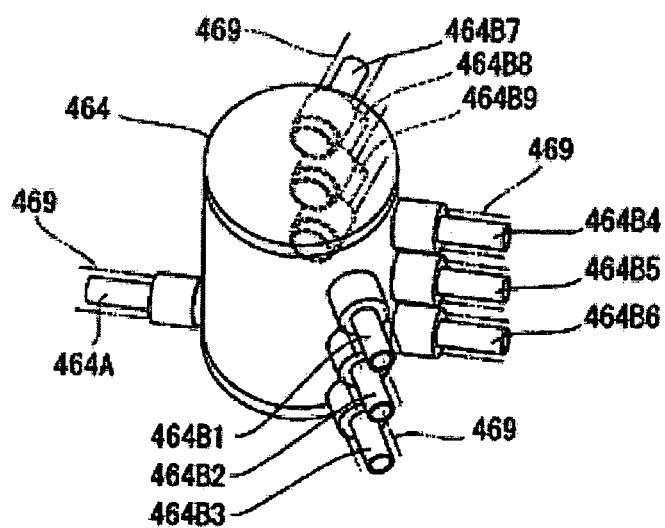
FIG. 5 is a perspective view showing an overall configuration of a diverging tank.
Figure 6:
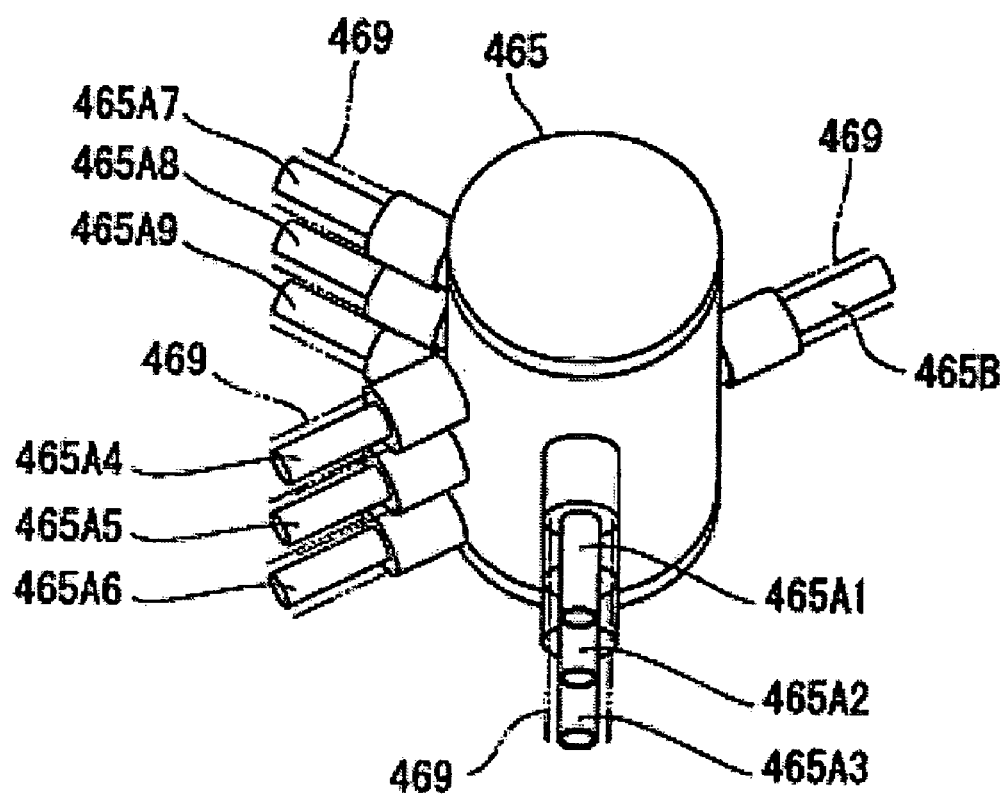
FIG. 6 is a perspective view showing an overall configuration of a converging tank.

Here, FIG. 5 is a perspective view showing an overall configuration of the diverging tank 464, and FIG. 6 is a perspective view showing an overall configuration of the converging tank 465.

As shown in FIG. 5, the diverging tank 464, having an overall substantially cylindrical shape, is made up of a sealed container-like member made of metal such as aluminum, and temporarily stores therewithin the cooling fluid.

A cooling fluid inflow portion 464A and cooling fluid outflow portions 464B1 to 464B9 are formed in the periphery of this diverging tank 464.

These inflow portion 464A and outflow portions 464B1 to 464B9, made up of tubular members, are disposed so as to project inwardly and outwardly of the diverging tank 464. And, one end of the duct 469 is connected to one end of the inflow portion 464A which projects outwardly, and the cooling fluid from the fluid pump 462 (see FIG. 3) flows into the inside of the diverging tank 464 via the aforesaid duct 469. Besides, one-side ends of the ducts 469 are individually connected even to one-side ends of the outflow portions 464B1 to 464B9 which project outwardly, respectively, and the cooling fluid within the diverging tank 464 flows out toward the element cooling ducts 463 (see FIG. 4) via the respective aforesaid ducts 469.

Similar to the diverging tank 464, as shown in FIG. 6, the converging tank 465, having an overall substantially cylindrical shape, is made up of a sealed container-like member made of metal such as aluminum, and temporarily stores therewithin the cooling fluid.

Cooling fluid inflow portions 465A1 to 465A9 and a cooling fluid outflow portion 465B are formed in the periphery of this converging tank 465.

These inflow portions 465A1 to 465A9 and outflow portion 465B, made up of tubular members, are disposed so as to project inwardly and outwardly of the converging tank 465. And, one-side ends of the ducts 469 are individually connected to one-side ends of the inflow portions 465A1 to 465A9 which project outwardly, respectively, and the cooling fluids from the element cooling ducts 463 (see FIG. 4) flow into the inside of the converging tank 465 via the respective aforesaid ducts 469. Besides, one end of the duct 469 is connected even to one end of the outflow portion 465B which projects outwardly, and the cooling fluid within the converging tank 465 flows out toward the radiator 466 via the aforesaid duct 469.

Referring back to FIGS. 2 and 3, as shown in FIG. 3, the radiator 466 includes a tubular member 4661 through which the cooling fluid flows and a plurality of radiating fins 4662 connected to this tubular member.

The tubular member 4661 is made up of a member having a high heat conductance, such as aluminum, and the cooling fluid flowing in from an inflow portion 4661A flows through the inside thereof toward an outflow portion 4661B. The inflow portion 4661A of the tubular member 4661 and the outflow portion 465B of the converging tank 465 are connected together via the duct 469, and the outflow portion 4661B of the tubular member 4661 and the main tank 461 are connected together via the duct 469.

The plurality of radiating fins 4662, made up of a plate-like member having high heat conductance, such as aluminum, are disposed in parallel. Besides, the axial fan 467 is configured to blow cooling air against one surface side of the radiator 466.

And, in the radiator 466, heat of the cooling fluid flowing in the tubular member 4661 is radiated via the radiating fins 4662, and the heat radiation is promoted by the supply of cooling air from the axial fan 467.

Additionally, the ducts 469 use as their molding material, for example, metal such as aluminum, and may use other material such as plastic.

The cooling fluid uses, for example, ethylene glycol that is a transparent nonvolatile liquid, and may use other liquid. Additionally, the cooling fluid of the invention is not limited to a liquid, but may use a gas, and may also use a liquid and solid mixture and the like.

As described above, in the liquid cooling unit 46, the cooling fluid flows, via the ducts 469, through the main tank 461, fluid pump 462, diverging tank 464, element cooling ducts 463, converging tank 465, and radiator 466, in the order named. And, the aforesaid cooling fluid returns to the main tank 461 from the radiator 466, and thus flows repeatedly and circulates through the aforesaid path.

And, in the liquid cooling unit 46, the cooling fluid flows through the element cooling ducts 463, thereby appropriately removing the heat of the elements 441, 442, 443 of the optical device 44 which occurs due to illumination of luminous fluxes and the like, thus suppressing a rise in temperature of the elements 441, 442, 443. The heat of the elements 441, 442, 443 is transferred to the cooling fluids in the element cooling ducts 463 via the element holding frames.

Element Holding Frames and Element Cooling Ducts

The element holding frames and element cooling ducts will now be described. The frames and ducts for the red color will be representatively described here, but the same applies to those for the green and blue colors.

Figure 7:
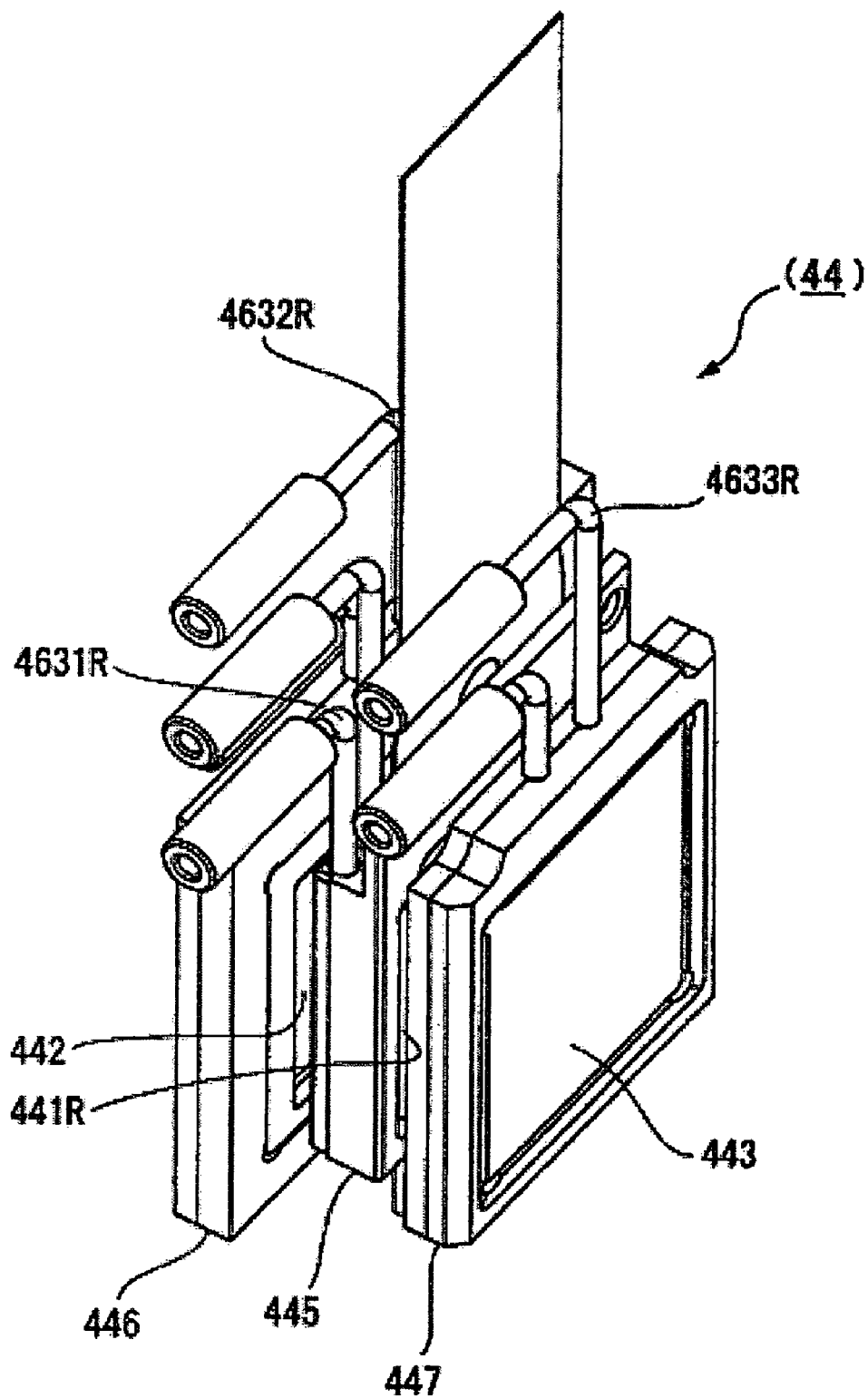
FIG. 7 is a partial perspective view showing a configuration of a red light panel of the optical device.

FIG. 7 is a partial perspective view showing a configuration of the red color panel of the optical device 44.

As shown in FIG. 7, as for the red color, the periphery of the liquid crystal panel 441R is held by a liquid crystal panel holding frame 445. The periphery of the incidence side polarizing plate 442 is held by an incidence side polarizing plate holding frame 446. And, the periphery of the emergence side polarizing plate 443 is held by an emergence side polarizing plate holding frame 447. The holding frames 445, 446, 447 have to-be-described openings, respectively, which correspond to the image forming region of the liquid crystal panel 441R, and a luminous flux passes through these openings.

And, within the liquid crystal panel holding frame 445, the liquid crystal panel cooling duct 4631R is disposed along the periphery of the liquid crystal panel 441R. Within the incidence side polarizing plate holding frame 446, the incidence side polarizing plate cooling duct 4632R is disposed along the periphery of the incidence side polarizing plate 442. And, within the emergence side polarizing plate holding frame 447, the emergence side polarizing plate cooling duct 4633R is disposed along the periphery of the emergence side polarizing plate 443.

Figure 8:
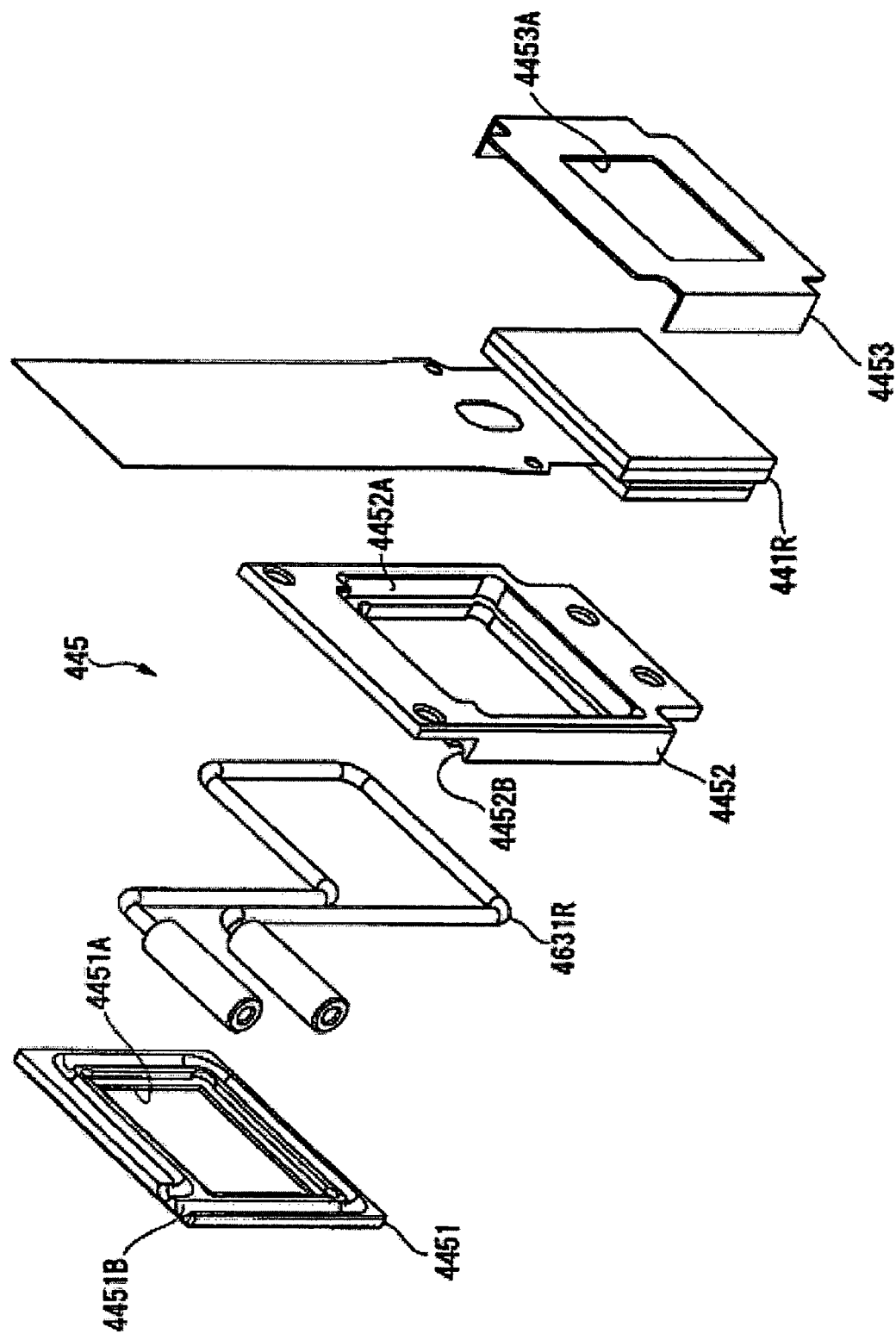
FIG. 8 is an exploded perspective view of a liquid crystal panel holding frame.
Figure 9A:
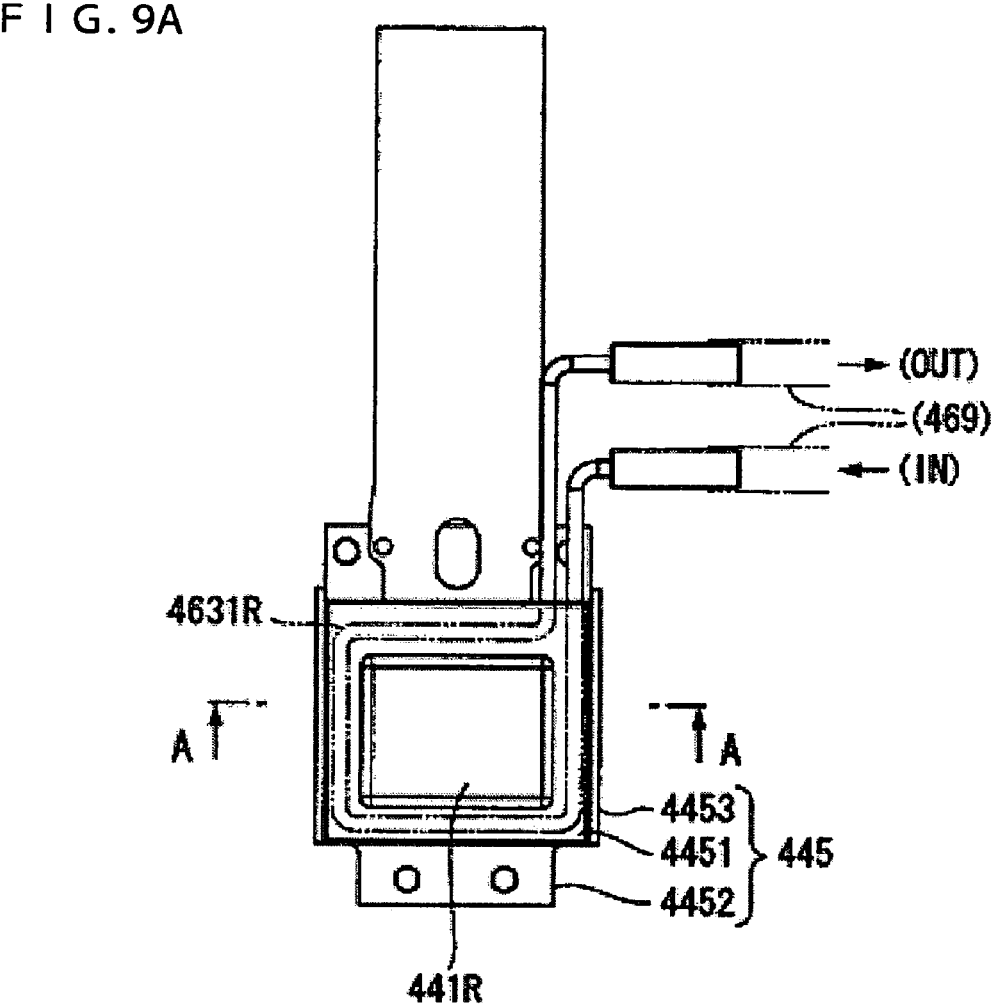
FIG. 9A is an assembly front view of the liquid crystal panel holding frame.
Figure 9B:
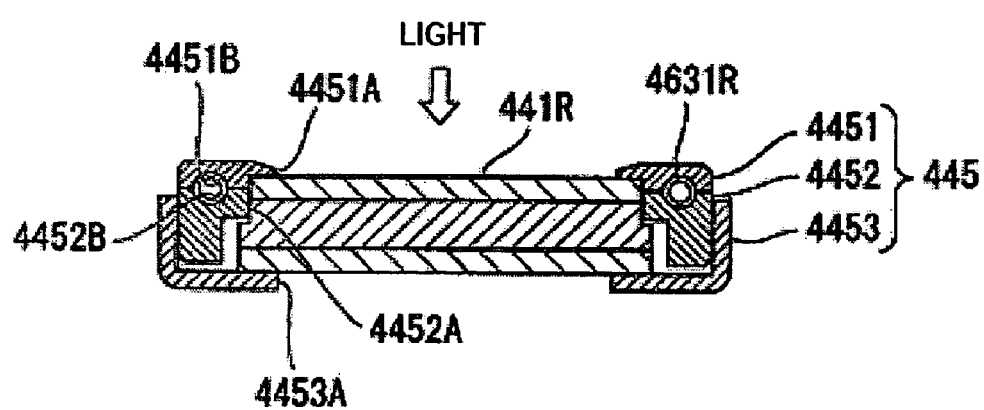
FIG. 9B is a section view taken along line A-A shown in FIG. 9A.

FIG. 8 is an exploded perspective view of the liquid crystal panel holding frame 445, FIG. 9A an assembly front view of the liquid crystal panel holding frame 445, and FIG. 9B a section view taken along line A-A shown in FIG. 9A.

As shown in FIG. 8, the liquid crystal panel holding frame 445 includes a pair of frame-like members 4451, 4452 and a liquid crystal fixing plate 4453.

Here, the liquid crystal panel 441R, which is of transmission type, has a configuration such that a liquid crystal layer is hermetically sealed between a pair of transparent substrates. The pair of substrates include a drive substrate and an opposite substrate. The drive substrate is formed with a data line, a scan line, a switching element, a pixel electrode, and the like which are for applying a drive voltage to a liquid crystal. And, the opposite substrate is formed with a common electrode, a black matrix, and the like.

The frame-like members 4451, 4452, which are frame bodies having a substantially rectangular shape in plan view, have: rectangular openings 4451A, 4452A corresponding to the image forming region of the liquid crystal panel 441R; and grooves 4451B, 4452B for housing the liquid crystal panel cooling duct 4631R. The frame-like members 4451, 4452 are disposed opposite each other with the liquid crystal panel cooling duct 4631R sandwiched therebetween. The frame-like members 4451, 4452 preferably use a good conductor of heat made up of a material having high thermal conductivity. Various metals are applied thereto, such for example as aluminum (234 W/(m·K)), magnesium (156 W/(m·K)), their alloy (aluminum die-casting alloy (about 100 W/(m·K)), or Mg—Al—Zn alloy (about 50 W/(m·K)). Besides, the frame-like members 4451, 4452 are not limited to being made of the metal material, but may be made of other material (such as a resin material) having high thermal conductivity (e.g., 5 W/(m·K) or higher).

As shown in FIG. 8, the liquid crystal panel fixing plate 4453 is made up of a plate-like member having a rectangular opening 4453A which corresponds to the image forming region of the liquid crystal panel 441R. And, the liquid crystal panel fixing plate 4453 is fixed to the frame-like member 4452 with the liquid crystal panel 441R sandwiched therebetween. As shown in FIG. 9B, this liquid crystal panel fixing plate 4453 is disposed in contact with the liquid crystal panel 441R. And, the liquid crystal panel fixing plate 4453 has the function of closely attaching and thermally connecting the frame-like members 4451, 4452 to the liquid crystal panel 441R, and also has the function of radiating the heat of the liquid crystal panel 441R. Besides, part of the heat of the liquid crystal panel 441R is transferred to the frame-like members 4451, 4452 via the liquid crystal panel fixing plate 4453.

The liquid crystal panel cooling duct 4631R is made up of, for example, a pipe or tube that has an annular cross-section and extends along its central axis. And, as shown in FIG. 8, the liquid crystal panel cooling duct 4631R is bent in response to the shape of the grooves 4451B, 4452B of the frame-like members 4451, 4452. The liquid crystal panel cooling duct 4631R preferably uses a good conductor of heat made up of a material having high thermal conductivity. Various metals are applied thereto, such for example as aluminum, copper, stainless steel, or their alloy. Besides, the liquid crystal panel cooling duct 4631R is not limited to being made of the metal material, but may be made of other material (such as a resin material) having high thermal conductivity (e.g., 5 W/(m·K) or higher).

Specifically, as shown in FIGS. 9A and 9B, the liquid crystal panel cooling duct 4631R is substantially entirely circumferentially disposed outside and along the periphery of the liquid crystal panel 441R. That is, in the inner surfaces (mating surfaces or opposite surfaces) of the frame-like members 4451, 4452, the grooves 4451B, 4452B having a substantially semicircular shape in cross-section are substantially entirely circumferentially formed along the edges of the openings 4451A, 4452A. The grooves 4451B, 4452B are in a substantially mirror-symmetrically shaped relationship with each other. And, the frame-like members 4451, 4452 are connected to each other with the liquid crystal panel cooling duct 4631R housed in the grooves 4451B, 4452B. In this embodiment, the liquid crystal panel cooling duct 4631R is a round pipe, and the outside diameter thereof is on the same order of magnitude of the thickness of the liquid crystal panel 441R.

Various methods are applicable to the connection between the frame-like members 4451, 4452, such as a mechanical connection by fastening with a screw or the like, adhesion, welding, fitting, or the like. The connecting method preferably uses a method that provides high heat conductance between the liquid crystal panel cooling duct 4631R and the frame-like members 4451, 4452 (or the liquid crystal panel 441R).

Additionally, a specific connecting structure of the frame-like members 4451, 4452 will be described later.

The cooling fluid inflow portion (IN) is disposed at one end of the liquid crystal panel cooling duct 4631R, and the cooling fluid outflow portion (OUT) is disposed at the other end thereof. The inflow and outflow portions of the liquid crystal panel cooling duct 4631R are connected to cooling fluid circulation piping (the ducts 469).

The cooling fluid flowing into the liquid crystal panel cooling duct 4631R from the inflow portion (IN) flows substantially entirely circumferentially along the periphery of the liquid crystal penal 441R, and flows out from the outflow portion (OUT). Besides, the aforesaid cooling fluid draws heat from the liquid crystal panel 441R while flowing through the liquid crystal panel cooling duct 4631R. That is, the heat of the liquid crystal panel 441R is transferred to the cooling fluid in the liquid crystal panel cooling duct 4631R via the frame-like members 4451, 4452 and thus is carried to the outside.

Here, in this liquid crystal panel holding frame 445, as shown in FIG. 9B, the liquid crystal panel cooling duct 4631R is disposed against the luminous flux incidence surface side of the liquid crystal panel 441R in the direction of thickness of the liquid crystal panel 441R. The liquid crystal panel 441R generally has a large amount of heat absorption on the incidence surface side on which the black matrix is disposed than on the emergence surface side. Consequently, the liquid crystal panel cooling duct 4631R is disposed against the incidence surface side which is liable to an increase in temperature, thereby efficiently removing the heat of the liquid crystal panel 441R.

Furthermore, the side surface of the liquid crystal panel 441R is provided with a shoulder, and the emergence surface is larger in area than the incidence surface. Consequently, the liquid crystal panel cooling duct 4631R is disposed against the incidence surface side which is smaller in area, thereby increasing the efficiency of component disposition and reducing the size of the apparatus.

Figure 10A:
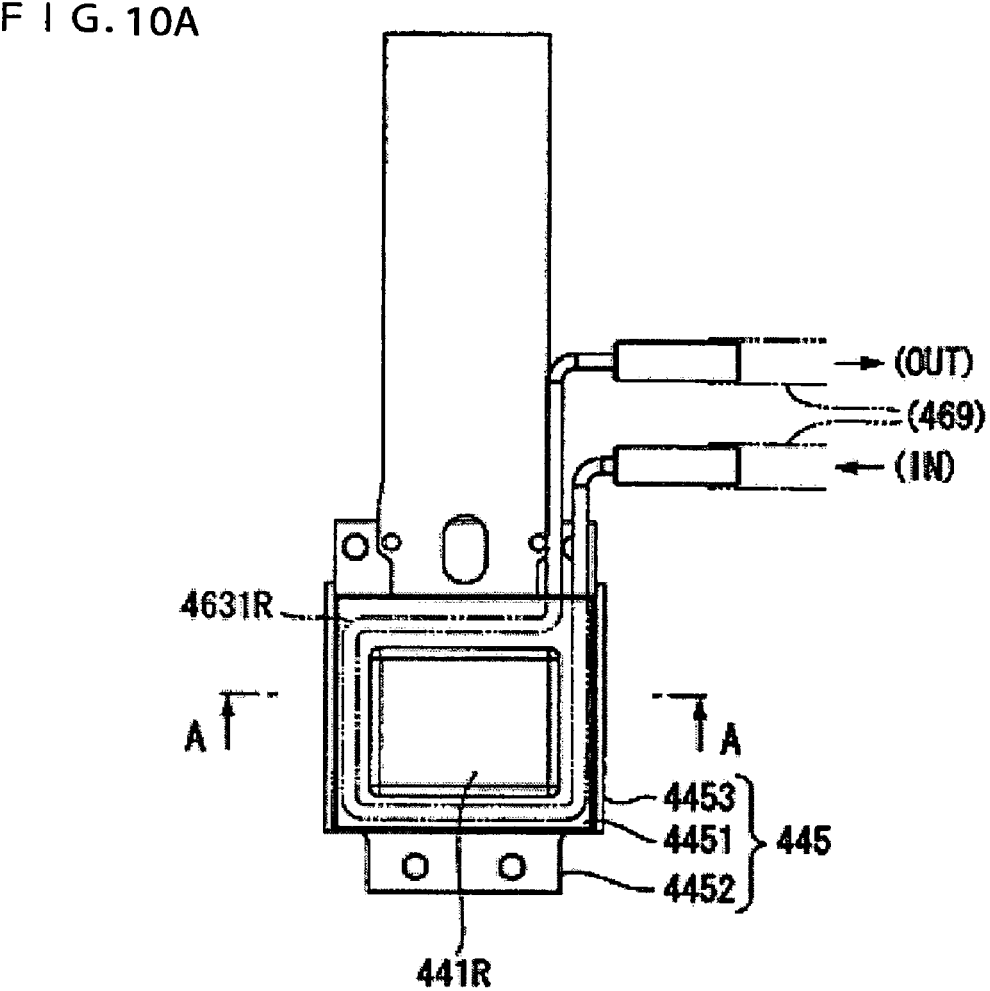
FIG. 10A is an assembly front view of an incidence side polarizing plate holding frame.
Figure 10B:
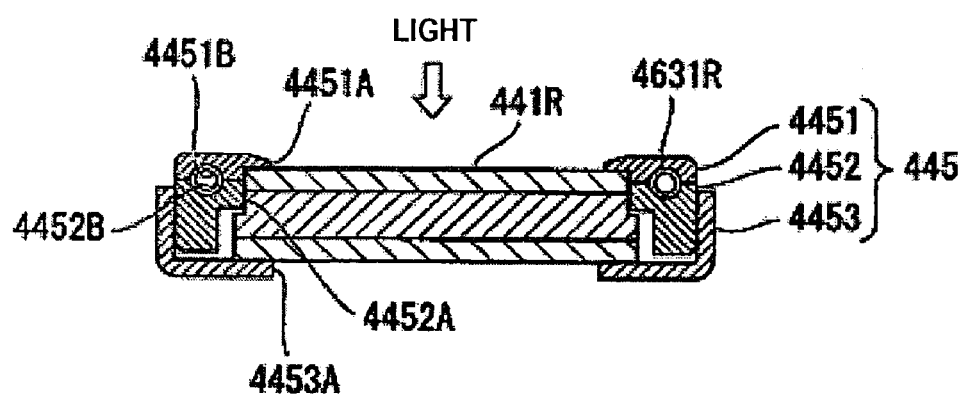
FIG. 10B is a section view taken along line B-B shown in FIG. 10A.

FIG. 10A is an assembly front view of the incidence side polarizing plate holding frame 446, and FIG. 10B is a section view taken along line B-B shown in FIG. 10A.

The incidence side polarizing plate holding frame 446 has generally the same configuration as the liquid crystal panel holding frame 445 (see FIG. 8) and, as shown in FIGS. 10A and 10B, includes a pair of frame-like members 4461, 4462 and a polarizing plate fixing plate 4463.

Here, the incidence side polarizing plate 442 is configured such that a polarizing film is attached on a translucent substrate.

The frame-like members 4461, 4462 are frame bodies having a substantially rectangular shape in plan view. And, the frame-like members 4461, 4462 have: rectangular openings 4461A and 4462A which correspond to the light transmission region of the incidence side polarizing plate 442; and grooves 4461B, 4462B for housing the incidence side polarizing plate cooling duct 4632R, respectively. The frame-like members 4461, 4462 are disposed with the incidence side polarizing plate cooling duct 4632R sandwiched therebetween. The frame-like members 4461, 4462 preferably use a good conductor of heat made up of a material having high thermal conductivity. And, various metals are applied thereto, such for example as aluminum, magnesium, or their alloy. Besides, the frame-like members 4461, 4462 are not limited to being made of the metal material, but may be made of other material (such as a resin material) having high thermal conductivity (e.g., 5 W/(m·K) or higher).

As shown in FIGS. 10A and 10B, the polarizing plate fixing plate 4463 is made up of a plate-like member having a rectangular opening 4463A which corresponds to the light transmission region of the incidence side polarizing plate 442. And, the polarizing plate fixing plate 4463 is fixed to the frame-like member 4461 with the incidence side polarizing plate 442 sandwiched therebetween. As shown in FIG. 10B, this polarizing plate fixing plate 4463 is disposed in contact with the incidence side polarizing plate 442. And, the polarizing plate fixing plate 4463 has the function of closely attaching and thermally connecting the frame-like member 4461, 4462 to the incidence side polarizing plate 442, and also has the function of radiating the heat of the incidence side polarizing plate 442. Besides, part of the heat of the incidence side polarizing plate 442 is transferred to the frame-like members 4461, 4462 via the polarizing plate fixing plate 4463.

The incidence side polarizing plate cooling duct 4632R is made up of a seamless pipe formed, for example, by drawing or ironing. And, the incidence side polarizing plate cooling duct 4632R is bent in response to the shape of the grooves 4461B, 4462B of the frame-like members 4461, 4462. The incidence side polarizing plate cooling duct 4632R preferably uses a good conductor of heat made up of a material having high thermal conductivity. Various metals are applied thereto, such for example as aluminum, copper, stainless steel, or their alloy. Besides, the incidence side polarizing plate cooling duct 4632R is not limited to being made of the metal material, but may be made of other material (such as a resin material) having high thermal conductivity (e.g., 5 W/(m·K) or higher).

Specifically, as shown in FIGS. 10A and 10B, the incidence side polarizing plate cooling duct 4632R is substantially entirely circumferentially disposed outside and along the periphery of the incidence side polarizing plate 442. That is, in the inner surfaces (mating surfaces or opposite surfaces) of the frame-like members 4461, 4462, the grooves 4461B, 4462B having a substantially semicircular shape in cross-section are substantially entirely circumferentially formed along the edges of the openings 4461A, 4462A. The grooves 4461B, 4462B are in a substantially mirror-symmetrically shaped relationship with each other. And, the frame-like members 4461, 4462 are connected to each other with the incidence side polarizing plate cooling duct 4632R housed in the grooves 4461B and 4462B. In this embodiment, the incidence side polarizing plate cooling duct 4632R is a round pipe, and the outside diameter thereof is on the same order of magnitude of the thickness of the incidence side polarizing plate 442.

Various methods are applicable to the connection between the frame-like members 4461 and 4462, such as a mechanical connection by fastening with a screw or the like, adhesion, welding, fitting, or the like. The connecting method preferably uses a method that provides high heat conductance between the incidence side polarizing plate cooling duct 4632R and the frame-like members 4461, 4462 (or the incidence side polarizing plate 442).

The cooling fluid inflow portion (IN) is disposed at one end of the incidence side polarizing plate cooling duct 4632R, and the cooling fluid outflow portion (OUT) is disposed at the other end thereof. The inflow and outflow portions of the incidence side polarizing plate cooling duct 4632R are connected to the cooling fluid circulation piping (the ducts 469).

The cooling fluid flowing into the incidence side polarizing plate cooling duct 4632R from the inflow portion (IN) flows substantially entirely circumferentially along the periphery of the incidence side polarizing plate 442, and flows out from the outflow portion (OUT). Besides, the aforesaid cooling fluid draws heat from the incidence side polarizing plate 442 while flowing through the incidence side polarizing plate cooling duct 4632R. That is, the heat of the incidence side polarizing plate 442 is transferred to the cooling fluid in the incidence side polarizing plate cooling duct 4632R via the frame-like members 4461, 4462 and thus is carried to the outside.

Figure 11A:
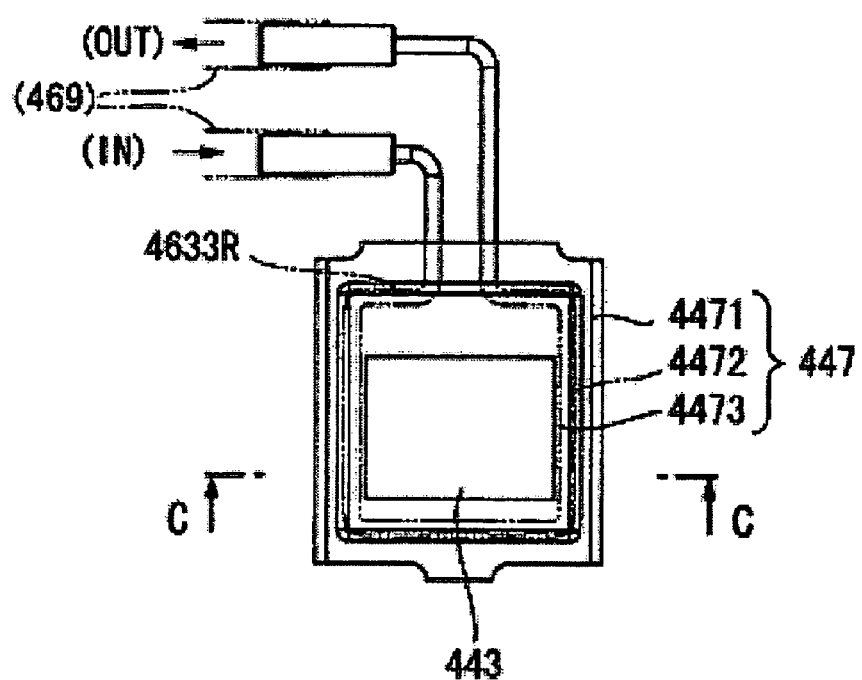
FIG. 11A is an assembly front view of an emergence side polarizing plate holding frame.
Figure 11B:
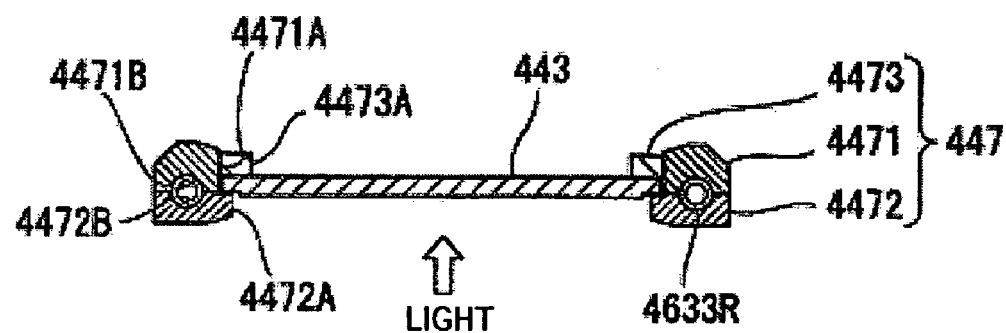
FIG. 11B is a section view taken along line C-C shown in FIG. 11A.

FIG. 11A is an assembly front view of the emergence side polarizing plate holding frame 447, and FIG. 11B is a section view taken along line C-C shown in FIG. 11A.

The emergence side polarizing plate holding frame 447 has the same configuration as the incidence side polarizing plate holding frame 446 (see FIGS. 10A and 10B) and, as shown in FIGS. 11A and 11B, includes a pair of frame-like members 4471, 4472 and a polarizing plate fixing plate 4473.

Here, similar to the incidence side polarizing plate 442, the emergence side polarizing plate 443 is configured such that a polarizing film is attached on a translucent substrate.

The frame-like members 4471, 4472 are frame bodies having a substantially rectangular shape in plan view. And, the frame-like members 4471, 4472 have: rectangular openings 4471A, 4472A which correspond to the light transmission region of the emergence side polarizing plate 443; and grooves 4471B, 4472B for housing the emergence side polarizing plate cooling duct 4633R, respectively. The frame-like members 4471, 4472 are disposed with the emergence side polarizing plate cooling duct 4633R sandwiched therebetween. The frame-like members 4471, 4472 preferably use a good conductor of heat made up of a material having high thermal conductivity. And, various metals are applied thereto, such for example as aluminum, magnesium, or their alloy. Besides, the frame-like members 4471, 4472 are not limited to being made of the metal material, but may be made of other material (such as a resin material) having high thermal conductivity (e.g., 5 W/(m·K) or higher).

As shown in FIGS. 11A and 11B, the polarizing plate fixing plate 4473 is made up of a plate-like member having a rectangular opening 4473A which corresponds to the light transmission region of the emergence side polarizing plate 443. And, the polarizing plate fixing plate 4473 is fixed to the frame-like member 4471 with the emergence side polarizing plate 443 sandwiched therebetween. As shown in FIG. 11B, this polarizing plate fixing plate 4473 is disposed in contact with the emergence side polarizing plate 443. And, the polarizing plate fixing plate 4473 has the function of closely attaching and thermally connecting the frame-like members 4471, 4472 to the emergence side polarizing plate 443, and also has the function of radiating the heat of the emergence side polarizing plate 443. Besides, part of the heat of the emergence side polarizing plate 443 is transferred to the frame-like members 4471, 4472 via the polarizing plate fixing plate 4473.

The emergence side polarizing plate cooling duct 4633R is made up of a seamless pipe formed, for example, by drawing. And, the emergence side polarizing plate cooling duct 4633R is bent in response to the shape of the grooves 4471B, 4472B of the frame-like members 4471, 4472. The emergence side polarizing plate cooling duct 4633R preferably uses a good conductor of heat made up of a material having high thermal conductivity. Various metals are applied thereto, such for example as aluminum, copper, stainless steel, or their alloy. Besides, the emergence side polarizing plate cooling duct 4633R is not limited to being made of the metal material, but may be made of other material (such as a resin material) having high thermal conductivity (e.g., 5 W/(m·K) or higher).

Specifically, as shown in FIGS. 11A and 11B, the emergence side polarizing plate cooling duct 4633R is substantially entirely circumferentially disposed outside and along the periphery of the emergence side polarizing plate 443. That is, in the inner surfaces (mating surfaces or opposite surfaces) of the frame-like members 4471, 4472, the grooves 4471B, 4472B having a substantially semicircular shape in cross-section are substantially entirely circumferentially formed along the edges of the openings 4471A, 4472A. The grooves 4471B, 4472B are in a substantially mirror-symmetrically shaped relationship with each other. And, the frame-like members 4471, 4472 are connected to each other with the emergence side polarizing plate cooling duct 4633R housed in the grooves 4471B, 4472B. In this embodiment, the emergence side polarizing plate cooling duct 4633R is a round pipe, and the outside diameter thereof is on the same order of magnitude of the thickness of the emergence side polarizing plate 443.

Various methods are applicable to the connection between the frame-like members 4471, 4472, such as a mechanical connection by fastening with a screw or the like, adhesion, welding, fitting, or the like. The connecting method preferably uses a method that provides high heat conductance between the emergence side polarizing plate cooling duct 4633R and the frame-like members 4471, 4472 (or the emergence side polarizing plate 443).

The cooling fluid inflow portion (IN) is disposed at one end of the emergence side polarizing plate cooling duct 4633R, and the cooling fluid outflow portion (OUT) is disposed at the other end thereof. The inflow and outflow portions of the emergence side polarizing plate cooling duct 4633R are connected to the cooling fluid circulation piping (the ducts 469).

The cooling fluid flowing into the emergence side polarizing plate cooling duct 4633R from the inflow portion (IN) flows substantially entirely circumferentially along the periphery of the emergence side polarizing plate 443, and flows out from the outflow portion (OUT). Besides, the aforesaid cooling fluid draws heat from the emergence side polarizing plate 443 while flowing through the emergence side polarizing plate cooling duct 4633R. That is, the heat of the emergence side polarizing plate 443 is transferred to the cooling fluid in the emergence side polarizing plate cooling duct 4633R via the frame-like members 4471, 4472 and thus is carried to the outside.

In this embodiment, as for the red light, the element cooling ducts 4631R, 4632R, 4633R are thus disposed within the holding frames 445, 446, 447 for the respective elements: the liquid crystal panel 441R, incidence side polarizing plate 442, and emergence side polarizing plate 443. And, the heat of the elements 441R, 442, 443 is appropriately removed by the cooling fluids flowing through these element cooling ducts 4631R, 4632R, 4633R. That is, the elements 441R, 442, 443 and the element cooling ducts 4631R, 4632R, 4633R are thermally connected together via the holding frames 445, 446, 447. And, heat is exchanged between the elements 441R, 442, 443 and the element cooling ducts 4631R, 4632R, 4633R. Therefore, the heat of the elements 441R, 442, 443 is transferred to the cooling fluids in the element cooling ducts 4631R, 4632R, 4633R via the holding frames 445, 446, 447. And, the heat of the elements 441R, 442, 443 transfers to the cooling fluids, thereby cooling the elements 441R, 442, 443.

Besides, in this embodiment, the element cooling ducts 4631R, 4632R, 4633R are substantially entirely circumferentially disposed along the peripheries of the elements 441R, 442, 443. Therefore, the heat transfer area is increased, thus efficiently cooling the elements.

Moreover, the cooling fluid paths (the element cooling ducts 4631R, 4632R, 4633R) are disposed along the peripheries of the elements 441R, 442, 443, thereby preventing image forming luminous fluxes from passing through the cooling fluids. This avoids the problem in which the images of air bubbles, dust particles, or the like in the cooling fluid are included in an optical image formed on the liquid crystal panel 441R, or in which the optical image fluctuates with a cooling fluid temperature distribution.

Besides, in this embodiment, the cooling fluid paths in the peripheries of the elements 441R, 442, 443 are formed by the ducts (element cooling ducts 4631R, 4632R, 4633R), thus requiring only a comparatively small number of junctions for path formation. The number or area of such junctions is small, thereby simplifying the configuration and preventing the cooling fluids from leaking.

According to this embodiment, it is thus possible to effectively suppressing a rise in temperature of the elements 441R, 442, 443 while preventing the occurrence of problems caused by using the cooling fluids.

Additionally, in such a configuration that the element cooling ducts 4631R, 4632R, 4633R are disposed within the element holding frames 445, 446, 447, the holding frames 445, 446, 447 serve as both the holding and cooling sections for the elements 441R, 442, 443. As a result, such a configuration facilitates a reduction in size and thus is preferably applicable to small size optical elements.

For example, in this embodiment, the element cooling ducts 4631R, 4632R, 4633R having an outside diameter of the same order of magnitude of the thickness of the elements are disposed outside the peripheries of the elements 441R, 442, 443, thus suppressing an increase in size in a thickness direction which results from the provision of the cooling fluid paths.

Figure 34A:
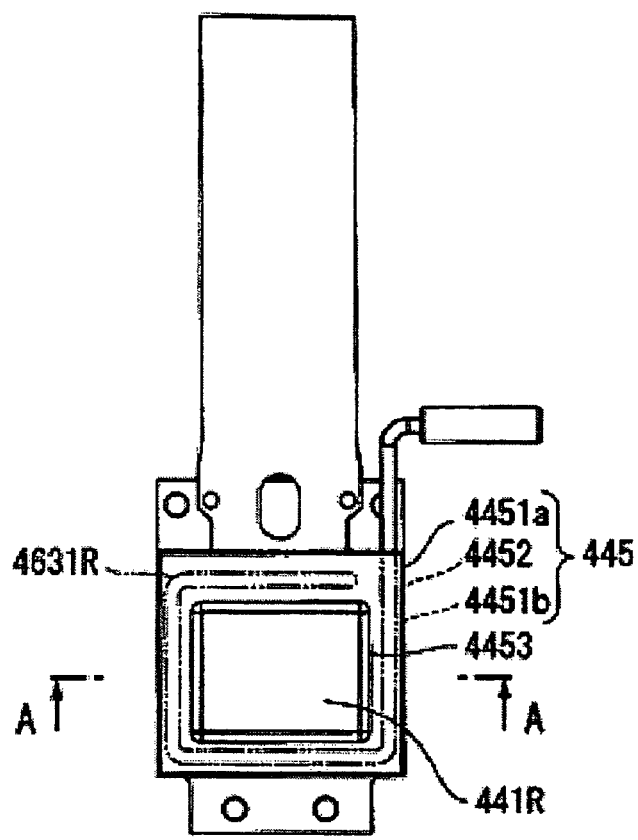
Figure 34B:
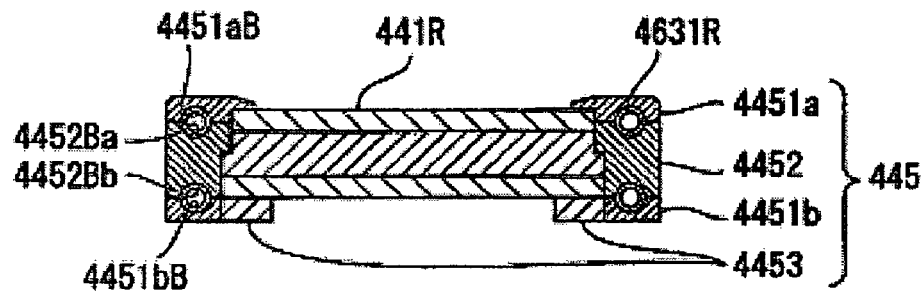
Figure 34C:
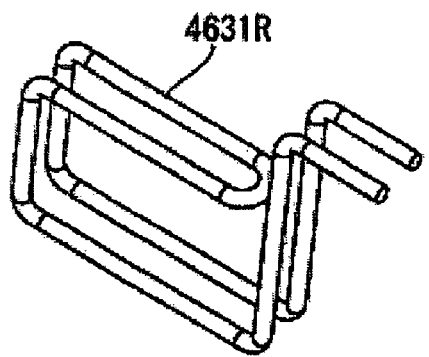

FIGS. 34A to 34C show a modified example of the liquid crystal panel holding frame 445 or liquid crystal panel cooling duct 4631R of FIGS. 9A and 9B. FIG. 34A is an assembly front view of the liquid crystal panel holding frame 445, FIG. 34B a section view taken along line A-A shown in FIG. 34A, and FIG. 34C a perspective view of the liquid crystal panel cooling duct 4631R.

In the example of FIGS. 34A to 34C, the liquid crystal panel cooling duct 4631R is disposed in multiple folds (in two folds in this example) in the direction of thickness of the liquid crystal panel 441R.

That is, as shown in FIGS. 34A to 34C, within the liquid crystal panel holding frame 445, the liquid crystal panel cooling duct 4631R having a circularly annular shape in cross-section extends substantially entirely circumferentially along the periphery of the liquid crystal panel 441R. The liquid crystal panel cooling duct 4631R is folded back at the end of the aforesaid substantially one round and extends substantially entirely circumferentially in the reverse direction. Such a duct shape can be formed by so-called forming. Besides, in the inner surfaces (mating surfaces or opposite surfaces) of frame-like members 4451a, 4451b, 4452, grooves 4451aB, 4451bB, 4452Ba, 4452Bb having a substantially semicircular shape in cross-section are substantially entirely circumferentially formed along the periphery of the liquid crystal panel 441R. The grooves 4451aB, 4452Ba are in a substantially mirror-symmetrically shaped relationship with the grooves 4451Ba, 4452Bb, respectively. And, the frame-like members 4451a, 4451b, 4452 are connected together with the liquid crystal panel cooling duct 4631R housed in the grooves 4451aB, 4451bB, 4452Ba, 4452Bb.

In this example, the liquid crystal panel cooling duct 4631R is disposed in multiple folds in the direction of thickness of the liquid crystal panel 441R. Therefore, the cooling region is increased in the thickness direction, thus enabling more effective cooling as a result. Additionally, the liquid crystal panel cooling duct 4631R may be disposed not only in two folds but in three or more folds. Besides, the incidence side polarizing plate cooling duct 4632R (see FIGS. 10A and 10B) and emergence side polarizing plate cooling duct 4633R (see FIGS. 11A and 11B) can also be modified in the same manner as the liquid crystal panel 4631R.

Figure 31A:
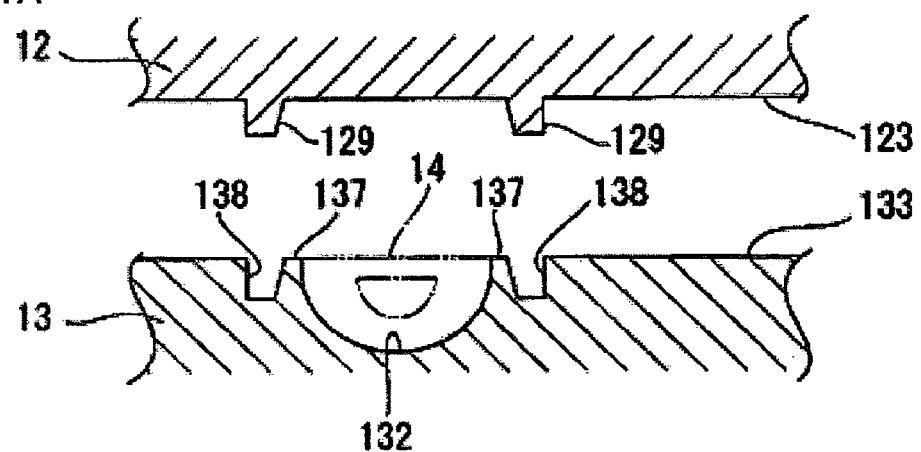
FIGS. 31A to 31B are illustrations showing a modified example of the manufacturing method of FIGS. 29A and 29B.
Figure 31B:
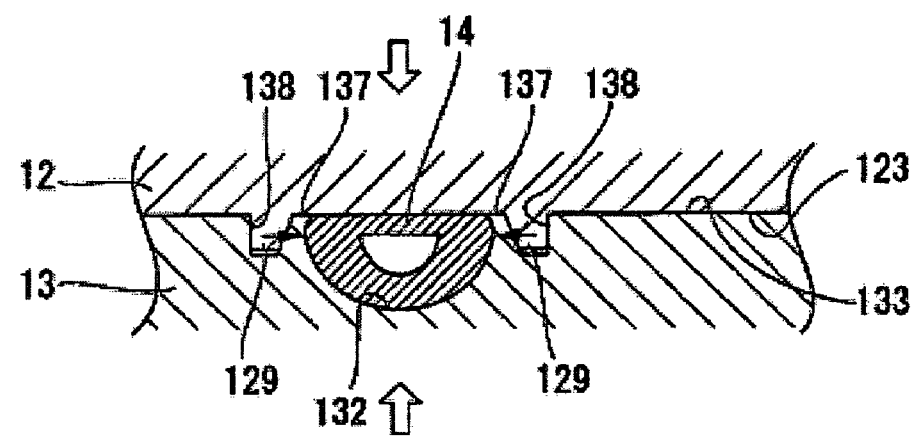
Figure 33A:
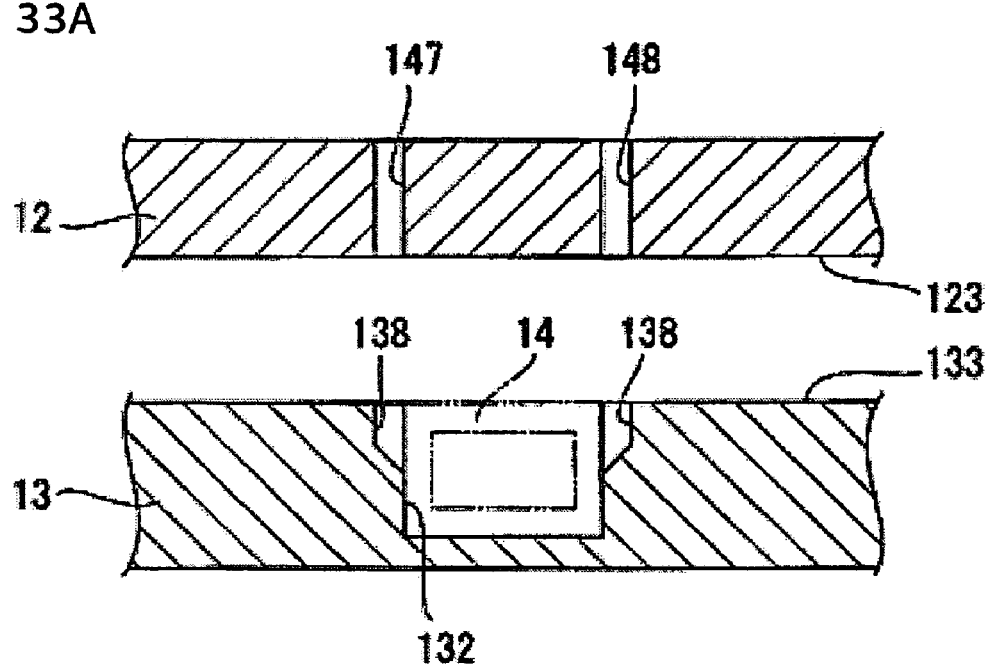
FIGS. 33A to 33B are illustrations showing a modified example of the manufacturing method of FIGS. 29A and 29B.
Figure 33B:
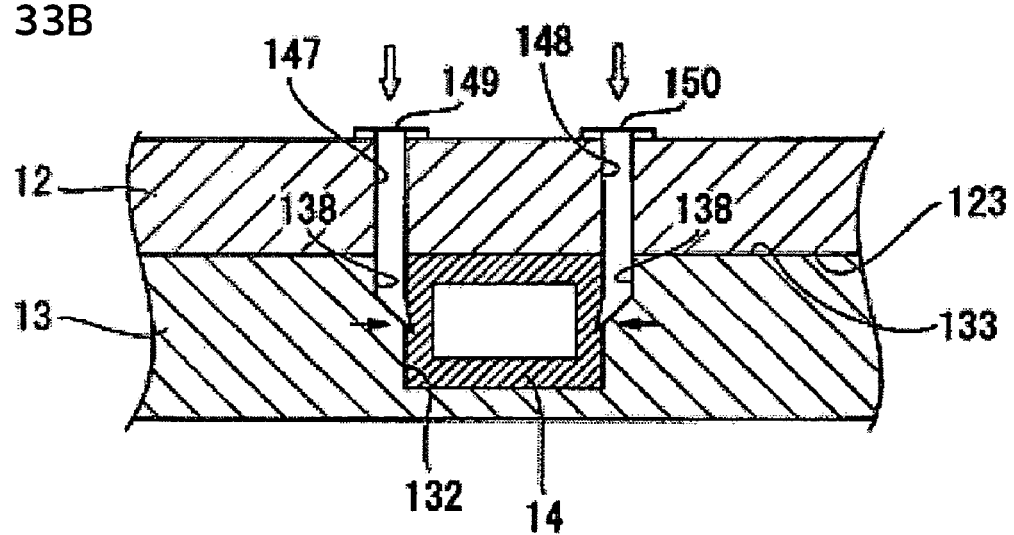

The above embodiment shows the duct having a round shape in cross-section as an example of the element cooling ducts 4631R, 4632R, 4633R. However, the element cooling ducts 4631R, 4632R, 4633R may use a duct such as having a semicircular shape in cross-section as shown in FIGS. 31A and 31B, a duct having a substantially rectangular shape in cross-section as shown in FIGS. 33A and 33B, or a duct having other cross-section shape.

Figure 35A:
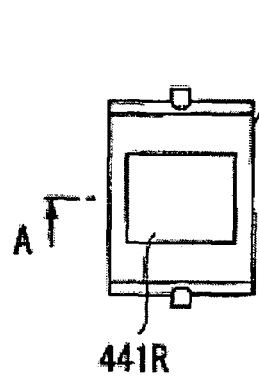
Figure 35B:
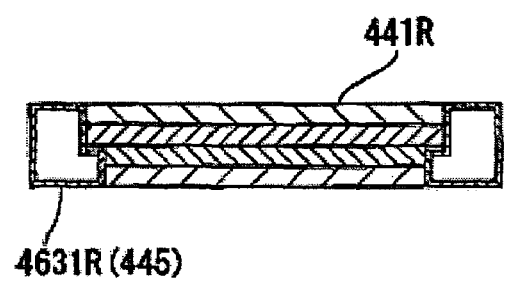

FIGS. 35A and 35B show another modified example of the liquid crystal panel holding frame 445 or liquid crystal panel cooling duct 4631R of FIGS. 9A and 9B. FIG. 35A is an assembly front view of the liquid crystal panel holding frame 445, and FIG. 35B is a section view taken along line A-A shown in FIG. 35A.

In the example of FIGS. 35A and 35B, the liquid crystal panel cooling duct 4631R is formed as the holding frame (liquid crystal panel holding frame 445) that holds the liquid crystal panel 441R.

That is, as shown in FIGS. 35A and 35B, the liquid crystal panel cooling duct 4631R having a substantially rectangular cross-section is disposed in frame-like fashion along the periphery of the liquid crystal panel 441R. And the liquid crystal panel 441R is held in the central opening of the liquid crystal panel cooling duct 4631R. The liquid crystal panel cooling duct 4631R has substantially the same thickness as the liquid crystal panel 441R.

In this example, the liquid crystal panel cooling duct 4631R is formed as the holding frame (liquid crystal panel holding frame 445) that holds the liquid crystal panel 441R. Therefore, heat is directly exchanged between the liquid crystal panel 441R and the liquid crystal panel cooling duct 4631R, so that the heat of the liquid crystal panel 441R is effectively removed by the cooling fluid.

Figure 36A:
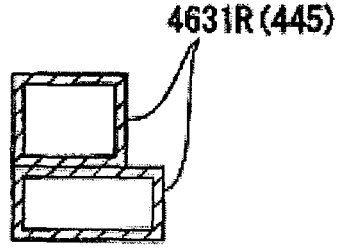
FIGS. 36A and 36B show a modified example of the liquid crystal panel of FIGS. 35A and 35B.
Figure 36B:
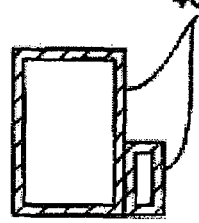

Additionally, as shown in FIGS. 36A and 36B, the liquid crystal panel cooling duct 4631R may be of a type having combined a plurality of duct-like members having a substantially rectangular cross-section. Besides, the liquid crystal panel cooling duct 4631R may be of a type having a spiral flow path, such as by disposing a plate-like member therein. The incidence side polarizing plate cooling duct 4632R (see FIGS. 10A and 10B) and emergence side polarizing plate cooling duct 4633R (see FIGS. 11A and 11B) can also be modified in the same manner as the liquid crystal panel cooling duct 4631R.

The panel configurations and cooling structures for the red light in the optical device 44 (see FIG. 4) have been described so far. The same applies to the green and blue lights, for each of which the elements (liquid crystal panel, incidence side polarizing plate, and emergence side polarizing plate) are individually held by the respective holding frames, and the element cooling ducts are disposed within these holding frames.

That is, in this embodiment, a total of nine optical elements including three liquid crystal panels 441R, 441G, 441B, three incidence side polarizing plates 442, and three emergence side polarizing plates 443 are individually cooled using the cooling fluids. The elements are individually cooled, thereby preventing the occurrence of problems caused with a rise in temperature of the elements.

Figure 12:
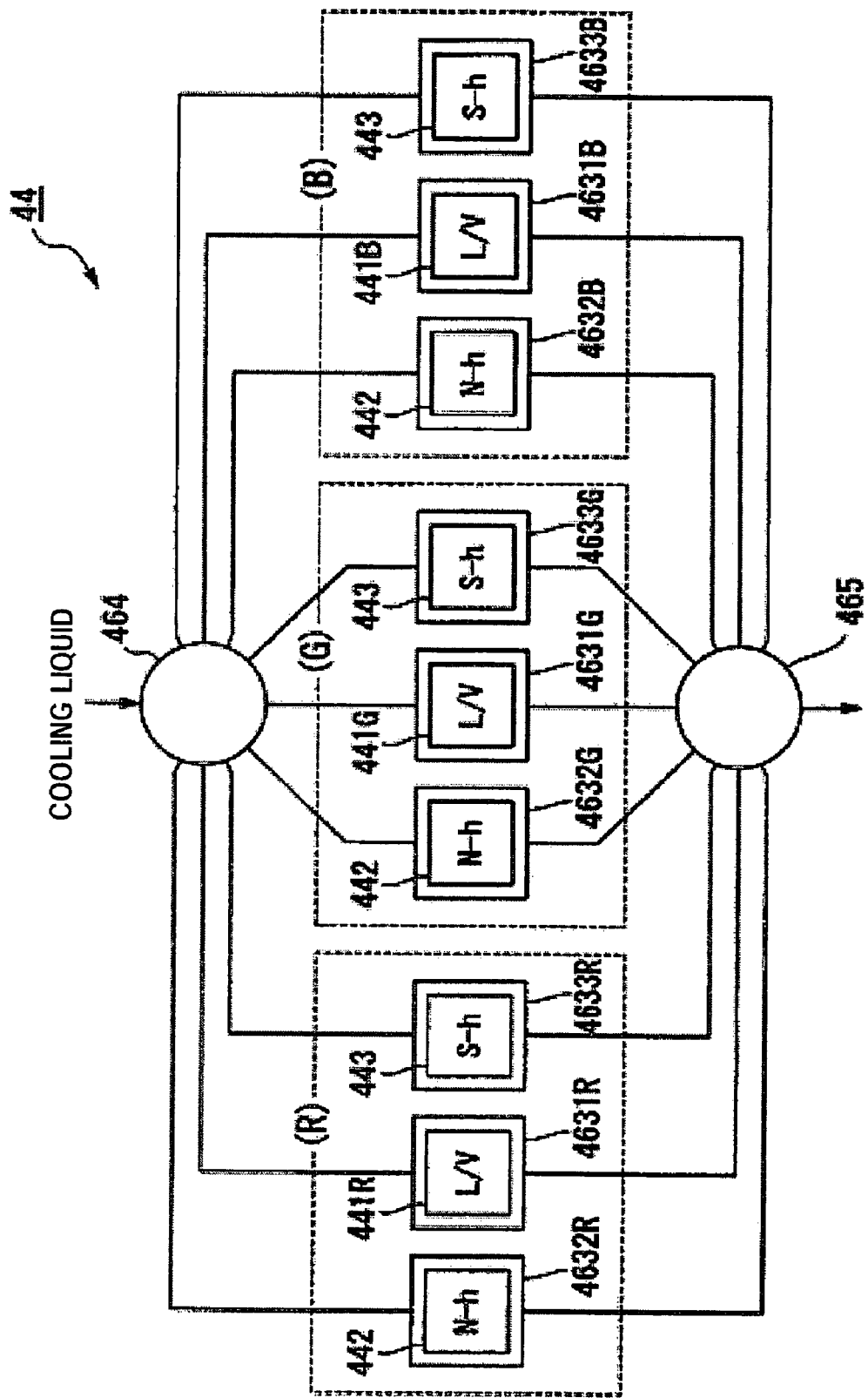
FIG. 12 is a ducting system diagram showing the flow of a cooling fluid in the optical device.

FIG. 12 is a ducting system diagram showing the flow of the cooling fluid in the aforesaid optical device 44.

As shown in FIG. 12, in this embodiment, a total of nine optical elements of the optical device 44, including the three liquid crystal panels 441R, 441G, 441B, three incidence side polarizing plates 442, and three emergence side polarizing plates 443, are provided with cooling fluid paths parallel to each other.

Specifically, three element cooling ducts for the red light, including the liquid crystal panel cooling duct 4631R, incidence side polarizing plate cooling duct 4632R, and emergence side polarizing plate cooling duct 4633R, each have one end connected to the diverging tank 464 and the other end connected to the converging tank 465. Similarly, three element cooling ducts 4631G, 4632G, 4633G for the green light and three element cooling ducts 4631B, 4632B, 4633B for the blue light also each have one end connected to the diverging tank 464 and the other end connected to the converging tank 465. As a result, the aforesaid nine element cooling ducts are disposed in parallel on the cooling fluid paths between the diverging tank 464 and the converging tank 465.

The cooling fluid diverges at the diverging tank 464 into a total of nine paths, three for each color, and the divergent cooling fluids flow in parallel through the nine element cooling ducts (4631R, 4632R, 4633R, 4631G, 4632G, 4633G, 4631B, 4632B, 4633B). The aforesaid nine element cooling ducts are disposed in parallel on the cooling fluid paths, so that the cooling fluids having substantially the same temperature flow into the element cooling ducts. The cooling fluids flow through the element cooling ducts along the peripheries of the elements, thereby cooling the elements and increasing the temperature of the cooling fluids flowing through the element cooling ducts. After this heat exchange, the cooling fluids converge within the converging tank 465 and are cooled by the previously described action of radiation at the radiator 466 (see FIG. 3). And, the cooling fluids having a reduced temperature are supplied again to the diverging tank 464.

In this embodiment, the aforesaid nine element cooling ducts which correspond to the nine optical elements are disposed in parallel on the cooling fluid paths. Therefore, the length of the cooling fluid paths extending from the diverging tank 464 to the converging tank 465 is comparatively short, and flow path resistance due to a pressure loss on these paths is low. Consequently, it is easy to secure a cooling fluid flow rate even when the element cooling ducts have a small diameter, and the cooling fluids having a comparatively low temperature are supplied to the elements, so that the elements are effectively cooled.

Additionally, the disposition of the element cooling ducts may be omitted from any element that generates less heat out of the aforesaid nine optical elements. For example, when the incidence side polarizing plate 442 or emergence side polarizing plate 443 is of a type having low luminous flux absorbance, such as an inorganic polarizing plate, the configuration can be such that the cooling ducts are omitted therefrom.

Besides, the configuration is not only such that all the plurality of element cooling ducts are disposed in parallel on the cooling fluid paths, but may also be such that at least part of them are disposed in series. In this case, their paths can be determined in response to the heating value of each element.

Figure 13:
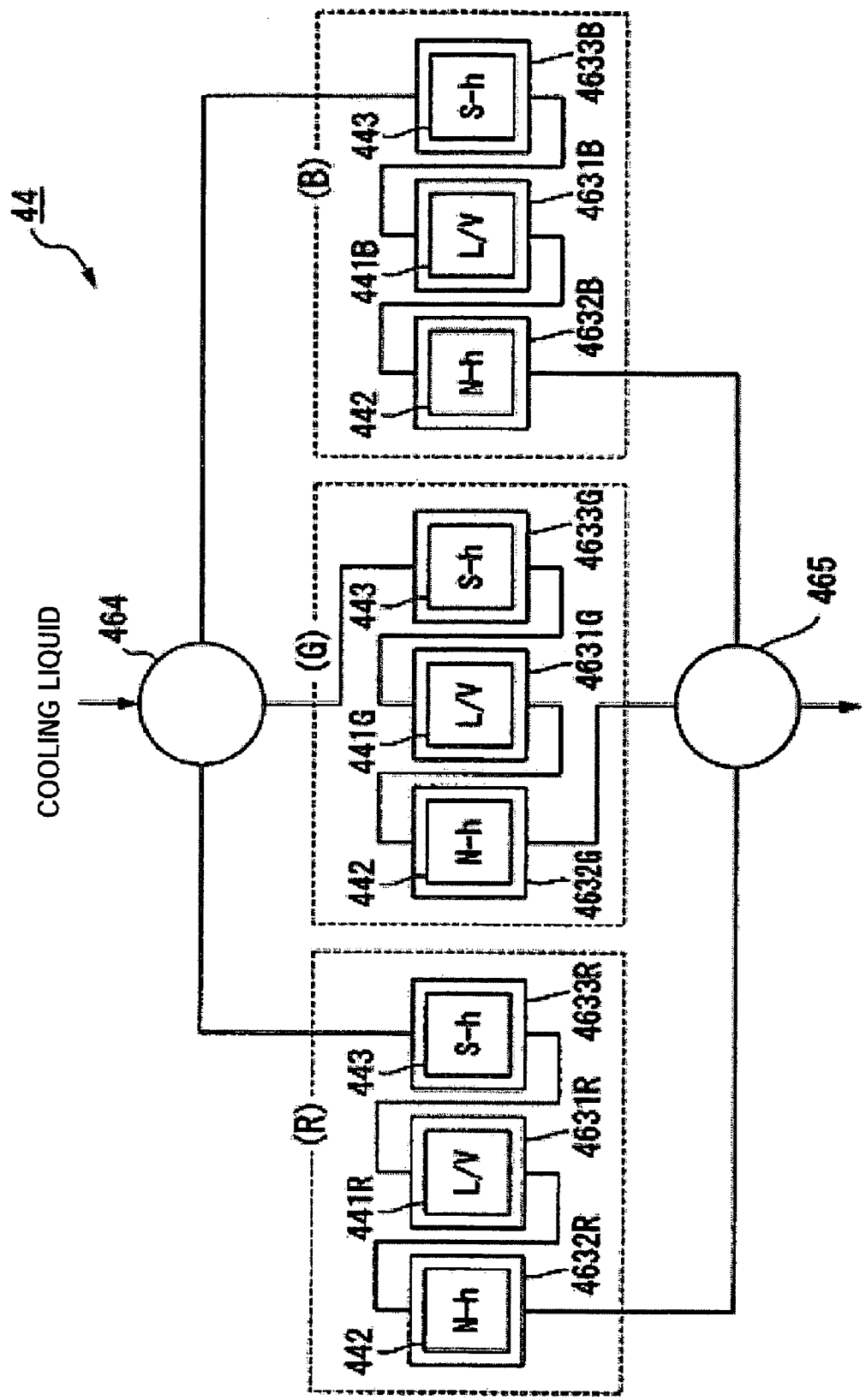
FIG. 13 shows a modified example of the ducting system.

FIG. 13 shows a modified example of the aforesaid ducting system. Additionally, the components common to those of FIG. 12 are identified by like reference numerals.

In the example of FIG. 13, a total of nine optical elements of the optical device 44, including three liquid crystal panels 441R, 441G, 441B, three incidence side polarizing plates 442, and three emergence side polarizing plates 443, are disposed with their respective element cooling ducts (4631R, 4632R, 4633R, 4631G, 4632G, 4633G, 4631B, 4632B, 4633B). And, cooling fluid paths are disposed in series for each color.

Specifically, as for the red light, the outflow portion of the diverging tank 464 is connected to the inflow portion of the emergence side polarizing plate cooling duct 4633R. The outflow portion of the emergence side polarizing plate cooling duct 4633R is connected to the inflow portion of the liquid crystal panel cooling duct 4631R. The outflow portion of the liquid crystal panel cooling duct 4631R is connected to the inflow portion of the incidence side polarizing plate cooling duct 4632R. And, the outflow portion of the incidence side polarizing plate cooling duct 4632R is connected to the inflow portion of the converging tank 465. That is, the emergence side polarizing plate cooling duct 4633R, liquid crystal panel cooling duct 4631R, and incidence side polarizing plate cooling duct 4632R are disposed in series, in the order named from the diverging tank 464 toward the converging tank 465. Similarly, as for the green light, the emergence side polarizing plate cooling duct 4633G, liquid crystal panel cooling duct 4631G, and incidence side polarizing plate cooling duct 4632G are disposed in series, in the order named from the diverging tank 464 toward the converging tank 465. Besides, as for the blue light as well, the emergence side polarizing plate cooling duct 4633B, liquid crystal panel cooling duct 4631B, and incidence side polarizing plate cooling duct 4632B are similarly disposed in series, in the order named from the diverging tank 464 toward the converging tank 465.

The cooling fluid diverges at the diverging tank 464 into the three paths. And, the divergent cooling fluids for the respective colors first flow through the emergence side polarizing cooling ducts 4633R, 4633G, 4633B, next flow through the liquid crystal panel cooling ducts 4631R, 4631G, 4631B, and finally flow through the incidence side polarizing plate cooling ducts 4632R, 4632G, 4632B. The cooling fluids flow through the element cooling ducts along the peripheries of the elements, thereby cooling the elements and increasing the temperature of the cooling fluids flowing through the element cooling ducts. In this example, the element cooling ducts are disposed in series, three for each color, so that the temperature (inlet temperature) of the cooling fluids during the inflow thereof is the lowest in the emergence side polarizing plate cooling ducts 4633R, 4633G, 4633B, is the second lowest in the liquid crystal panel cooling ducts 4631R, 4631G, 4631B, and is comparatively high in the downstream incidence side polarizing plate cooling ducts 4632R, 4632G, 4632B. Thereafter, the cooling fluids converge within the converging tank 465 and are cooled by the previously described action of radiation at the radiator 466 (see FIG. 3). And, the cooling fluids having a reduced temperature are supplied again to the diverging tank 464.

Here, in each of the liquid crystal panels 441R, 441G, 441B, with light absorption by the liquid crystal layers, part of luminous fluxes are absorbed by the data line and scan line formed on the drive substrate, the black matrix formed on the opposite substrate, and the like. Besides, luminous fluxes incident on the incidence side polarizing plate 442 are converted into polarized light of substantially one kind by the upstream polarization converter 414 (see FIG. 1), and the incidence side polarizing plate 442 transmits almost all the converted luminous fluxes, and thus has comparatively low luminous flux absorbance. Besides, in the emergence side polarizing plate 443, the polarization direction of luminous fluxes incident thereon is modulated based on the image information, and the amount of the modulated luminous fluxes absorbed is normally larger than in the incidence side polarizing plate 442.

And, the heating values of the elements in the optical device 44 tend to increase in the following order: the incidence side polarizing plate, liquid crystal panel, and emergence side polarizing plate (incidence side polarizing plate<liquid crystal panel<emergence side polarizing plate).

In this example of FIG. 13, the element cooling ducts are disposed in series, three for each color, on the cooling fluid paths. Therefore, this reduces ducting space as compared with a configuration such that all the nine element cooling ducts are disposed in parallel.

Besides, the cooling fluid is supplied first to the emergence side polarizing plate 443 having a comparatively high heating value, so that the emergence side polarizing plate 443 is reliably cooled.

Additionally, in the aforesaid example, the element cooling ducts are disposed in series, in order of decreasing heating value from the upstream side, but the disposition is not limited thereto. The element cooling ducts may be disposed in series, in order of increasing heating value from the upstream side, or in other order. The order of disposition of the element cooling ducts is determined in response to the difference in heating value between a plurality of the elements, the cooling capacity of the element cooling ducts, and the like.

Furthermore, the configuration is not only such that all the plurality of element cooling ducts are disposed in series for each color, but may also be such that only part of them are disposed in series as described next.

Figure 14:
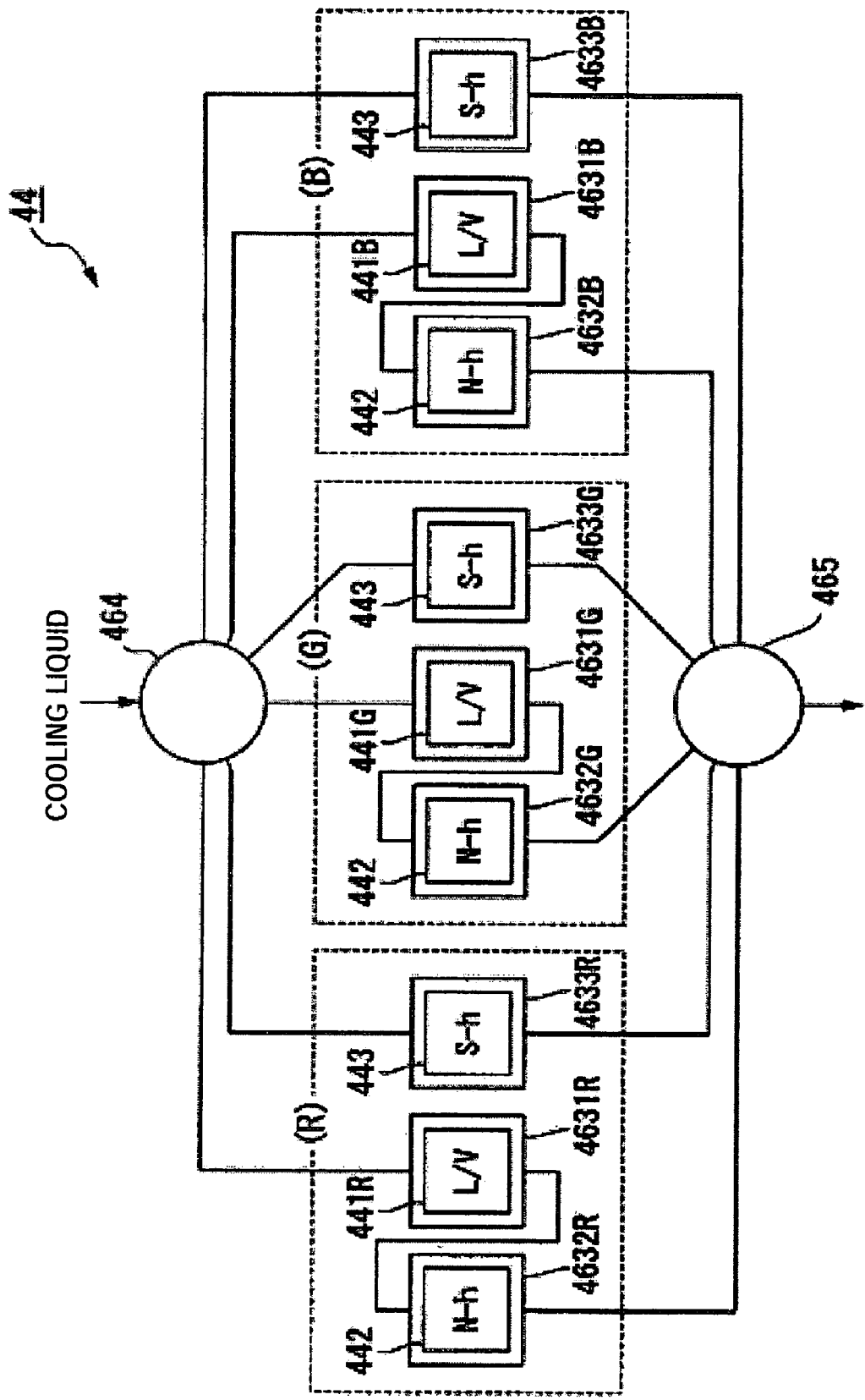
FIG. 14 shows another modified example of the ducting system.

FIG. 14 shows another modified example of the aforesaid ducting system. Additionally, the components common to those of FIG. 12 are identified by like reference numerals.

In the example of FIG. 14, a total of nine optical elements of the optical device 44, including three liquid crystal panels 441R, 441G, 441B, three incidence side polarizing plates 442, and three emergence side polarizing plates 443, are disposed with their respective element cooling ducts (4631R, 4632R, 4633R, 4631G, 4632G, 4633G, 4631B, 4632B, 4633B). And, cooling fluid paths are partially disposed in series for each color.

Specifically, as for the red light, the liquid crystal panel cooling duct 4631R and incidence side polarizing plate cooling duct 4632R are disposed in series, in the order named from the diverging tank 464 toward the converging tank 465, and the emergence side polarizing plate cooling duct 4633R is disposed parallel thereto. That is, the outflow portion of the diverging tank 464 is connected to the inflow portion of the liquid crystal panel cooling duct 4631R. The outflow portion of the liquid crystal panel cooling duct 4631R is connected to the inflow portion of the inflow portion of the incidence side polarizing plate cooling duct 4632R. And, the outflow portion of the incidence side polarizing plate cooling duct 4632R is connected to the inflow portion of the converging tank 465. Besides, the outflow portion of the diverging tank 464 is connected to the inflow portion of the emergence side polarizing plate cooling duct 4633R. And, the outflow portion of the emergence side polarizing plate cooling duct 4633R is connected to the inflow portion of the converging tank 465. Similarly, as for the green light, the liquid crystal panel cooling duct 4631G and incidence side polarizing plate cooling duct 4632G are disposed in series, in the order named from the diverging tank 464 toward the converging tank 465, and the emergence side polarizing plate cooling duct 4633G is disposed parallel thereto. Similarly, as for the blue light as well, the liquid crystal panel cooling duct 4631B and incidence side polarizing plate cooling duct 4632B are disposed in series in the order named, and the emergence side polarizing plate cooling duct 4633B is disposed parallel thereto.

The cooling fluid diverges at the diverging tank 464 into a total of six paths, two for each color. And, the divergent cooling fluids for the respective colors first flow into the liquid crystal panel cooling ducts 4631R, 4631G, 4631B and emergence side polarizing cooling ducts 4633R, 4633G, 4633B. The cooling fluids flowing through the liquid crystal panel cooling ducts 4631R, 4631G, 4631B next flow through the incidence side polarizing plate cooling ducts 4632R, 4632G, 4632B, and thereafter are directed toward the converging tank 465. In contrast, the cooling fluids flowing through the emergence side polarizing plate cooling ducts 4633R, 4633G, 4633B, on a color to color basis, are directed directly toward the converging tank 465 from the emergence side polarizing plate cooling ducts 4633R, 4633G, 4633B. The cooling fluids flow through the element cooling ducts along the peripheries of the elements, thereby cooling the elements and increasing the temperature of the cooling fluids flowing through the element cooling ducts. In this example, the temperature (inlet temperature) of the cooling fluids during the inflow thereof is comparatively low in the upstream liquid crystal panel cooling ducts 4631R, 4631G, 4631B and emergence side polarizing plate cooling ducts 4633R, 4633G, 4633B, and is comparatively high in the incidence side polarizing plate cooling ducts 4632R, 4632G, 4632B. Besides, as aforesaid, the heating value of the emergence side polarizing plate 443 is higher than any other element. Therefore, the temperature (outlet temperature) of the cooling fluids during the inflow thereof is comparatively high in the emergence side polarizing plate cooling ducts 4633R, 4633G, 4633B. And, the outlet temperature of the liquid crystal panel cooling ducts 4631R, 4631G, 4631B is relatively low as compared with that of the emergence side polarizing plate cooling ducts 4633R, 4633G, 4633B. Consequently, in this example of FIG. 14, the inlet temperature of the incidence side polarizing plate cooling ducts 4632R, 4632G, 4632B is lower than in the previous example of FIG. 13. Thereafter, the cooling fluids flowing through the peripheries of the elements converge within the converging tank 465 and are cooled by the previously described action of radiation at the radiator 466 (see FIG. 3). And, the cooling fluids having a reduced temperature are supplied again to the diverging tank 464.

In this example of FIG. 14, the element cooling ducts are disposed in series, two for each color, and the remaining element cooling ducts are disposed, one parallel to each of the aforesaid element cooling ducts. Therefore, this reduces ducting space as compared with a configuration such that all the nine element cooling ducts are disposed in parallel.

Besides, the liquid crystal panels 441R, 441G, 441B and incidence side polarizing plates 442 are provided with the cooling paths parallel to the cooling paths of the emergence side polarizing plates 443 having a high heating value. This avoids the thermal influence of the emergence side polarizing plates 443 upon the other elements, thus effectively cooling the liquid crystal panels 441R, 441G, 441B and incidence side polarizing plates 442.

Additionally, in the aforesaid examples of FIGS. 12, 13, and 14, the cooling structures for red (R), green (G), and blue (B) are the same as each other, but may be configured different from color to color. For example, the configuration of FIG. 13 or 14 may be adopted for the red and blue lights, and the configuration of FIG. 12 or 14 may be adopted for the green light. Otherwise, other combinations may be adopted.

Here, generally, the green light is comparatively high in light intensity, so that the optical element for the green light is liable to a rise in temperature. Consequently, a cooling structure having high cooling effectiveness is adopted for the green light, and simply configured cooling structures are adopted for the other red and blue lights, thereby reducing ducting space and increasing element cooling efficiency.

Besides, in the aforesaid examples of FIGS. 12, 13, and 14, the diverging tank 464 has the cooling fluid path diverging into at least three branches in response to three colors of red, green, and blue, but the configuration is not limited thereto. For example, the configuration may be such that the cooling fluid path diverges into a system for the red and blue lights and a system for the green light. In this case, cooling structures for the red and blue lights are disposed in series, and a cooling structure for the green light is disposed parallel thereto. Similar to the aforesaid, it is thereby possible to reduce ducting space and increase element cooling efficiency.

First Connecting Structure of Frame-Like Members

There will now be described a connecting structure of the frame-like members and an element holding frame manufacturing method. The connecting structure is applied to the holding frames (liquid crystal panel holding frame 445, incidence side polarizing plate holding frame 446, and emergence side polarizing plate holding frame 447) of the aforesaid elements: the liquid crystal panel 441, incidence side polarizing plate 442, and emergence side polarizing plate 443.

Additionally, in the following description, "frame-like members 12 and 13" (see FIG. 15) correspond to the aforesaid liquid crystal panel holding frame 445 (frame-like members 4451, 4452), incidence side polarizing plate holding frame 446 (frame-like members 4461, 4462), and emergence side polarizing plate holding frame 447 (frame-like members 4471, 4472) (see FIGS. 4, 9A, 9B, 10A, 10B, 11A, and 11B).

Similarly, a "cooling duct 14" corresponds to the aforesaid element cooling duct 463 (liquid crystal panel cooling duct 4631R, incidence side polarizing plate cooling duct 4632R, and emergence side polarizing plate cooling duct 4633R).

Similarly, an "optical element 11" corresponds to the aforesaid liquid crystal panels 441R, 441G, 441B, incidence side polarizing plates 442, and emergence side polarizing plates 443.

Figure 15:
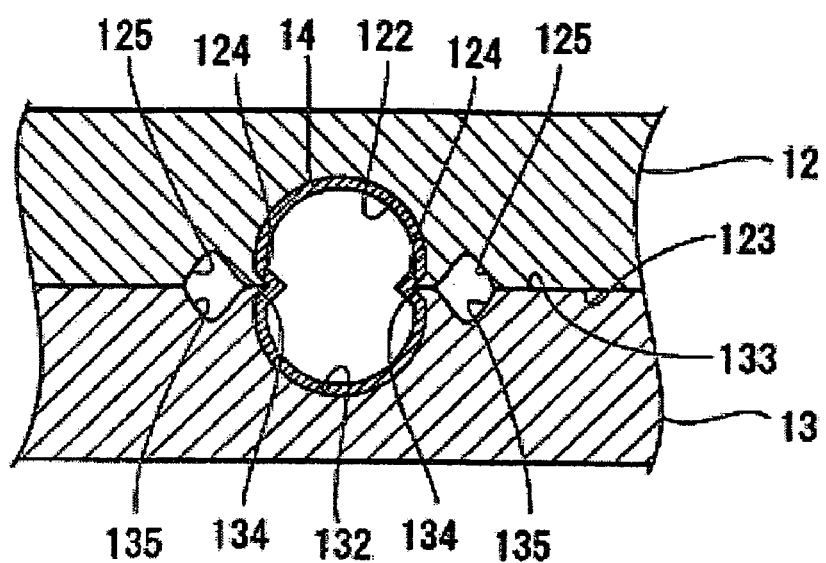
FIG. 15 is a partial section view of frame-like members of a first connecting structure.

FIG. 15 is a partial section view of frame-like members 12, 13.

As shown in FIG. 15, the frame-like members 12, 13 are each formed with grooves 122, 132 into which the cooling duct 14 is housed, and projections 124, 134 projecting inwardly of the grooves 122, 132. And, these projections 124, 134 bite into and thus engage the outer surface of the cooling duct 14, thereby integrating the frame-like members 12, 13 and the cooling duct 14. Besides, the outer surface of the cooling duct 14 is in close contact with the inner surfaces of the grooves 122, 132 of the frame-like members 12, 13 after the cooling duct 14 is subjected to a diameter expansion process which will be described later.

As described later, the projections 124, 134 are formed by applying an external force to positions adjacent to the grooves 122, 132 in opposite surfaces 123, 133 and plastically deforming the grooves, after the grooves 122, 132 of the frame-like members 12, 13 are formed. Consequently, recesses 125, 135, which are dents made by applying the force to the positions adjacent to the grooves 122, 132, exist in the opposite surfaces 123, 133 of the frame-like members 12, 13.

First Method of Manufacturing Element Holding Frames

There will now be described the method of manufacturing an element holding frame made up of the aforesaid frame-like members 12, 13.

FIGS. 16A to 16D are illustrations showing an example of the method of manufacturing the element holding frame of FIG. 15. This manufacturing method has a groove forming step, projection forming step, and a connecting step.

Figure 16A:
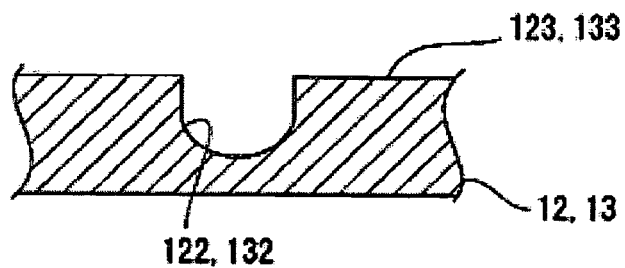
FIGS. 16A to 16D are illustrations showing a first example of a method of manufacturing an element holding frame.

First, in the groove forming step, as shown in FIG. 16A, grooves 122, 132 having a substantially U shape in cross-section or a substantially semicircular shape in cross-section for housing a cooling duct are formed in opposite surfaces 123, 133 of a pair of frame-like members 12, 13. In this step, the frame-like member 12 (13) provided with the groove 122 (132) is integrally formed using a casting method (such as die-casting) or a forging method (such as cold/hot forging). In the casting method, for example, a molten material is poured into a mold of predetermined shape and is solidified to obtain a frame-like member having a desired shape. In the forging method, for example, a material member is clamped between a set of dies and is compressed to obtain a frame-like member having a desired shape. The grooves 122, 132 may be formed by cutting, but the forging and casting methods facilitate a reduction in cost by mass production.

Figure 16B:
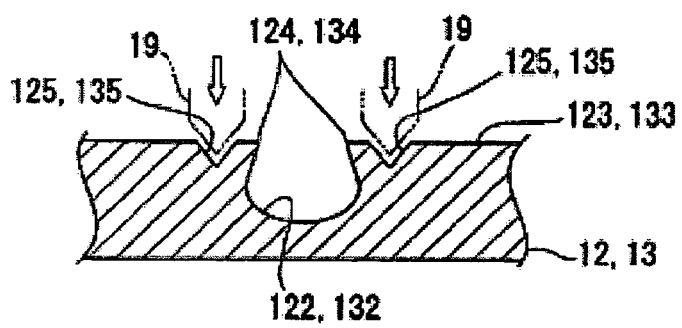

Next, as shown in FIG. 16B, projections 124, 134 projecting inwardly of the grooves 122, 132 are formed in the projection forming step. The forging method is used in this step. That is, a predetermined die 19 (such as a male die or a chisel) is pressed against the opposite surface 123, 133 of the frame-like member 12, 13, and a recess 125, 135, which is the mark of the die 19, is formed by pressing or striking at a position adjacent to the groove 122, 132 (compression forming). On this occasion, a region between the groove 122, 132 and the recess 125, 135 (a region adjacent to the groove 122, 132) is pressed by the die 19, and the region is plastically deformed inwardly of the groove 122, 132. As a result, the edge of the groove 122, 132 falls inward, thus forming the projection 124, 134 that projects inwardly of the groove 122, 132 and has a pointed tip. Pressing or striking can be performed for an extremely short time, and is preferably applied even to processing of a small size object.

Besides, the recesses 125, 135 and projections 124, 134 are formed in the axial direction of the cooling duct 14. The recesses 125, 135 and projections 124, 134 may be continuously formed along the axial direction of the grooves 122, 132, or may be intermittently or partially formed therealong. Furthermore, it is comparatively difficult to cause the projections 124, 134 to bite into a bent portion of the cooling duct 14. Therefore, at a position corresponding to this bent portion, the recesses 125, 135 and projections 124, 134 can be omitted therefrom, or the projections 124, 134 can be reduced in shape. The shape of the die 19 is appropriately determined in response to the material, shape, and the like of the frame-like members 12, 13 and cooling duct 14.

Figure 16C:
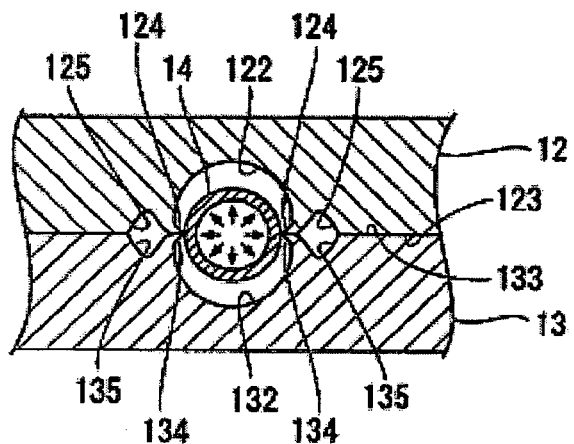

Next, in the connecting step, as shown in FIG. 16C, the frame-like members 12, 13 are disposed opposite each other with the cooling duct 14 housed in the grooves 122, 132, and the opposite surfaces 123, 133 are held abutting with each other, thus expanding the diameter of the cooling duct 14. The frame-like members 12, 13 are held by a mechanical grasping unit such as a clamp or by fastening with a bolt or the like. The diameter expansion is performed by pressurizing and supplying the fluid to the inside of the cooling duct 14, and is repeatedly performed in several batches according to need.

Figure 16D:
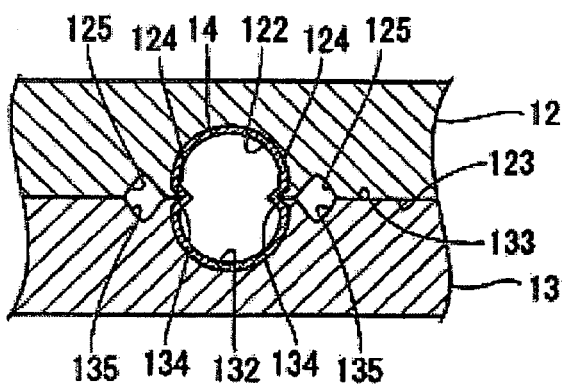

By the diameter expansion of the cooling duct 14, as shown in FIG. 16D, the outer surface of the cooling duct 14 makes close contact with the inner surfaces of the grooves 122, 132, and the pair of frame-like members 12, 13 and the cooling duct 14 are thermally connected together. Besides, during the diameter expansion, the projections 124, 134 bite into and thus engage the outer surface of the cooling duct 14, thereby connecting the frame-like members 12, 13 and the cooling duct 14 together. The element holding frame is thereby manufactured which has a configuration such that the pair of frame-like members 12, 13 are disposed opposite each other with the cooling duct 14 sandwiched therebetween.

As described above, in the method of manufacturing the element holding frame of this example, the projections 124, 134 are formed by applying an external force, such as a pressing or striking one, to the opposite surfaces 123, 133 of the pair of frame-like members 12, 13. Therefore, it is possible to reduce manufacturing time and it is easy to respond to a reduction in size, as compared with cutting. Consequently, according to this manufacturing method, the element holding frame to be manufactured can be reduced in cost and size.

Besides, in the element holding frame manufactured by this manufacturing method, after the cooling duct 14 is subject to the diameter expansion process, the cooling duct 14 is in close contact with the grooves 122, 132 of the frame-like members 12, 13, thus providing high heat conductance between the frame-like members 12, 13 and the cooling duct 14. Consequently, the optical element can be effectively cooled by the cooling fluid flowing through the cooling duct 14.

Additionally, a thermally conductive material is filled into the clearance between the grooves 122, 132 of the frame-like members 12, 13 and the cooling duct 14, thereby making it possible to improve the heat conductance between the frame-like members 12, 13 and the cooling duct 14. This filling with the thermally conductive material will be described later.

FIGS. 17A to 20B are illustrations showing a modified example of the manufacturing method of FIGS. 16A to 16D. Additionally, the components having the same functions as the already described ones are identified by like reference numerals, thus omitting or simplifying the description thereof.

In the example of FIGS. 17A and 17B, in the groove forming step, banks 127, 137 adjoining a groove 122, 132 are formed on each of opposite surfaces 123, 133 of a pair of frame-like members 12, 13 in addition to the groove 122, 132 (FIG. 17A). Furthermore, the wall surface of the groove 122, 132 is provided with a mold release angle (draft). The bank 127 (137) is a projection formed projecting from the opposite surface 123 (133) of the frame-like member 12 (13). The draft, which facilitates mold release, is provided such that the width of the groove 122 (132) increases gradually toward its opening. The width, height, draft angle, and the like of the banks 127, 137 are appropriately determined in response to the material, shape, and the like of the frame-like members 12, 13 and a cooling duct. Even the frame-like members 12, 13 of such a shape can be formed with ease and at low cost by using a casting method (such as die-casting) or a forging method (such as cold/hot forging).

In the projection forming step, the forging method is used to plastically deform the aforesaid banks 127, 137 (FIG. 17B). That is, a predetermined die 19 (such as a male die or a chisel) is pressed against the aforesaid banks 127, 137 on each of the opposite surfaces 123, 133 of the frame-like members 12, 13, and pressing or striking is performed (compression forming). On this occasion, the banks 127, 137 are pressed by the die 19 and thus plastically deformed inwardly of the groove 122, 132. Besides, recesses 125, 135 (stepped down portions), which are dents made by the die, are formed at positions adjacent to the groove 122, 132. Additionally, the configuration may be such that no recesses 125, 135 (stepped down portions) are formed, and therefore such that the position up to which a force is applied becomes flush with the opposite surface 123, 133 (the opposite surface 123, 133 becomes flat).

And, corner portions of the banks 127, 137 fall inwardly of the groove 122, 132, thereby forming projections 124, 134 that project inwardly of the groove 122, 132 and have pointed tips. Besides, the inner wall of the groove 122, 132 which is provided with a draft falls inward, whereby the projections 124, 134 are formed into a so-called inverse tapered shape. Thereafter, the connecting step using the aforesaid diameter expansion of the cooling duct 14 is performed (see FIGS. 16A to 16D).

In this example, the banks 127, 137 are formed, thus facilitating plastic deformation during the formation of the projections 124, 134. Moreover, the projections 124, 134 are formed into the inverse tapered shape, thus improving the connectability between the pair of frame-like members 12, 13 and the cooling duct 14 (see FIGS. 16A to 16D).

Next, in an example of FIGS. 18A and 18B, in the groove forming step, banks 127, 137 adjoining a groove 122, 132 and recesses 128, 138 disposed adjacent the outer sides of the banks 127, 137 with respect to the groove 122, 132 are formed on each of opposite surfaces 123, 133 of a pair of frame-like members 12, 13 in addition to the groove 122, 132 (FIG. 18A). Furthermore, the wall surface of the groove 122, 132 is provided with a mold release angle (draft). Similar to the example of FIGS. 17A and 17B, the bank 127 (137) is a projection formed projecting from the opposite surface 123 (133) of the frame-like member 12 (13). The draft is provided such that the width of the groove 122 (132) increases gradually toward its opening. Besides, the recess 128 (138) is formed recessed from the opposite surface 123 (133) of the frame-like member 12 (13), and part of the wall surface is shared between the banks 127, 137. The width and depth of the recesses 128, 138 and the width, height, draft angle, and the like of the banks 127, 137 are appropriately determined in response to the material, shape, and the like of the frame-like members 12, 13 and a cooling duct. Even the frame-like members 12, 13 of such a shape can be formed with ease and at low cost by using a casting method (such as die-casting) or a forging method (such as cold/hot forging).

In the projection forming step, the forging method is used to plastically deform the aforesaid banks 127, 137 (FIG. 18B). That is, a predetermined die 19 (such as a male die or a chisel) is pressed against the aforesaid banks 127, 137 on each of the opposite surfaces 123, 133 of the frame-like members 12, 13, and pressing or striking is performed (compression forming). On this occasion, the banks 127, 137 are pressed by the die 19 and thus plastically deformed inwardly of the groove 122, 132. Besides, the recesses 128, 138 expanded with the deformation of the banks 127, 137 are formed at positions adjacent to the groove 122, 132. In this example, the recesses 128, 138 are formed, whereby the banks 127, 137 are plastically deformed with ease by a comparatively small force. This is advantageous in preventing the frame-like members 12, 13 from being deformed with the formation of the projections 124, 134.

And, corner portions of the banks 127, 137 fall inwardly of the groove 122, 132, thereby forming projections 124, 134 that project inwardly of the groove 122, 132 and have pointed tips. Besides, the inner wall of the groove 122, 132 which is provided with a draft falls inward, whereby the projections 124, 134 are formed into a so-called inverse tapered shape. Thereafter, the connecting step using the aforesaid diameter expansion of the cooling duct 14 is performed (see FIGS. 16A to 16D).

In this example, the banks 127, 137 and recesses 128, 138 are formed, thus facilitating plastic deformation during the formation of the projections 124, 134. Moreover, the projections 124, 134 are formed into the inverse tapered shape, thus improving the connectability between the pair of frame-like members 12, 13 and the cooling duct 14 (see FIGS. 16A to 16D).

Next, in an example of FIGS. 19A and 19B, in the projection forming step, a separate member 141, 142 is bonded to each of opposite surfaces 123, 133 of a pair of frame-like members 12, 13 (FIG. 19A). An opening 141a (142a) and a projection 124 (134) are pre-formed in this member 141, 142. The opening 141a (142a) has substantially the same plane shape as a groove 122 (132) of the frame-like member 12 (13) so as to correspond to the groove 122 (132), and the projection 124 (134) projects inwardly of this opening 141a (142a). This member 141, 142 can be formed using a casting method (such as die-casting) or a forging method (such as cold/hot forging). The opening 141a (142a) and projection 124 (134) may be formed by cutting, but forming into a desired shape by the casting or forging method more facilitates a reduction in cost by mass production.

Various methods are applicable to the bonding between the frame-like member 12, 13 and the separate member 141, 142, such as a mechanical bonding by fastening with a screw or the like, adhesion, welding, fitting, or the like. For example, as shown in FIG. 19B, the frame-like member 12 (13) and the member 141 (412) are pre-fixed in position by a raised portion 145 and a recessed portion 146 which are provided on the frame-like member 12 (13) and the member 141 (412), respectively. Thereafter, both members can be fixed to each other by the aforesaid bonding. Such bonding can be performed for an extremely short time, and is preferably applied even to processing of a small size object.

And, the member 141, 142 is bonded to the frame-like member 12, 13, whereby the projection 124, 134 that projects inwardly of the groove 122, 132 and has a pointed tip is disposed at the position of the opening of the groove 122, 132 of the frame-like member 12, 13. Thereafter, the connecting step using the aforesaid diameter expansion of the cooling duct 14 is performed (see FIGS. 16A to 16D).

In this example, the projection 124, 134 is formed by bonding the separate member 141, 142. Therefore, it is possible to reduce manufacturing time and it is easy to respond to a reduction in size, as compared with cutting. Besides, the groove is formed by dividing it into a plurality of pieces, whereby the projection 124, 134 having various shapes, such as a so-called inverse tapered shape, can be formed using the casting or forging method.

Figure 20A:
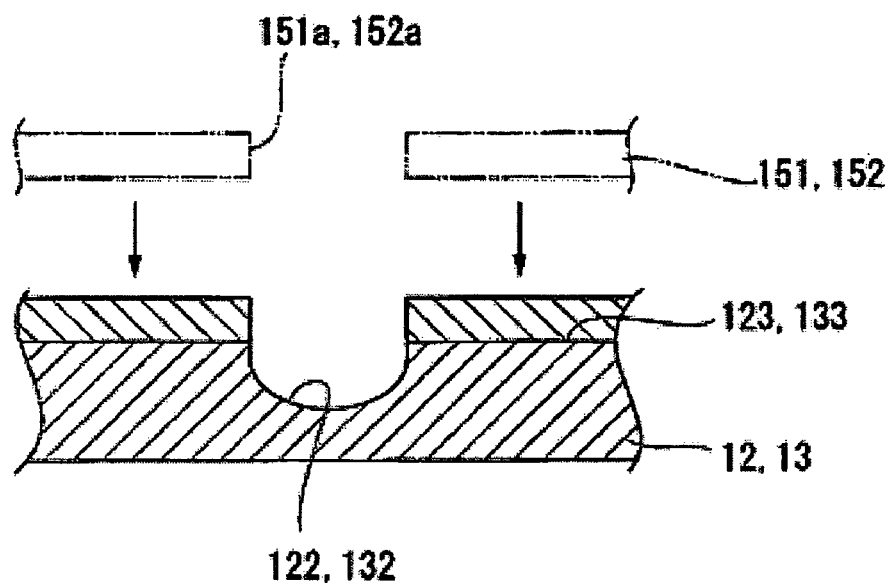
FIGS. 20A and 20B are illustrations showing a modified example of the manufacturing method of FIGS. 16A to 16D.
Figure 20B:
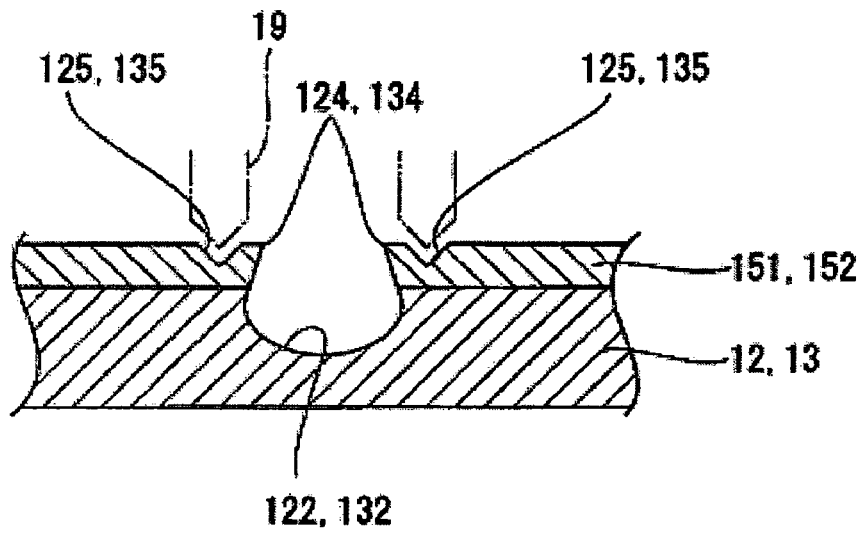

Next, in an example of FIGS. 20A and 20B, in the projection forming step, a separate member 151, 152 is bonded to each of opposite surfaces 123, 133 of a pair of frame-like members 12, 13 (FIG. 20A). Thereafter, a forging method is used to form a projection 124, 134 in the member 151, 152 (FIG. 20B). An opening 151a (152a) is pre-formed in this member 151, 152. The opening 151a (152a) has substantially the same plane shape as a groove 122 (132) of the frame-like member 12 (13) so as to correspond to the groove 122 (132). This member 151, 152 can be formed using a casting method (such as die-casting) or a forging method (such as cold/hot forging). Similar to the example of FIGS. 19A and 19B, various methods are applicable to the bonding between the frame-like member 12, 13 and the separate member 151, 152, such as a mechanical bonding by fastening with a screw or the like, adhesion, welding, fitting, or the like. Such bonding can be performed for an extremely short time, and is preferably applied even to processing of a small size object.

And, the aforesaid member 151, 152 are partially plastically deformed using the forging method. That is, a predetermined die 19 (such as a male die or a chisel) is pressed against positions adjacent to the opening 151a, 152a of the member 151, 152, and pressing or striking is performed (compression forming). On this occasion, the edges of the opening 151a, 152a are pressed by the die 19, and the pressed region is plastically deformed inwardly of the groove 122, 132. Recesses 125, 135, which are dents made by the die, are formed at the positions adjacent to the opening 151a, 152 of the member 151, 152.

In this example, the projections 124, 134 are formed by bonding the separate member 151, 152 and by applying an external force to the member 151, 152. Therefore, it is possible to reduce manufacturing time and it is easy to respond to a reduction in size, as compared with when cutting is used. Besides, the member forming the projections 124, 134 and the frame-like member 12, 13 are made up of different bodies, thus improving the selectivity of a material.

Filling with Thermally conductive Material

Here, in the aforesaid element holding frames, a thermally conductive material is filled into the clearance between the grooves 122, 132 of the frame-like members 12, 13 and the cooling duct 14, thereby making it possible to improve the heat transference between the frame-like members 12, 13 and the cooling duct 14.

The thermally conductive material preferably uses a good conductor of heat made up of a material having high thermal conductivity. Specifically, for example, a resin material mixed in with a metal material, a resin material mixed in with a carbon material, and a hot melt are used as the material. The thermal conductivity of the thermally conductive material is preferably 3 W/(m·K) or higher, more preferably, 5 W/(m·K) or higher. The thermal conductivity of the hot melt is normally 5 W/(m·K) or higher. Among the resin materials mixed in with a metal material or a carbon material, some have a thermal conductivity of 3 W/(m·K) or higher, and others have a thermal conductivity of 10 W/(m·K) or higher. Examples include products of Cool Polymers, Inc.: D2 (registered trademark) (LCP resin kneaded with a thermally conducting material, 15 W/(m·K), thermal conductivity: $10 \times 10^{-6}$/K) and RS007 (registered trademark) (PPS resin kneaded with a thermally conducting material), 3.5 W/(m·K), thermal conductivity: $20 \times 10^{-6}$/K).

Figure 21A:
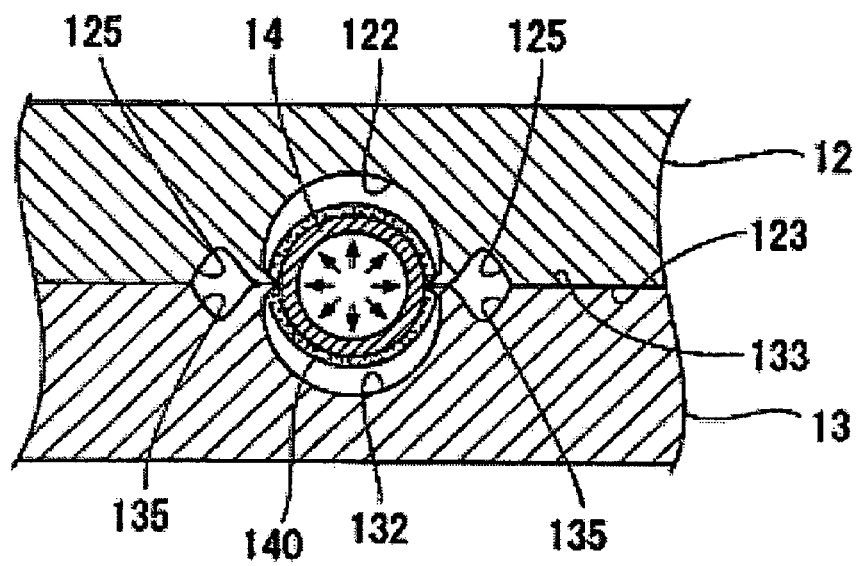
FIGS. 21A and 21B are illustrations showing the condition of being filled with a thermally conductive material.
Figure 21B:
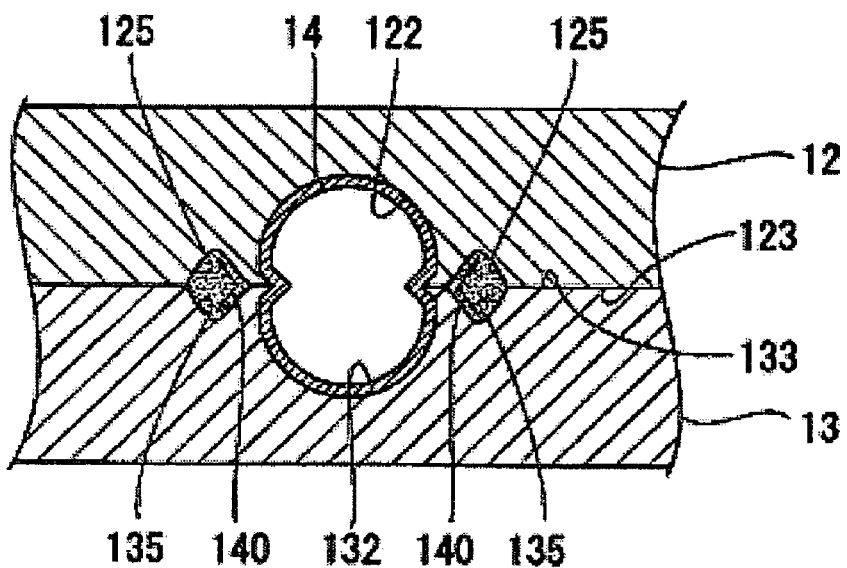

FIGS. 21A and 21B are illustrations showing the condition of being filled with the thermally conductive material.

As shown in FIG. 21A, filling with a thermally conductive material 140 can be carried out, for example, by pre-coating the thermally conductive material 140 on the inner surfaces of grooves 122, 132 of frame-like members 12, 13 and/or on the outer surface of a cooling duct 14, prior to the step of expanding the diameter of the cooling duct 14. Various methods can be used for coating with the thermally conductive material 140, such as spin coating, spray coating, roll coating, dye coating, dip coating, or liquid droplet ejection.

As shown in FIG. 21B, when the cooling duct 14 is expanded in diameter after coating with the thermally conductive material 140, the frame-like members 12, 13 and the cooling duct 14 are thermally connected directly to each other in the portion where the grooves 122, 132 of the frame-like members 12, 13 make contact with the cooling duct 14. And, the frame-like members 12, 13 and the cooling duct 14 are thermally connected indirectly to each other, via the thermally conductive material 140, in the portion where a clearance occurs between the frame-like members 12, 13 and the cooling duct 14. That is, the heat transfer between the frame-like members 12, 13 and the cooling duct 14 is complemented by the thermally conductive material 140, thus improving the heat transference between the frame-like members 12, 13 and the cooling duct 14. Besides, when the thermally conductive material 140 has an adhesion force, the force can also be used as a bonding force and the like acting between the frame-like members 12, 13 and the cooling duct 14.

Besides, during the diameter expansion of the cooling duct 14, the thermally conductive material 140 can be softened and fluidized according to need. For example, when the thermally conductive material is thermoplastic, the thermally conductive material 140 is heated during the aforesaid diameter expansion. In this case, the thermally conductive material 140 can be heated using the heat of a high-temperature fluid flowing through the cooling duct 14 during the diameter expansion. The thermally conductive material 140 is softened and fluidized, thereby filling the thermally conductive material 140 into the entire region of the clearance between the grooves 122, 132 of the frame-like members 12, 13 and the cooling duct 14.

Besides, when recesses 125, 135 are provided adjacent the grooves 122, 132, the remainder of the thermally conductive material 140 is accumulated in the recesses 125, 135 (auxiliary grooves). The thermally conductive material 140 is provided with a place to escape, thereby making it easy for the thermally conductive material 140 to spread homogeneously. Therefore, the thermally conductive material 140 is more reliably disposed all over the region of the clearance between the grooves 122, 132 of the frame-like members 12, 13 and the cooling duct 14. Besides, the thermally conductive material 140 disposed in the recesses 125, 135 (or the clearance between opposite surfaces 123 and 133) has the function of improving the thermal connectability between the frame-like members 12 and 13.

Furthermore, the thermally conductive material 140 preferably has elasticity within the operating temperature limit of the element holding frame (frame-like members 12, 13). The thermally conductive material has elasticity, whereby the thermally conductive material extends/contracts as the clearance between the frame-like members 12, 13 and the cooling duct 14 varies with thermal deformation or the like, thus stably maintaining the thermal connection between the frame-like members 12, 13 and the cooling duct 14.

Besides, the thermally conductive material 140 may have fluidity within the operating temperature limit of the element holding frame (frame-like members 12, 13). In this case, when the volume of the clearance between the grooves 122, 132 of the frame-like members 12, 13 and the cooling duct 14 varies with thermal deformation, the thermally conductive material 140 moves appropriately between the aforesaid clearance and the recesses 125, 135 (auxiliary grooves). The aforesaid clearance is thereby kept filled with the thermally conductive material 140, thus stably maintaining the thermal connection between the frame-like members 12, 13 and the cooling duct 14. In this case, it is preferred to take measures to prevent the thermal conductive material 140 from leaking to the outside. For example, the configuration may be such that an anaerobic type of thermally conductive material is used, and such that a portion thereof in contact with the ambient air is softened, while fluidity is held in an inner portion thereof. Otherwise, the configuration may be such that a thermally conductive material having fluidity is disposed on an inner side, while a separate thermally conductive material of hardening kind is disposed on an outer side.

FIGS. 22, 23, and 24 show examples in which auxiliary grooves 160 that at least temporarily store the aforesaid thermally conductive material 140 are formed in the inner surfaces of grooves 122, 132 of or opposite surfaces 123, 133 of the frame-like members 12, 13.

In the example of FIG. 22, in opposite surfaces 123, 133 of frame-like members 12, 13, auxiliary grooves 160 are formed, substantially parallel to the grooves 122, 132, on either outer side of each of the grooves 122, 132. Furthermore, a plurality of the auxiliary grooves 160 are spaced one from another. The shape and number of auxiliary grooves 160 are appropriately determined in response to the material characteristic and the like of the thermally conductive material 140. Even the frame-like members 12, 13 of such a shape can be formed with ease and at low cost by using a casting method (such as die-casting) or a forging method (such as cold/hot forging).

In this example of FIG. 22, the auxiliary grooves 160 are formed in the opposite surfaces 123, 133 of the frame-like members 12, 13, so that the thermally conductive material 140 easily spreads over the clearance between the opposite surfaces 123 and 133. The region of disposition of the thermally conductive material 140 thus expands, thereby improving the heat transference between the frame-like members 12 and 13, and also improving the bonding force of the thermally conductive material 140 acting between the frame-like members 12 and 13.

In the example of FIG. 23, auxiliary grooves 160 are formed, extending in the axial direction of the grooves 122, 132 of the frame-like members 12, 13, in the inner surfaces of grooves 122, 132. Furthermore, a plurality of the auxiliary grooves 160 are spaced circumferentially thereof one from another.

Besides, in the example of FIG. 24, auxiliary grooves 160 are formed, extending circumferentially, in the inner surfaces of grooves 122, 132 of frame-like members 12, 13. Furthermore, a plurality of the auxiliary grooves 160 are spaced one from another in the axial direction of the grooves 122, 132. Additionally, in FIG. 24, the auxiliary grooves 160 may be each formed so that its depth gradually decreases from the bottom toward the top of the groove 122 (132).

In the examples of FIGS. 23 and 24, the auxiliary grooves 160 are formed in the inner surfaces of the grooves 122, 132 of the frame-like members 12, 13. Therefore, the remainder of the thermally conductive material 140 easily moves to the auxiliary grooves 160 during filling with the thermally conductive material 140. As a result, this makes it easy for the thermally conductive material 140 to spread homogeneously, so that the thermally conductive material 140 is more reliably disposed all over the region of the clearance between the grooves 122, 132 of the frame-like members 12, 13 and the cooling duct 14.

Additionally, the auxiliary grooves 160 may be provided both in the grooves 122, 132 of and in the opposite surfaces 123, 133 of the frame-like members 12, 13.

Positioning of Optical Element

Figure 25A:
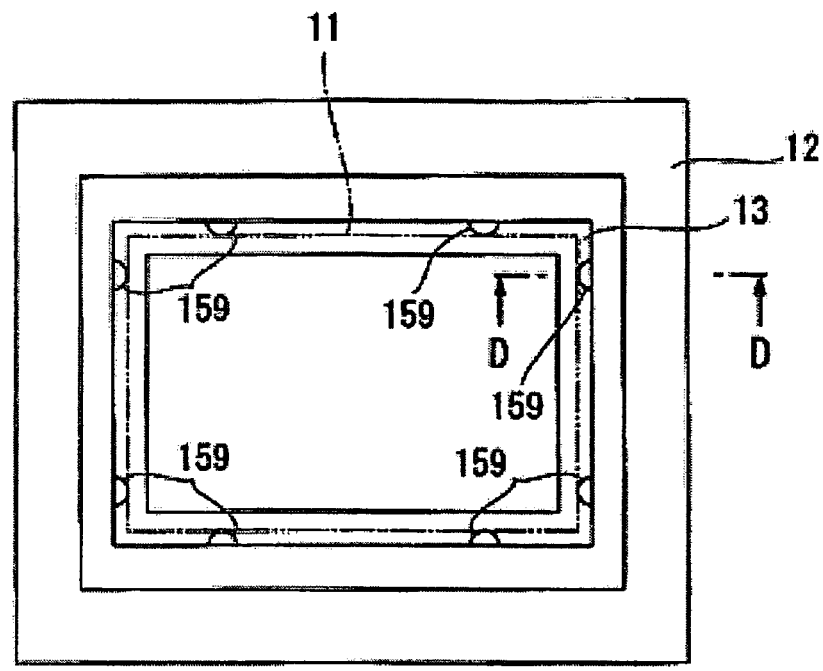
Figure 25B:
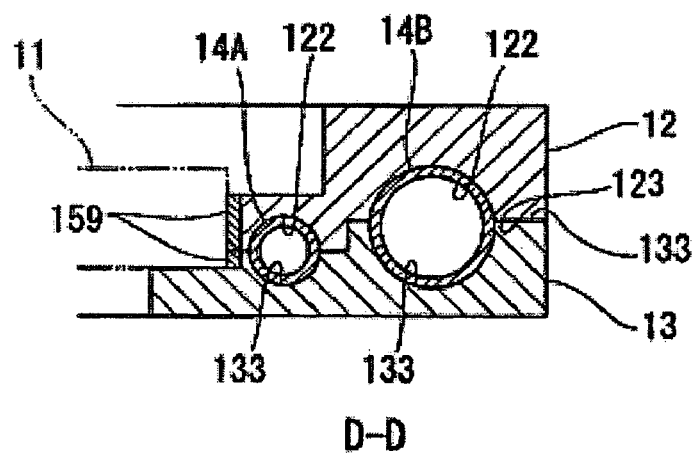

FIGS. 25A and 25B show a modified example of the element holding frame, wherein FIG. 25A is a schematic plan view and FIG. 25B is a section view taken along line D-D shown in FIG. 25A. Additionally, the components having the same functions as the already described ones are identified by like reference numerals, thus omitting or simplifying the description thereof.

In the example of FIGS. 25A and 25B, a pair of frame-like members 12, 13 hold the periphery of an optical element 11, and a cooling duct 14 is supported between the pair of frame-like members 12 and 13.

In this example, the cooling duct 14 is disposed in two folds in the direction of width of the optical element 11. A small diameter duct 14A is disposed on the opening side of the pair of frame-like members 12, 13, and a large diameter duct 14B is disposed outside of the small diameter duct 14A.

Besides, a side surface of the opening of the pair of frame-like members 12, 13 is provided with a plurality of positioning portions 159 eight in this embodiment projecting from the side surface. The apical surfaces of the positioning portions 159 are set to have a desired shape by plastic deformation to be described later. Additionally, there is provided the projecting positioning portion 159, so that the side surface of the opening may be comparatively low in surface precision.

And, the planar position of the optical element 11 relative to the frame-like members 12, 13 is fixed by this plurality of positioning portions 159.

FIGS. 26A to 26C are illustrations showing the condition of setting the shape of the positioning portions 159 of FIGS. 25A and 25B.

In this example, the shape of the positioning portions 159 is set using the deformation of the frame-like members 12, 13 with the diameter expansion of the cooling duct 14.

First, there are prepared the frame-like members 12, 13 that are provided with grooves 122, 132 for housing the cooling duct 14 and projections serving as the positioning portions 159 (FIG. 26A). At this time point, preferably, the apical surfaces of the projections (positioning portions 159) are made up of, for example, curved surfaces or spherical surfaces. Besides, the profile precision thereof may be low. Even the frame-like members 12, 13 of such a shape can be formed with ease and at low cost by using a casting method (such as die-casting) or a forging method (such as cold/hot forging), and such a method is preferably applicable even to a small size object.

Next, the frame-like members 12 and 13 are disposed opposite each other with the cooling duct 14 (14A and 14B) supported between the grooves 122 and 132, and the opposite surfaces 123, 133 are held abutted with each other (FIG. 26B). On this occasion, the position of the outer side surface of the pair of frame-like members 12, 13 is fixed by a die 158 (outer die), and a separate die 157 (inner die) is disposed on the opening of the pair of frame-like members 12, 13. Besides, the face-to-face distance between the inner and outer dies 158 and 157 is set to a desired value.

Next, the cooling duct 14 (14A and 14B) is expanded in diameter (FIG. 26C). The diameter expansion is performed by pressurizing and supplying the cooling fluid to the inside of the cooling ducts 14A, 14B, and is repeatedly performed in several batches according to need. By the diameter expansion of the cooling duct 14, the outer surface of the cooling duct 14 makes close contact with the grooves 122, 132 of the frame-like members 12, 13, and the region between the cooling duct 14A and the opening, which is a thin portion of the pair of the frame-like members 12, 13, deforms outwardly. And, as the thin portion thus deforms, the apical surfaces of the projections (positioning portions 159) are pressed against the inner die 157 and thereby plastically deformed, and the shape of the positioning portions 159 is set by this plastic deformation. That is, the planar position of the positioning portions 159 relative to a reference surface (the outer side surface of the pair of frame-like members 12, 13) is set based on the face-to-face distance between the outer and inner dies 158 and 157.

the shape of the positioning portions 159 for positioning the optical element 11 is set by the plastic deformation using the diameter expansion of the cooling duct 14. Therefore, the step is simplified as compared with when the shape of the positioning portions 159 is set by cutting.

Figure 27:
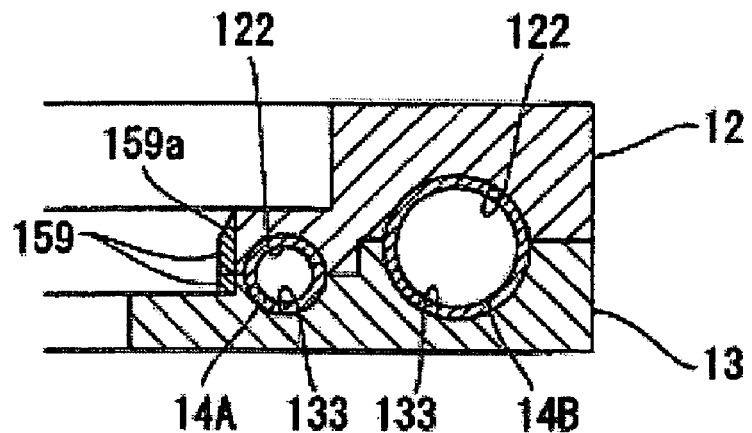
FIG. 27 shows an example in which a slant face for guiding an optical element is formed on the positioning portions.

Additionally, as shown in FIG. 27, a slant face 159a for guiding the optical element 11 may be provided on the positioning portions 159. In this case, the aforesaid inner die 157 (see FIGS. 26A to 26C) is pre-provided with an inclined plane which corresponds to this slant face. The plastic deformation using the dies makes it possible to easily set the positioning portions 159 to have various shapes.

Second Connecting Structure of Frame-Like Members

There will now be described a second connecting structure of the frame-like members and a method of manufacturing an element holding frame corresponding thereto.

Figure 28:
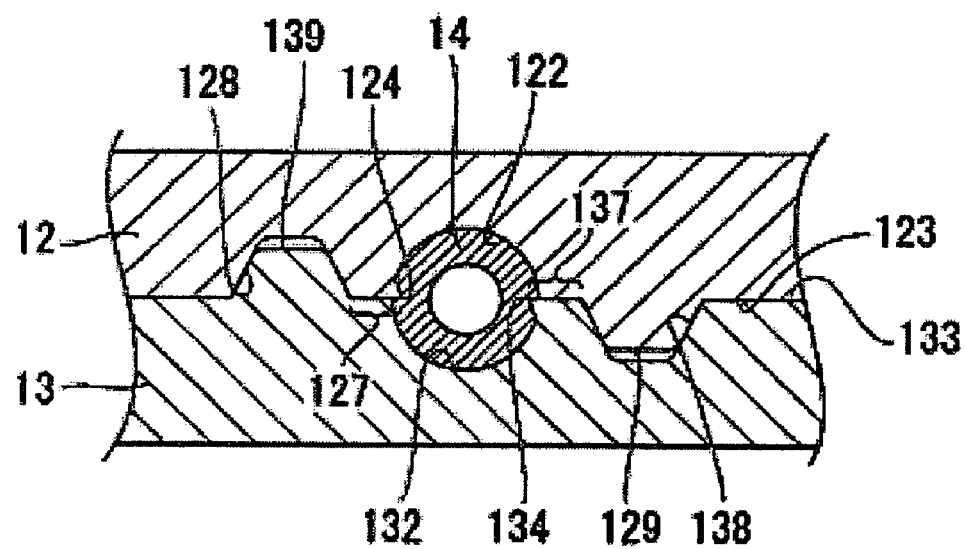
FIG. 28 is a partial section view of frame-like members of a second connecting structure.

FIG. 28 is a partial section view of frame-like members 12, 13.

As shown in FIG. 28, grooves 122, 132 for housing a cooling duct 14 are formed on the frame-like members 12, 13, respectively. The inner surfaces of the grooves 122, 132 and the outer surface of the cooling duct 14 have portions contoured to substantially the same size, and make contact with each other. Projections 124, 134 projecting inwardly of the grooves 122, 132 are provided on the frame-like members 12, 13, respectively. These projections 124, 134 bite into and thus engage the outer surface of the cooling duct 14, thereby integrating the frame-like members 12, 13 and the cooling duct 14.

Furthermore, recessed portions 128, 138 adjacent to the grooves 122, 132 and raised portion 129, 139 inserted in the opposing recessed portions 128, 138 are formed on opposite surfaces 123, 133 of the frame-like members 12, 13. The recessed portions 128, 138 are formed recessed from the opposite surfaces 123, 133, and raised portions 129, 139 are formed projecting from the opposite surfaces 123, 133. The recessed portions 128, 138 and the raised portions 129, 139 have the function of serving as a positioning guide when connecting the frame-like members 12 and 13 together.

And, banks 127, 137, each of which has a wall surface of the groove 122, 132 and a wall surface of the recessed portion 128, 129 serving as its side surface, are formed between the grooves 122, 132 and the recessed portions 128, 138. In this example, the projections 124, 134 to be engaged with the cooling duct 14 are edges of the grooves 122, 132, and the edges are corner portions of the banks 127, 137. The corner portions of the banks 127, 137 are preferably of peaked shape. The recessed portions 128, 138, raised portions 129, 139, and banks 127, 137 may be continuously formed along the axial direction of the grooves 122, 132, or may be intermittently or partially formed therealong.

Additionally, in this example, as described later, the recessed portion 128 (138) of one frame-like member 12 (13) is inserted into the raised portion 139 (129) of the other frame-like member 13 (12). The bank 127 (137) is thereby deformed to cause the projections 124, 134, which are the corner portions of the banks 127, 137, to bite into the outer surface of the cooling duct 14. Consequently, the wall surfaces of the recessed portions 128, 138 make close contact with the wall surfaces of the raised portions 129, 139.

Second Method of Manufacturing Element Holding Frame

There will now be described a method of manufacturing the element holding frame made up of the aforesaid frame-like members 12, 13.

FIGS. 29A and 29B are illustrations showing a method of manufacturing the element holding frame of FIG. 28. This manufacturing method has a groove forming step and a connecting step.

First, in the groove forming step, as shown in FIG. 29A, opposite surfaces 123, 133 of a pair of frame-like members 12, 13 are formed with: grooves 122, 132, for housing a cooling duct, which have a substantially semicircular shape in cross-section or a substantially U shape in cross-section; recessed portions 128, 138 adjacent to the grooves; and raised portions 129, 139 adjacent to the grooves. In this step, the frame-like member 12 (13) provided with the groove 122 (132), recessed portion 128 (138), and raised portion 129 (139) is integrally formed using a casting method (such as die-casting) or a forging method (such as cold/hot forging). The shape of the grooves 122, 132, recessed portions 128, 138, and raised portions 129, 139 is appropriately determined in response to the material, shape, and the like of the frame-like members 12, 13 and cooling duct 14. For example, the recessed portion 128 (138) and raised portion 129 (139) have portions contoured to substantially the same shape (trapezoidal cross-section shape) so that they are combined with each other. And, the raised portion 129 (139) is formed to partially have a slightly larger width than the recessed portion 128 (138). Besides, the grooves 122, 132 and cooling duct 14 have portions contoured to substantially the same shape (semicircular cross-section shape) so that they are combined with each other. The grooves 122, 132 deform as the frame-like members 12 and 13 are connected to each other which will be described later. Therefore, a difference may be provided between the width of the grooves 122, 132 and the diameter of the cooling duct 14 so that the grooves 122, 132 make close contact with the cooling duct 14. Even the frame-like members 12, 13 of such a shape can be formed with ease and at low cost by using a casting method (such as die-casting) or a forging method (such as cold/hot forging), and such a method is preferably applied even to a small size object.

Next, in the connecting step, as shown in FIG. 29B, the frame-like members 12, 13 are disposed opposite each other, and the cooling duct 14 is housed into the grooves 122, 132. On this occasion, the recessed portion 128 (138) and raised portion 139 (129) are combined with each other, thereby fixing the planar position of the frame-like members 12 and 13 relative to each other. Furthermore, with the cooling duct 14 housed in the grooves 122, 132, an external force is applied so that the opposite surface 123 of the frame-like member 12 makes close contact with the opposite surface 133 of the frame-like member 13. By so doing, in the process where the raised portion 139 (129) is inserted into the recessed portion 128 (138), the bank 127 (137) between the recessed portion 128 (138) and the groove 122 (132) is pressed by the raised portion 139 (129) and thus is deformed. That is, the recessed portion 128 (138) of one frame-like member 12 (13) is combined with the raised portion 139 (129) of the other frame-like member 13 (12). The bank 127 (137) is thereby pressed inwardly of the groove 122 (132) and thus deformed inwardly of the groove 122 (132). In this case, the recessed portions 128, 138 are formed at positions adjacent to the grooves 122, 132, thereby easily deforming the banks 127, 137 provided between the grooves 122, 132 and the recessed portions 128, 138.

And, as shown in FIG. 29B, as the aforesaid banks 127, 137 deform, the inner surfaces of the grooves 122, 132 make close contact with the outer surface of the cooling duct 14, and the pair of frame-like members 12, 13 are thermally connected to the cooling duct 14. Furthermore, as the aforesaid banks 127, 137 deform, the corner portions (projections 124, 134) of the banks 127, 137, which are regions adjoining the grooves 122, 132, bite into and thus engage the outer surface of the cooling duct 14, thereby connecting the frame-like members 12, 13 to the cooling duct 14. The projections 124, 134 bite into the cooling duct 14, thus contracting the volume of the cooling duct 14. However, since the cooling duct 14 is opened at both ends, the inside air is opened to the outside through the both ends, so that extra stress will not remain in the cooling duct 14. The element holding frame, which has a configuration such that the pair of frame-like members 12, 13 are disposed opposite each other with the cooling duct 14 sandwiched therebetween, is thereby manufactured.

As described above, in the element holding frame manufacturing method of this example, an external force is applied to the frame-like members 12, 13, thereby connecting the pair of frame-like members 12, 13 to the cooling duct 14. Therefore, it is possible to significantly reduce manufacturing time as compared with when the aforesaid connection is performed by the diameter expansion of the cooling duct. Besides, in this manufacturing method, the aforesaid connection is performed with the combination of the pair of frame-like members 12, 13, thus simplifying the step. Moreover, this manufacturing method eliminates the use of the diameter expansion step and thus is preferably applied even to a small diameter cooling duct 14. Consequently, according to this manufacturing method, the element holding frame to be manufactured can be reduced in cost and size.

Besides, in the element holding frame manufactured by this manufacturing method, the inner surfaces of the grooves 122, 132 of the frame-like members 12, 13 make close contact with the outer surface of the cooling duct 14, and part (projections 124, 134) of the frame-like members 12, 13 bite into and thus engage the outer surface of the cooling duct 14. Therefore, the frame-like members 12, 13 are thermally connected to the cooling duct 14. Consequently, the optical element 11 can be effectively cooled by the cooling fluid flowing through the cooling duct 14.

Additionally, even in the element holding frame of this second example, the thermally conductive material is filled into the clearance between the grooves 122, 132 of the frame-like members 12, 13 and the cooling duct 14, thereby making is possible to improve the heat transference between the frame-like members 12, 13 and the cooling duct 14. The thermally conductive material preferably uses a good conductor of heat made up of a material having high thermal conductivity. For example, as aforesaid, a resin material mixed in with a metal material, a resin material mixed in with a carbon material, and a hot melt are used as the material.

Filling with the thermally conductive material can be carried out, for example, by pre-coating the thermally conductive material on the inner surfaces of the grooves 122, 132 of the frame-like members 12, 13 and/or on the outer surface of the cooling duct 14, prior to the connection of the frame-like members 12, 13 to the cooling duct 14. Various methods can be used for coating with the thermally conductive material, such as spin coating, spray coating, roll coating, dye coating, dip coating, or liquid droplet ejection. Additionally, the thermally conductive material may be filled (injected) into the clearance between the grooves of the frame-like members 12, 13 and the cooling duct 14, after the frame-like members 12, 13 are connected to the cooling duct 14.

When the frame-like members 12, 13 and the cooling duct 14 are connected to each other after coated with the thermally conductive material, the frame-like members 12, 13 and cooling duct 14 are thermally connected directly to each other in the portion where the grooves 122, 132 of the frame-like members 12, 13 make contact with the cooling duct 14. And, the frame-like members 12, 13 and cooling duct 14 are thermally connected indirectly to each other, via the thermally conductive material, in the portion where a clearance occurs between the frame-like members 12, 13 and the cooling duct 14. That is, the heat transfer between the frame-like members 12, 13 and the cooling duct 14 is complemented by the thermally conductive material 140, thus improving the heat transference between the frame-like members 12, 13 and the cooling duct 14. Besides, when the thermally conductive material has an adhesion force, the force can also be used as a bonding force and the like acting between the frame-like members 12, 13 and the cooling duct 14.

Besides, during the aforesaid connection, the thermally conductive material can be softened and fluidized according to need. For example, when the thermally conductive material is thermoplastic, the thermally conductive material is heated during the aforesaid connection. In this case, for example, during the aforesaid connection, the frame-like members 12, 13 are heated via a physical body (jig) that holds the frame-like members 12, 13, or a high-temperature fluid is allowed to flow through the cooling duct 14. The thermally conductive material is softened and fluidized, thereby filling the thermally conductive material into the entire region of the clearance between the grooves of the frame-like members 12, 13 and the cooling duct 14.

Besides, the thermally conductive material preferably has elasticity within the operating temperature limit of the element holding frame (frame-like members 12, 13). The thermally conductive material has elasticity, whereby the thermally conductive material extends/contracts as the clearance between the frame-like members 12, 13 and the cooling duct 14 varies with thermal deformation or the like, thus stably maintaining the thermal connection between the frame-like members 12, 13 and the cooling duct 14.

FIGS. 30A to 33B are illustrations showing modified examples of the manufacturing method of FIGS. 29A and 29B. Additionally, the components having the same functions as the already described ones are identified by like reference numerals, thus omitting or simplifying the description thereof.

Figure 30A:
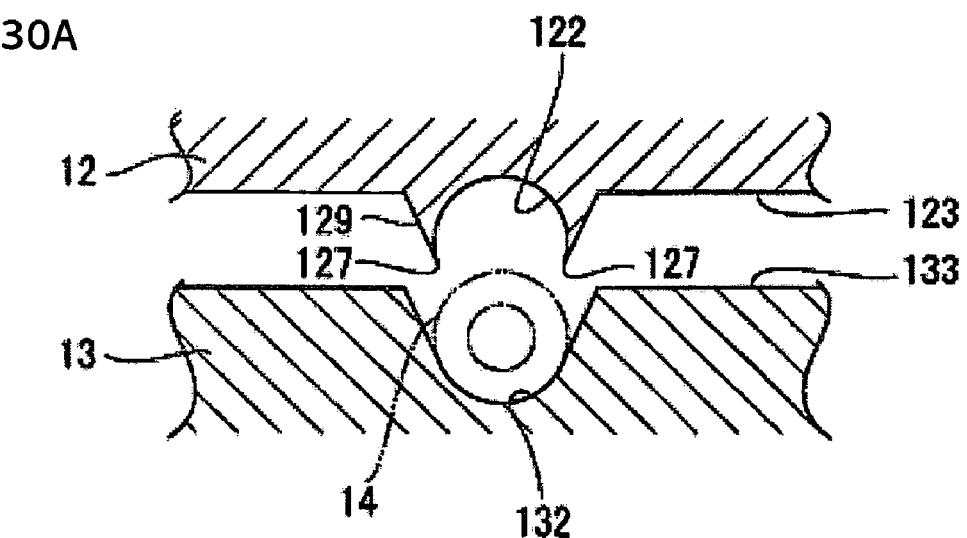
FIGS. 30A to 30B are illustrations showing a modified example of the manufacturing method of FIGS. 29A and 29B.
Figure 30B:
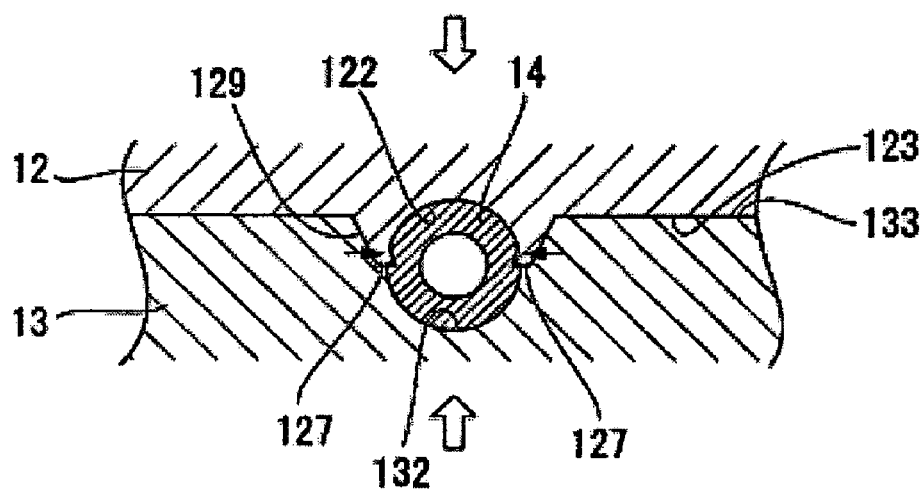

In the example of FIGS. 30A and 30B, a cooling duct 14 is disposed to one frame-like member 13.

That is, in the groove forming step, a groove 132 capable of housing the entire cooling duct 14 is formed in an opposite surface 133 of the one frame-like member 13 (FIG. 30A). This groove 132 is provided so that its width increases from the bottom toward the opening. Besides, a raised portion 129, which is inserted into the groove 132 of the frame-like member 13, is formed on an opposite surface 123 of the other frame-like member 12. This raised portion 129, formed projecting from the opposite surface 123 of the frame-like member 13, has: at its center a groove 122 having a portion contoured to substantially the same size as the cooling duct 14; and banks 127 adjoining the groove 122. The shape of the groove 132 and raised portion 129 is appropriately determined in response to the material, shape, and the like of the frame-like members 12, 13 and cooling duct 14. Even the frame-like members 12, 13 of such a shape can be formed with ease and at low cost by using a casting method (such as die-casting) or a forging method (such as cold/hot forging).

In the connecting step, the frame-like members 12, 13 are disposed opposite each other, and the cooling duct 14 is housed into the groove 132 of the one frame-like member 13. When an external force is applied in this state so that the frame-like members 12, 13 make close contact with each other, the banks 127 of the other frame-like member 12 are inserted into the clearance between the groove 132 of the one frame-like member 13 and the cooling duct 14, and the banks 127 deform in the process of the insertion. That is, the groove 132 of the one frame-like member 13 is combined with the raised portion 129 (banks 127) of the other frame-like member 12. The banks 127 are thereby pressed inwardly of the groove 122, and thus deform inwardly of the groove 122. And, as the banks 127 thus deform, the inner surfaces of the grooves 122, 132 make close contact with the outer surface of the cooling duct 14, so that the pair of frame-like members 12, 13 are thermally connected to the cooling duct 14. Furthermore, as the banks 127 thus deform, the corner portions of the banks 127, which are regions adjoining the grooves 122, 132, bite into and thus engage the outer surface of the cooling duct 14, and the aforesaid raised portion 129 engages the groove 132, thus connecting the frame-like members 12, 13 to the cooling duct 14.

In this example, the cooling duct 14 is disposed to the one frame-like member 13, thus increasing the degree of freedom in configuration. Besides, to fill with a thermally conductive material, the thermally conductive material is easily disposed.

Next, in the example of FIGS. 31A and 31B, a cooling duct 14 is disposed to one frame-like member 13, and the cooling duct 14 has a substantially semicircular cross-section.

That is, in the groove forming step, a groove 132 having a substantially semicircular cross-section capable of housing the entire cooling duct 14 and recessed portions 138 adjoining the groove are formed on an opposite surface 133 of the one frame-like member 13. And, opposing raised portions 129 to be inserted into the aforesaid recessed portions 138 are formed on an opposite surface 123 of the other frame-like member 12 (FIG. 31A). In this step, the frame-like member 13 (12) provided with the groove 132 and recessed portions 138 (raised portions 129) is integrally formed using a casting method (such as die-casting) or a forging method (such as cold/hot forging). The shape of the grooves 132, recessed portions 138, and raised portions 129 is appropriately determined in response to the material, shape, and the like of the frame-like members 12, 13 and cooling duct 14. For example, the groove 132 has a portion contoured to substantially the same shape (semicircular cross-section shape) as the curved surface portion of the cooling duct 14. Besides, the recessed portions 138 and raised portions 129 have portions contoured to substantially the same shape (trapezoidal cross-section shape) so that they are combined with each other. And, the raised portions 129 are formed to partially have a slightly larger width than the recessed portions 138. Even the frame-like members 12, 13 of such a shape can be formed with ease and at low cost by using a casting method (such as die-casting) or a forging method (such as cold/hot forging), and such a method is preferably applied even to a small size object.

In the connecting step, the frame-like members 12, 13 are disposed opposite each other, and the cooling duct 14 is housed into the groove 132 of the frame-like member 13. When an external force is applied in this state so that the frame-like members 12, 13 make close contact with each other, banks 137 between the recessed portions 138 and the groove 132 are pressed by the raised portions 129 and thus are deformed in the process where the raised portions 129 are inserted into the recessed portions 138 (FIG. 31B). That is, the recessed portions 138 of the one frame-like member 13 are combined with the raised portions 129 of the other frame-like member 12. The banks 137 are thereby pressed inwardly of the groove 132 and thus deformed inwardly of the groove 132. And, the opposite surface 123 of the frame-like member 12 makes close contact with the flat surface of the cooling duct 14, and the inner surface of the groove 132 makes close contact with the outer surface of the cooling duct 14 as the aforesaid banks 137 deform. The pair of frame-like members 12, 13 are thermally connected to the cooling duct 14. Furthermore, as the aforesaid banks 137 deform, the corner portions of the banks 137, which are regions adjoining the groove 132, bite into and engage the outer surface of the cooling duct 14 and the recess 138 engages the raised portion 129 engage, thereby connecting the frame-like members 12, 13 to the cooling duct 14.

In this example, the cooling duct 14 is disposed to the one frame-like member 13, thus increasing the degree of freedom in configuration. Besides, to fill with a thermally conductive material, the thermally conductive material is easily disposed. Besides, the cooling duct 14 has a substantially semicircular cross-section, thereby simplifying the shape of the opposite surface 123 of the frame-like member 12, so that the frame-like member 12 can be easily formed even by cutting such as milling.

Figure 32A:
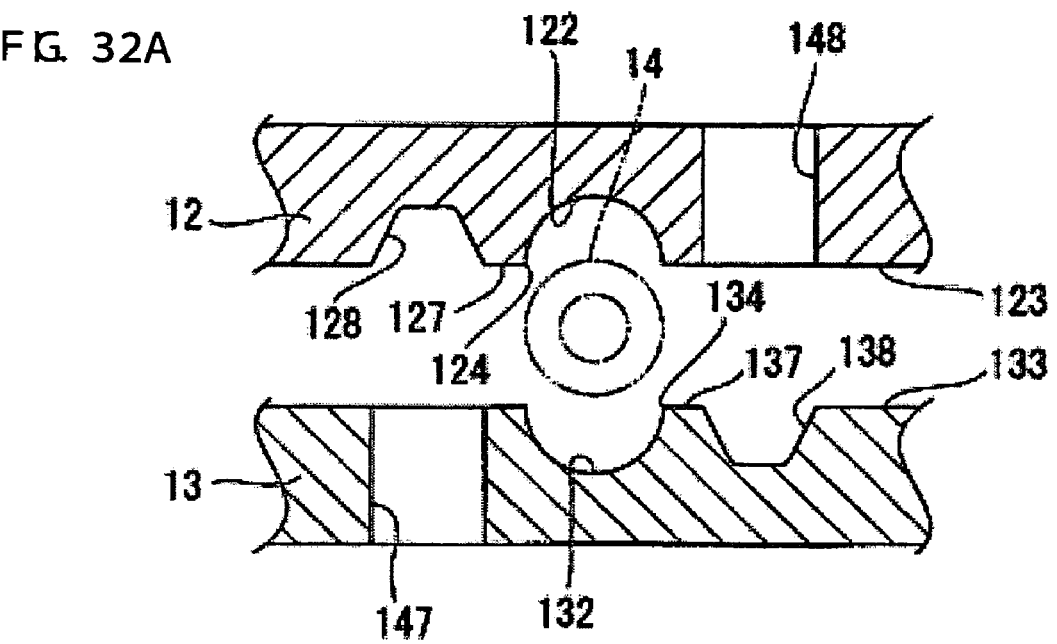
FIGS. 32A to 32B are illustrations showing a modified example of the manufacturing method of FIGS. 29A and 29B.
Figure 32B:
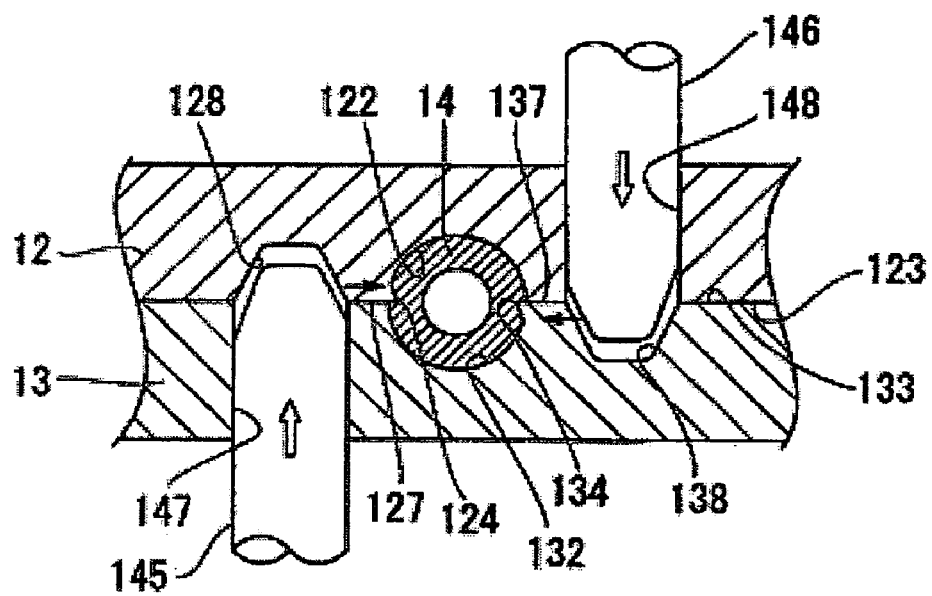

Next, in the example of FIGS. 32A and 32B, jigs 145, 146 are inserted into frame-like members 12, 13, thereby connecting a pair of frame-like members 12, 13 to a cooling duct 14.

That is, in the groove forming step, in addition to the foregoing grooves 122, 132 and recessed portions 128, 138 shown in FIGS. 29A and 29B, jig insertion holes 147, 148 are formed in place of the raised portions 139 (129) of FIGS. 29A and 29B (FIG. 32A). This hole 147 (148) is disposed at a position corresponding to the recessed portion 128 (138) of the opposing frame-like member 12 (13). Even the frame-like members 12, 13 of such a shape can be formed with ease and at low cost by using a casting method (such as die-casting) or a forging method (such as cold/hot forging), and such a method is preferably applied even to a small size object.

In the connecting step, with the cooling duct 14 housed in the grooves 122, 132, the jigs 145, 146 are inserted into the holes 147, 148 of the frame-like members 12, 13. Banks 127, 137, which are regions adjoining the grooves 122, 132, are pressed inwardly of the grooves 122, 132 by the leading ends of the jigs 145, 146 and thereby deform inwardly of the grooves 122, 132 (FIG. 32B). And, as the banks 127, 137 thus deform, the inner surfaces of the grooves 122, 132 make close contact with the outer surface of the cooling duct 14, and the corner portions of the banks 127, 137 bite into and thus engage the outer surface of the cooling duct 14, thereby connecting the frame-like members 12, 13 to the cooling duct 14.

In this example, the frame-like members 12, 13 are connected together by using the jigs 145, 146. Therefore, the degree of freedom in configuration and the degree of freedom in the shape, positional relationship, pressure, and the like of the pressing jigs 145, 146 are high, thus making it possible to stably secure and easily adjust a bonding force.

Next, in the example of FIGS. 33A and 33B, a cooling duct 14 is disposed to one frame-like member 13, and separate members 149, 150 are inserted, thereby connecting a pair of frame-like members 12, 13 to the cooling duct 14. Besides, the cooling duct 14 has a substantially rectangular cross-section.

That is, in the groove forming step, a groove 132 having a substantially rectangular cross-section capable of housing the entire cooling duct 14 and recessed portions 138 communicating with the groove are formed in an opposite surface 133 of the one frame-like member 13. And, separate member insertion holes 147, 148 are formed in an opposite surface 123 of the other frame-like member 12 (FIG. 33A). The recessed portions 138 have slant faces that draw closer to the groove 132 toward a depth direction. Besides, the holes 147, 148 are provided at positions corresponding to the recessed portions 138 of the opposing frame-like member 13. Even the frame-like members 12, 13 of such a shape can be formed with ease and at low cost by using a casting method (such as die-casting) or a forging method (such as cold/hot forging), and such a method is preferably applied even to a small size object.

In the connecting step, the cooling duct 14 is housed into the groove 132 of the frame-like member 13, and the opposite surfaces 123, 133 of the pair of frame-like members 12, 13 are brought into close contact with each other. In this state, the separate members 149, 150 are inserted into the holes 147, 148 of the frame-like member 12 (FIG. 33B). The separate members 149, 150 are fitted into the holes 147, 148 of the frame-like member 12 and the recessed portions 138 of the frame-like member 13, and thus are engaged with the frame-like members 12, 13. Besides, the leading ends of the separate members 149, 150 are each formed into a peaked shape provided with a slant face, and the other ends thereof have a rivet-like shape with a larger width than any other portion. The leading ends of such separate members 149, 150 deform inwardly of the groove 132 while moving along the slant faces of the recessed portions 138, and thus bite into the outer surface of the cooling duct 14. Furthermore, the frame-like member 12 is fixed by the shoulders of the other ends of the separate members 149, 150 (see FIG. 33B), thereby connecting the frame-like members 12, 13 to the cooling duct 14 via the separate members 149, 150.

In this example, the frame-like members 12, 13 are connected together by using the separate members 149, 150. Therefore, the degree of freedom in configuration and the degree of freedom in the shape, positional relationship, pressure, and the like of the pressing separate members 149, 150 are high, thus making it possible to stably secure and easily adjust a bonding force. Besides, even because the cooling duct 14 is disposed to the one frame-like member 13, the degree of freedom in configuration is increased, and to fill with a thermally conductive material, the thermally conductive material is easily disposed. Furthermore, the cooling duct 14 has a substantially rectangular cross-section, thereby simplifying the shape of the opposite surface 123 of the frame-like member 12 and facilitating formation of the frame-like member 12. Additionally, in this example, the separate members are formed to have a rivet-like shape, but another method (fixing by a screw or the like) may be used for the means of connecting the frame-like members 12, 13 together by using a member having no shoulder at the other end.

Additionally, the aforesaid embodiment has so far described the example of the projector using three liquid crystal panels. However, the invention is also applicable to a projector using only two liquid crystal panels, or even to a projector using four or more liquid crystal panels.

Besides, the optical modulator is not limited to the transmissive liquid crystal panel, but may use a reflective liquid crystal panel.

Furthermore, the optical modulator is not limited to the liquid crystal panel, but may use an optical modulator other than a liquid crystal, such as a device using a micromirror. In this case, the polarizing plates can be omitted on the luminous flux incidence and emergence sides.

Still furthermore, the invention is also applicable to a front type projector that projects from the direction in which the screen is observed, and a rear type projector that projects from the side opposite the direction in which the screen is observed.

The preferred embodiment of the invention has so far been described by referring to the accompanying drawings. However, it is needless to say that the invention is not limited to such examples. It is clear that those skilled in the art could conceive of various altered or modified examples within the scope of the technical idea set forth in the claims, and it is to be understood that such examples also naturally belong to the technical scope of the invention.

The entire disclosure of Japanese Patent Application No: 2005-055627, filed Mar. 1, 2005 is expressly incorporated by reference herein.

What is claimed is:

1. A projector comprising:
a light source device;
an optical device including;
    an optical modulator that modulates a luminous flux from a light source in response to image information,
    an optical modulator holding frame that holds the periphery of the optical modulator, and
    an optical modulator cooling duct that is disposed, along the periphery of the optical modulator, within the optical modulator holding frame, and that allows a cooling fluid to flow therethrough; and
a projection optical device that magnifies and projects an optical image formed by the optical device,
a position at which the optical modulator cooling duct being disposed in the direction of thickness of the optical modulator is determined based on at least one of a heat generation characteristic and shape of the optical modulator the optical modulator being of transmission type, and
the optical modulator cooling duct being disposed against the incidence surface side of the optical modulator.

2. The projector according to claim 1, the optical modulator cooling duct having a curved or angled cross-section shape.

3. The projector according to claim 1, further comprising:
a polarizing plate that is disposed on at least one of the incidence surface side and emergence surface side of the optical modulator;
a polarizing plate holding frame that holds the periphery of the polarizing plate; and
a polarizing plate cooling duct that is disposed, along the periphery of the polarizing plate, within the polarizing plate holding frame, and that allows the cooling fluid to flow therethrough.

4. The projector according to claim 3, the optical modulator cooling duct and polarizing plate cooling duct being disposed in parallel on a path through which the cooling fluid flows.

5. The projector according to claim 3, the optical modulator cooling duct and polarizing plate cooling duct being disposed in series on the path through which the cooling fluid flows.

6. The projector according to claim 5, the order of disposition of the optical modulator cooling duct and polarizing plate cooling duct being determined based on the heating value of each of the optical modulator and polarizing plate.

7. The projector according to claim 6,
the polarizing plate including an incidence surface side polarizing plate, and an emergence surface side polarizing plate, and
the polarizing plate cooling duct including an incidence surface side polarizing plate cooling duct and an emergence surface side polarizing plate cooling duct,
the emergence surface side polarizing plate cooling duct, optical modulator cooling duct, and incidence surface side polarizing plate cooling duct being disposed in series, in the order named from upstream to downstream.

8. The projector according to claim 6,
the polarizing plate including an incidence surface side polarizing plate and an emergence surface side polarizing plate, and
the polarizing plate cooling duct including an incidence surface side polarizing plate cooling duct and an emergence surface side polarizing plate cooling duct,
the optical modulator cooling duct and incidence surface side polarizing plate cooling duct being disposed in series, in the order named from upstream to downstream, and the emergence surface side polarizing plate cooling duct is disposed parallel thereto.

9. The projector according to claim 1, further comprising a diverging tank for branching the cooling fluid path.

10. The projector according to claim 9,
the optical modulator cooling duct including three optical modulator cooling ducts which correspond to three colors of red, green, and blue, and
the diverging tank dividing the cooling fluid path into at least three branches in response to the three optical modulator cooling ducts.

11. A projector comprising:
a light source device;
an optical device including;
an optical modulator that modulates a luminous flux from a light source in response to image information,
an optical modulator holding frame that holds the periphery of the optical modulator, and
an optical modulator cooling duct that is disposed, along the periphery of the optical modulator, within the optical modulator holding frame, and that allows a cooling fluid to flow therethrough; and
a projection optical device that magnifies and projects an optical image formed by the optical device,
the optical modulator cooling duct being at least substantially entirely circumferentially disposed along the periphery of the optical modulator.

12. The projector according to claim 11,
the optical modulator cooling duct having two or more parts that are substantially entirely circumferentially formed along the periphery of the optical modulator, the two or more parts being disposed in substantially parallel to each other in the direction of thickness of the optical modulator.

* * * * *